US008850536B2

(12) United States Patent
Liberman et al.

(10) Patent No.: US 8,850,536 B2
(45) Date of Patent: *Sep. 30, 2014

(54) METHODS AND SYSTEMS FOR IDENTITY VERIFICATION IN A SOCIAL NETWORK USING RATINGS

(75) Inventors: Jason J. Liberman, Encino, CA (US); David Scott Trandal, Santa Barbara, CA (US)

(73) Assignee: Safefaces LLC, Encino, CA (US)

(*) Notice: Subject to any disclaimer, the term of this patent is extended or adjusted under 35 U.S.C. 154(b) by 132 days.

This patent is subject to a terminal disclaimer.

(21) Appl. No.: 13/565,739

(22) Filed: Aug. 2, 2012

(65) Prior Publication Data

US 2013/0036459 A1 Feb. 7, 2013

Related U.S. Application Data

(63) Continuation-in-part of application No. 13/204,582, filed on Aug. 5, 2011.

(51) Int. Cl.
| G06F 7/04 | (2006.01) |
| G06F 15/16 | (2006.01) |
| G06F 17/30 | (2006.01) |
| H04L 29/06 | (2006.01) |
| G06F 21/00 | (2013.01) |
| G06F 21/32 | (2013.01) |
| G06F 21/45 | (2013.01) |
| G06F 21/35 | (2013.01) |
| H04L 9/32 | (2006.01) |
| H04L 9/08 | (2006.01) |
| G06F 21/43 | (2013.01) |

(52) U.S. Cl.
CPC .............. *H04L 9/3231* (2013.01); *G06F 21/32* (2013.01); *G06F 21/45* (2013.01); *G06F 21/35* (2013.01); *H04L 63/102* (2013.01); *H04L 9/0866* (2013.01); *G06F 21/43* (2013.01); *G06F 2221/2149* (2013.01)
USPC ................................... 726/6; 726/7; 713/186

(58) Field of Classification Search
CPC ......... G06F 21/32; G06F 21/35; G06F 21/43; G06F 21/45; G06F 2221/2149; H04L 63/102; H04L 9/3231; H04L 63/0861; H04L 9/0866
USPC ....................................................... 726/4, 6
See application file for complete search history.

(56) References Cited

U.S. PATENT DOCUMENTS

| 7,433,960 B1 | 10/2008 | Dube et al. |
| 7,797,732 B2 | 9/2010 | Tam et al. |
| 7,886,334 B1 | 2/2011 | Walsh et al. |

(Continued)

FOREIGN PATENT DOCUMENTS

| JP | 2002007341 A | * 1/2002 | .............. G06F 15/00 |
| JP | 2003-173381 | 6/2003 | |

(Continued)

*Primary Examiner* — Carolyn B Kosowski
(74) *Attorney, Agent, or Firm* — Steptoe & Johnson LLP

(57) ABSTRACT

The disclosed embodiment relates to identity verification and identity management, and in particular, to methods and systems for identifying individuals, identifying users accessing one or more services over a network, determining member identity ratings, and based on member identity ratings that restrict access to network-based content and certain user-to-user interactions. Further, the user experience in performing identity management is simplified and enhanced as disclosed herein.

20 Claims, 40 Drawing Sheets

(56) References Cited

U.S. PATENT DOCUMENTS

| | | | |
|---|---|---|---|
| 7,945,776 B1 * | 5/2011 | Atzmony et al. | 713/165 |
| 7,974,446 B2 * | 7/2011 | Fujiwara | 382/118 |
| 8,112,817 B2 * | 2/2012 | Chiruvolu et al. | 726/30 |
| 8,291,492 B2 * | 10/2012 | McNally et al. | 726/21 |
| 8,555,077 B2 * | 10/2013 | Davis et al. | 713/182 |
| 8,590,018 B2 * | 11/2013 | Thavasi et al. | 726/4 |
| 2006/0161435 A1 | 7/2006 | Atef et al. | |
| 2007/0055871 A1 * | 3/2007 | Ghanea-Hercock | 713/168 |
| 2007/0237367 A1 * | 10/2007 | Yamato et al. | 382/118 |
| 2008/0002866 A1 * | 1/2008 | Fujiwara | 382/118 |
| 2009/0177597 A1 | 7/2009 | Dube et al. | |
| 2010/0107088 A1 * | 4/2010 | Hunt et al. | 715/752 |
| 2010/0169952 A1 * | 7/2010 | Maki et al. | 726/3 |
| 2010/0280955 A1 * | 11/2010 | Ross et al. | 705/64 |
| 2010/0306249 A1 * | 12/2010 | Hill et al. | 707/769 |
| 2013/0036458 A1 * | 2/2013 | Liberman et al. | 726/6 |
| 2013/0067546 A1 * | 3/2013 | Thavasi et al. | 726/7 |
| 2013/0067547 A1 * | 3/2013 | Thavasi et al. | 726/7 |
| 2013/0191887 A1 * | 7/2013 | Davis et al. | 726/5 |

FOREIGN PATENT DOCUMENTS

| | | |
|---|---|---|
| JP | 2004-013128 | 8/2004 |
| JP | 2004-074220 | 5/2005 |
| JP | 2004-372978 | 8/2005 |

* cited by examiner http://Account Creation/VerifyCredentials

New User Account Creation

Account: John Doe

Minor Account Credentials — 11310

- ☒ Birth Certificate
- ☒ Social Security Card
- ☐ Passport
- ☐ Student Identification
- ...

*Help* — 11320

Parent Account Credentials – Parent 1

- ☐ Birth Certificate
- ☒ Social Security Card
- ☐ Passport
- ☐ Driver's License
- ...

Options — 11330
Submit — 11340

METHODS AND SYSTEMS FOR IDENTITY VERIFICATION IN A SOCIAL NETWORK USING RATINGS

RELATED APPLICATIONS

This application is a Continuation-In-Part of U.S. patent application Ser. No. 13/204,582, filed Aug. 5, 2011, entitled Methods And Systems For Identity Verification, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The disclosure relates to identity verification and identity management, and in particular, to methods and systems for identifying users accessing one or more services over a network.

BACKGROUND

Since the launch of text based chat rooms, the Internet has generated numerous technological methodologies for individuals to communicate with other individuals and systems. This expansion of connectivity and associated technologies eventually led to the development of social networking websites. These social networking sites have grown dramatically since their inception, resulting in hundreds of millions of registered users. These social networking websites comprise a numerous and vast association of individuals that have connected themselves to one another for the purpose of chatting, profiling, blogging, and the sharing of information. Given the size and success of these social networks, the occurrence of undesirable activities was inevitable.

Social networks have been affected by Internet-related crimes, such as cyberstalking and cyber-bullying. Typically, cyberstalking is the use of information and communications technology by an individual to harass another individual. Cyberstalking may take many forms, including but not limited to the solicitation of minors for sexual or other illegal purposes, the inappropriate monitoring of targeted individuals, the transmission of threats, harassment, and identity theft or impersonation. Cyberstalking is often perpetrated by an adult, and may be perpetrated against a minor. Although sometimes similar, cyber-bullying is typically perpetrated by one or more minors against another minor. Cyber-bullying may occur when a minor is repeatedly tormented, threatened, harassed, humiliated, embarrassed, or otherwise targeted by another minor(s) using technological means, including but not limited to a social network, text messaging, email, instant messaging, blogging, micro-blogging, and the like.

A significant concern of a social network user is becoming a victim of cyberstalking and/or cyber-bullying. Related to this concern is the ability of an individual to know with reasonable certainty with whom he or she is communicating. Currently, social networks do not utilize sufficiently reliable identity verification systems. Generally, an individual with any intention, whether criminal or otherwise, may become a social network member. With little or no barriers to entry, there is a continuing need in the art for a secure system for reducing the incidents of cyberstalking, cyber-bullying, or other forms of cybercrime.

SUMMARY

Briefly and in general terms, the disclosed embodiments listed below provide a secure identity verification and identity management system that enables individuals to interact in a safe, social networking environment. Some of the embodiments also create a unique set of optional management controls (e.g., user, guardian, parental, superintendent, and the like) on the individual's use of the network and parties with whom the individual may interact. In one embodiment, a social networking environment includes, by way of example only, and not by way of limitation, sharing of text, voice, pictures, and videos with other members that have been granted member access. Social networks, generally also provide limited access by all members of the network to a restricted set of member information (e.g., picture and name) and enable limited communication between the member and other members of the network (e.g., the ability to send a message or connection request).

Some embodiments of the identity verification and management system provide secure identity verification and identity management services to other environments outside of social networking environments. In one embodiment, the identity verification and management system may be used in association with e-commerce and auction web sites in which the identity of the buyer/seller may be used to facilitate a transaction. In another embodiment, the identity verification and management system may be used in association with e-commerce and auction web sites in which the identity of the buyer/seller may be used to assist in the marketing for future transactions. Still further, the identity verification and management system may be used in association with online dating, adult content, online gaming, online gambling web sites where the identity of the members and/or verified age is an important aspect in the safe and legal operation of the secure identity verification and identity management service(s). In addition, the identity verification and management system may be used in association with a Customer Relationship Management system and associated services in which the identity of the members, including, but not limited to their age and/or gender may be used to assist an advertiser or vendor to target a specific audience for promotional or marketing services.

In another embodiment, the identity verification and management method enables a service provider to offer identity verification services including: (1) creating member account profiles, optionally including in-person authentication by an authorized agent; (2) managing member identification and password login credentials; (3) monitoring device and member location network access services; (4) generating a member's initial identity rating and managing the member's identity rating in real-time; (5) providing member-to-member restrictions using identity ratings; (6) providing parental, guardian or superintendent controls; and (7) blocking access to the network by unauthorized members.

Continuing, in some embodiments certain systems and methods described herein use attributes of a member, in combination with a member's identity rating, to provide or control the types of services available to a member (e.g., a user aged 12 with a low identity rating may be restricted from using video conferencing). The identity verification and management systems and methods described herein provide a higher level of confidence and security in member-to-member interactions and member access to content on the Internet, as well as providing increased control over these interactions and content access.

One embodiment of an identity verification and management method provides identity verification and management for a social network system. The method includes: creating member account profiles for members of the social network system using identification components for identifying members, wherein the creating of the member account profiles includes generating a unique key each time a user record is created and associating the unique key with the user record; generating an identity rating for each member using factors including: number of identification components, quality of identification components, and presence of an in-person authentication; determining member identity rating thresholds for identity rating-restricted services; authenticating a member attempting to access one or more services over the social network system, wherein the authentication includes confirmation of a member-registered device, confirmation of a member-registered location, confirmation of a member-registered biometric, and combinations thereof; managing the member's identity rating in real-time, wherein the member's identity rating is altered in real-time by monitoring the member's identity rating-altering factors including keystroke patterns and language analysis; providing member-to-member restrictions using the identity ratings, wherein access to network-based content and member-to-member interactions is restricted based on member identity rating thresholds; providing parental sponsor or superintendent controls; and blocking access to the social network system by unauthorized members.

In one aspect of the above embodiment, generating a unique key includes concatenating a hash of the user ID, the time when the record was created, and an existing randomly generated token that is saved in the programming code, and then hashing the concatenation using a SHA hashing algorithm to produce a new value. In some embodiments, the method further includes storing the unique key with the user record in a database. Additionally, the creating of member account profiles may include in-person authentication by an authorized agent. Optionally, the authorized agent may be a law enforcement office. Continuing, the creating of member account profiles may include in-person authentication by a network sponsoring agent. In some embodiments, the authorized agent is a school or educational institution. In another aspect, the member is actually a member group that includes a minor-aged member and a parental sponsor.

In another aspect of one embodiment, the creating of member account profiles may include in-person authentication by an authorized agent, a network sponsoring agent, a minor-aged member, and a parental sponsor. The identification components may include a government issued ID, driver's license, passport, birth certificate, social security number, school or educational institution issued ID, and combinations thereof. In one embodiment, the identity ratings are generated or modified using factors including IP address, recognized device, recognized location, dynamic access code, personal security questions, digital signature, and combinations thereof. In another embodiment, the identity ratings are generated or modified using factors that are biometric including hand/palm scan, fingerprint scan, iris scan, facial recognition image, voice recognition, vein scan, and combinations thereof. In still another embodiment, the identity ratings are generated or modified using factors that are behavior characteristics including keystroke patterns, suspicious language, language style, communication methods, and combinations thereof.

Referring now to another aspect of some embodiments, a parental sponsor is able to alter the member identity rating thresholds for identity rating-restricted services. In one embodiment, a network sponsoring member is able to alter the member identity rating thresholds for identity rating-restricted services. In another embodiment, a parental sponsor is able to alter the identity rating changes associated with identity rating-altering factors. In still another embodiment, a network sponsoring member is able to alter the identity rating changes associated with identity rating-altering factors.

In another embodiment, attributes of a member are used to provide or control the types of identity rating-restricted services available to a member. Additionally, in another embodiment, a member's identity rating is used to provide or control the types of identity rating-restricted services available to a member. Continuing, in some embodiments, attributes of a member, in combination with a member's identity rating, are used to control the types of identity rating-restricted services available to a member.

Referring now to still another aspect of some embodiments, the types of identity rating-restricted services available to a member include: modifying the personal account parameters, setting a home location, setting a home device, sending a message, sending a picture, tagging a picture, sending a video, tagging a video, engaging in a video conference, viewing only mode of other members information, and viewing only mode of member's own information. Additionally, in another embodiment, the types of identity rating-restricted services available to a member are linked to a member's identity rating to enable a type of service to be available to a member only if a pre-determined identity rating is maintained by the member. Continuing, in some embodiments, the types of identity rating-restricted services available to a member are linked to a member's identity rating to enable a type of service to be available to a member only if a pre-determined identity rating is maintained by the member and a pre-determined identity rating is also maintained be another member to whom communication is attempted.

Referring now to yet another aspect of some embodiments, the types of identity rating-altering factors that potentially alter a member's identity rating include: answering one or more challenge questions to which answers were previously provided, receiving a parental authorization code, receiving member identification information, confirming log-in from a member-registered device, confirming log-in from a member-registered location, confirming log-in with member-registered biometrics, logging in from an unregistered location, logging in from an unregistered device, and logging in with unregistered biometrics. Additionally, another embodiment further includes prompting a member of types of identity rating-altering factors that may be performed to attempt to raise the member's identity rating, in response to the member being denied access to an identity-rating restricted activity.

Continuing, some embodiments also include: (1) enabling a parental sponsor to view a history of minor member's activities, (2) enabling a parental sponsor to view a minor member's activities in real time; (3) enabling a parental sponsor to view a minor member's activities if the minor member's identity rating drops below a pre-determined value, (4) alerting a parental sponsor if the minor member's identity rating drops below a pre-determined value, (5) alerting a parental sponsor if the minor member contacts another member whose member's identity rating is below a pre-determined value, and (6) alerting a parental sponsor if the minor member is contacted by another member whose member identity rating is below a pre-determined value.

In some embodiments of the identity verification and management system and method, a minor member is made aware of the minor member's identity rating. Additionally, in other embodiments, a minor member is not made aware of the minor member's identity rating. In some embodiments, a parental sponsor is made aware of the minor member's identity rating. In other embodiments, a parental sponsor is not made aware of the minor member's identity rating. Furthermore, in some embodiments, the parental sponsor or superintendent controls include requiring a parental authorization code for access to the system. In other embodiments, the parental sponsor or superintendent controls include requiring a parental authorization code for access to the system for a limiting period of time. Continuing, in still other embodiments, the parental sponsor or superintendent controls include requiring a parental authorization code for access to identity rating-restricted services.

Another embodiment of an identity verification and management method provides identity verification and management for a network. The method includes: creating member account profiles for members using identification components for identifying members, wherein the creating of the member account profiles includes generating a unique key each time a user record is created and associating the unique key with the user record, and wherein generating a unique key includes concatenating a hash of the user ID, the time when the record was created, and an existing randomly generated token that is saved in the programming code, and then hashing the concatenation using a SHA hashing algorithm to produce a new value; generating an identity rating for each member using factors including: number of identification components, quality of identification components, and presence of an in-person authentication; determining member identity rating thresholds for identity rating-restricted services; authenticating a member attempting to access one or more services; managing the member's identity rating, wherein the member's identity rating is alterable in response to monitoring the member's identity rating-altering factors; providing member-to-member restrictions using identity ratings, wherein access to network-based content and member-to-member interactions is restricted based on member identity ratings thresholds; and blocking access by unauthorized individuals.

The types of networks that may employ the identity verification and management system and method the network include a social media network, a dating service network, an e-commerce network, an on-line auction network, and an on-line marketing network.

Another embodiment of an identity verification and management system provides identity verification and management for a network. The system includes one or more identity verification and management (IDM) servers and a user interface accessible via a computing terminal or smartphone that is remote from the identity verification and management servers. The user interface enables access to network-based content and user-to-user interactions upon fulfilling member authentication and member identity rating requirements.

In one embodiment, each server comprises: one or more memory storage devices; one or more processors; an identification module, an authentication module, a member rating module, and a member activity security module. The identification module is configured to identify members using identification information. The identification module includes a user interface for entering the identification information and generating an identity rating for each member using identification components, wherein the identity rating is generated using factors including: number of identification components, quality of identification components, and presence of an in-person authentication. The identification module determines member identity rating thresholds for identity rating-restricted services and member identity rating changes associated with identity rating-altering factors.

The authentication module is configured to authenticate users attempting to access one or more services over a network. The authentication module accesses a unique key in a user record to authenticate the user, wherein the unique key being generated when the user record was created, and wherein generation of a unique key includes concatenating a hash of the user ID, the time when the record was created, and an existing randomly generated token that is saved in the programming code, and then hashing the concatenation using a SHA hashing algorithm to produce a new value.

The member rating module is configured to alter the member's identity rating in response to monitoring the member's identity rating-altering factors, wherein identity rating-altering factors include confirming log-in from a member-registered device, confirming log-in from a member-registered location, confirming log-in with member-registered biometrics, and combinations thereof. The member activity security module provides member-to-member restrictions using identity ratings to restrict access to network-based content and member-to-member interactions, based on member identity rating thresholds, and wherein the member activity security module blocks access by unauthorized individuals.

Still another embodiment of an identity verification and management method provides customer relationship management for a network. The method includes: creating member account profiles for members using identification components for identifying members, wherein the creating of the member account profiles includes generating a unique key each time a user record is created and associating the unique key with the user record, and wherein generating a unique key includes concatenating a hash of the user ID, the time when the record was created, and an existing randomly generated token that is saved in the programming code, and then hashing the concatenation using a SHA hashing algorithm to produce a new value; generating an identity rating for each member using factors including: a number of identification components and a quality of identification components; determining member identity rating thresholds for identity rating-restricted content access; authenticating a member attempting to access the network; managing the member's identity rating, wherein the member's identity rating is alterable in response to monitoring the member's identity rating-altering factors; and providing content access to a member based on member identity ratings, wherein content access is restricted from a member without a requisite member identity rating.

The foregoing summary does not encompass the invention in its entirety, nor are the embodiments intended to be limiting. Rather, the embodiments are provided as mere examples. Other features and advantages will become apparent from the following detailed description, taken in conjunction with the accompanying drawings, which illustrate by way of example, the features of the various embodiments.

BRIEF DESCRIPTION OF THE DRAWINGS

Example embodiments will now be described with reference to the drawings summarized below. These drawings and the associated descriptions are provided to illustrate example embodiments of the invention, and not to limit the scope of the invention.

FIG. 11 illustrates an embodiment of an IDM administration user interface identity credentials verification screen.

DETAILED DESCRIPTION OF PREFERRED EMBODIMENTS

Figure 1:
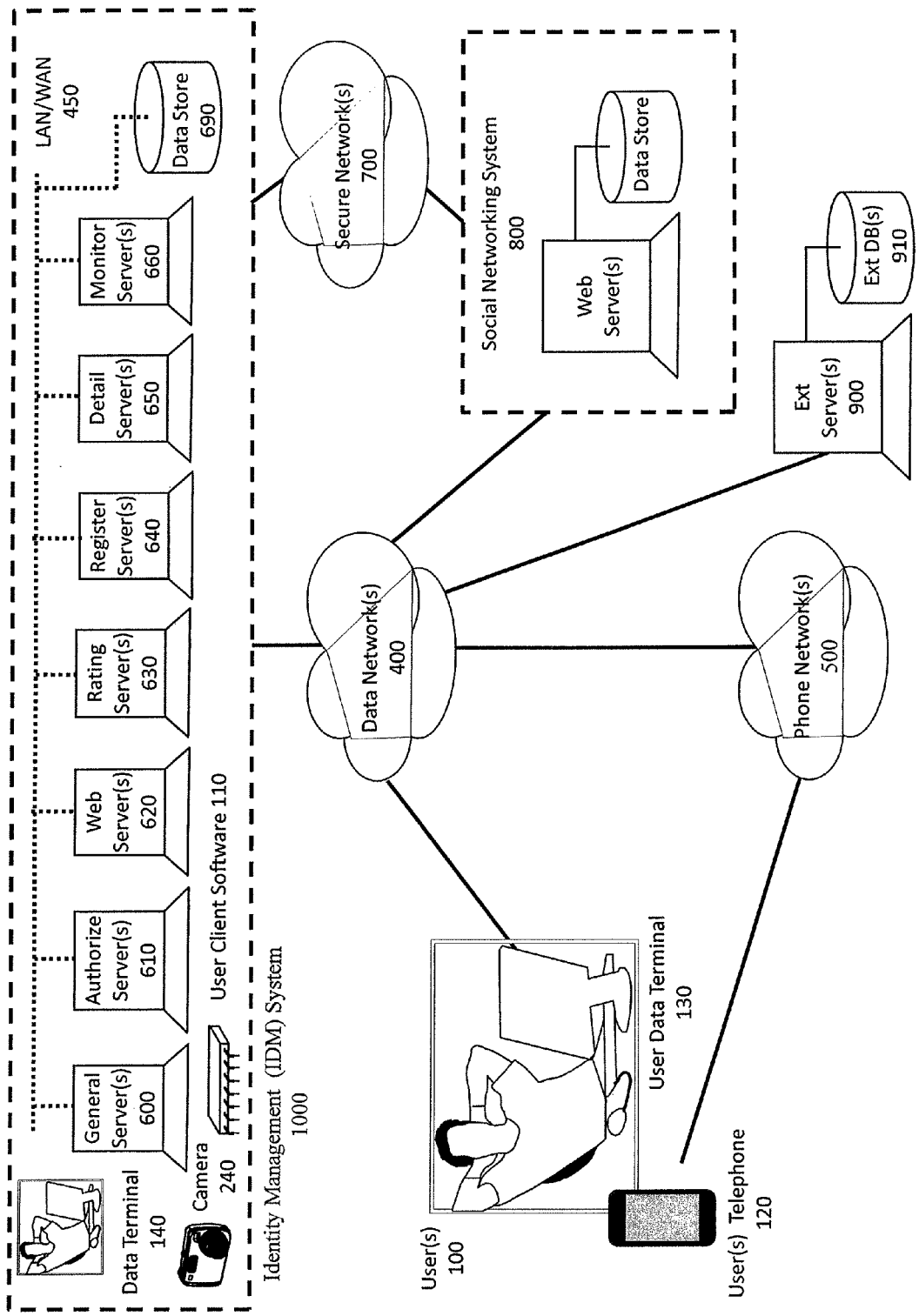
FIG. 1 illustrates an embodiment of a network operating environment for an Identity Management ("IDM") system.

The methods and systems of the disclosed embodiment manage a member's identity within a social network environment and optionally restrict that member's interactions based on a member's identity rating as determined by the Identity Management ("IDM") system. This disclosure relates to identity verification and identity management of individuals and associated personal, guardian or parental controls in connection with a social networking website. Other uses of the disclosed embodiments include a synchronous conferencing system (e.g., chat room or instant messaging), a video messaging or collaboration system, a voice chat system, a voice network, a blogging and micro-blogging network, an e-commerce and auctioning website, a discussion group forum, a membership network (e.g., an online dating website), or other Internet-based, data or voice network (collectively, a "social network").

Unless otherwise indicated, the functions described herein may be performed by executable code and instructions stored in a computer readable medium and running on one or more processor-based systems. However, state machines and/or hardwired electronic circuits may also be utilized. Further, with respect to the example processes described herein, not all of the process states need to be reached, nor do the states have to be performed in the illustrated order. Further, certain process states that are illustrated as being serially performed may be performed in parallel.

Similarly, unless expressly stated to the otherwise, while certain embodiments may refer to a Personal Computer ("PC") system or data device, other computer or electronic systems may be used as well, such as, without limitation, an interactive television, a network-enabled personal digital assistant ("PDA"), a network game console, a networked entertainment device, a smartphone (e.g., with an operating system and on which a user may install applications) and the like.

In addition, while certain user inputs or gestures are described as being provided via phone key-presses, data entry via a keyboard, or by clicking a computer mouse or button, optionally, user inputs may be provided using other techniques, such as by voice or otherwise. The example screen layouts, appearance, and terminology as depicted and described herein, are intended to be illustrative and exemplary, and in no way limit the scope of the invention as claimed.

The terms, "for example," "e.g.," "in one/another aspect," "in one/another scenario," "in one/another version," "in some configurations" "in some implementations," "preferably," "usually," "typically," "may," and "optionally," as used herein, are intended to be used to introduce non-limiting embodiments. Unless expressly stated otherwise, while certain references are made to certain example system components or services, other components and services may be used as well and/or the example components may be combined into fewer components and/or divided into further components. The terms, "member" and "user," are used interchangeably. Members and users are subscribed to or enrolled in a network service or network of users.

The functionality, operation, and implementation for an embodiment of a system that verifies a member's identity in a secure and reliable manner, generate a member's identity rating, and optionally provide parents or guardians of members with control over whom each member may interact and the type of information each member may access will now be described in further detail.

Referring now to the drawings, wherein like reference numerals denote like or corresponding parts throughout the drawings and, more particularly to FIGS. 1-40, there are shown various embodiments of the IDM system 1000. More specifically, FIG. 1 illustrates an embodiment of an IDM system 1000 that may be used in accordance with the disclosed embodiments. As shown in one embodiment, the IDM system 1000 serves a plurality of social networking users (or network-based users) 100 with mobile/fixed phones 120 connected to a phone network 500 and/or data network 400. Continuing, the IDM system 1000 also interacts with the plurality of users 100 via computer/data terminals 130 connected to a data network 400 (e.g., the Internet, a Local Area Network ("LAN"), a Wide Area Network ("WAN"), or the like) in this embodiment.

In some embodiments, the IDM system 1000 also is administered via a data terminal 140 which is used by authorized administrative personnel. The data/computer terminals 130 may be a personal computer having a monitor, keyboard, memory, a disk drive, and a data communication interface. In addition, the computer terminal 130 may be an interactive television, a networked-enabled PDA or the like. Optionally, there is a single IDM server performing the processing to support the services, user interfaces, and applications described herein. In another embodiment, there are a collection of IDM Servers 600, 610, 620, 630, 640, 650, 660, and IDM Data Store 690 which are interconnected either through Data Network 400 (e.g., the public Internet, as depicted by the dashed line connections in FIG. 1) and/or via a private LAN or private WAN 450, as shown by the dotted line connections in FIG. 1.

In another aspect of the IDM system 1000, user client software and/or software applications 110 may be downloaded and executed on the user telephone 120 and/or the user data terminal 130. This software (e.g., a smartphone application) facilitates identity verification (e.g., application software used to capture iris or facial images for biometric-based security).

In this embodiment, the IDM system 1000 contains centralized databases and/or general-purpose data storage areas 690 including by way of example only, and not by way of limitation, some or all of the following: (1) a customer account database which may include user profile information including individual identity data provided by the user, third parties, authorized identity verification agents, government agencies, system-determined data associated with the individual (e.g., home location, Internet Protocol ("IP") address and/or range, communication device types, and the like); (2) an authorized service provider employee database; (3) a member network access records; (4) a member monitoring including, for example, member-member history records; and (5) a general-purpose data storage for infrastructure components (e.g., the web logs, router access logs, and the like). Optionally, the data store 690 and/or certain data bases (e.g., account data) has a collection of security and intrusion defenses, including by way of example only, and not by way of limitation, access to only a very limited number of authorized service provider personnel, limited or no public network access, restricted physical access to the server, and the like.

In some embodiments of the IDM system 1000, the user interfaces for access to the stored/archived information are device specific. By way of example only, and not by way of limitation, the user interface for a computer may be provided via a widget/gadget, a traditional web portal, an executable client, tablet/smartphone application, or the like. For a mobile handset or tablet, the interaction is optionally tailored to the available display space and interaction mechanism, where the functionality is similarly reduced in scope. For example, for a smartphone handset, certain logos, menus, images, and the like may be reduced in relative size or eliminated altogether. In other embodiments of the IDM system 1000, the user interfaces for access to the stored/archived information are not device specific.

Continuing, the IDM system 1000 contains authentication server(s) 610 with member authentication capabilities in some embodiments. This back-end server is used to manage access to the IDM system 1000 and one or more social networks. The authentication server(s) 610 ensure secure and controlled access of individuals and groups including social networking members, member parent sponsors (or other guardian sponsors), and service provider personnel, as well as system access including device applications, client/server applications, server-to-server interactions, and the like. In performing individual access management tasks, the authentication server typically uses authentication techniques to identify the individual including: user name and password pairs, biometric data, location, IP address, smart card access, challenge and response systems, keystroke pattern identification, language usage identification, parental sponsor provided passcode presentation, and the like. In some embodiments, the authentication server enforces several layers of security based upon certain conditions. For example, if a user fails to enter a user name and password combination after three tries or fails two account creation security questions, the system may require a customer service interaction (or parental identification confirmation) to gain access.

In another aspect of the layered security, if the authentication server determines a user is accessing the system or network from outside a designated area (e.g., their home) or from a different computer system or device, additional levels of authentication may be required. In some embodiments, the authentication servers encrypt all sensitive data (e.g., user names, passwords, biometric data, and the like) before transferring data and storing the data in secure data store 690. Preferably but not necessarily, certain data such as passwords are never available to be viewed by users, members, or service personnel once created and/or initially displayed.

In still another aspect of the layered security, the authentication server manages safeguards which are instituted whenever sensitive data is modified. For example, the authentication server may send an email notification to a guardian if a password or user name is modified by a member. Optionally, the authentication server logs onto the detail record server any modification of sensitive data. Preferably but not necessarily, the authentication server 610 may access one or more internal and/or external data stores, for example, to compare biometric data, determine a user's location from Global Positioning System ("GPS") coordinates or the like.

In one embodiment, the IDM system 1000 includes one or more general processing server(s) 600 which may be used to perform specific tasks, peak operation, and/or support offload processing of function-specific servers (e.g., Central Processing Unit intensive tasks like facial recognition in support of authentication server 610). Optionally, the general processing server(s) are interconnected to other IDM system servers and data stores 690 over a LAN/WAN 450.

With reference to another aspect of the system, the IDM system 1000 includes one or more web server(s) 620 which may be used to support the service provider's corporate web site, provide member account web pages, provide member guardians with access to member usage content and statistical data, provide service provider personnel access to account creation and account management, and the like. In some embodiments, the web server(s) are interconnected to other IDM system servers and data stores 690 over a LAN/WAN 450 (e.g., to store web logs directly or via detail record server 650).

In another embodiment, the IDM system 1000 includes one or more rating server(s) 630 which may be used to dynamically provide members with a session identity rating. The identity rating (or identity quality rating) is the IDM system's confidence, based upon a number of factors, that the member accessing the system is the person he or she purports themselves to be. The rating is dynamic and moves up or down (i.e., higher confidence or lower confidence) based on how the user gained access to the IDM system 1000, what identity verification steps were employed by the system during the system access by the user, the behavior in which the user is engaged, identity rating-altering factors by the user, combination thereof, and the like. Optionally, the system also takes into account historic behavior in determining a session identity rating.

Continuing, in one embodiment the rating server 630 determines a numeric identity rating (e.g., usually a rating is between 1-100). In other embodiments, a non-numeric identity rating may be used (e.g., using alphabetic characters, symbols, colors, combinations thereof, and the like). Optionally, the rating server 630 or another server (e.g., web server 620 or general purpose server 600) may translate the numeric session identity rating into a rating which is easier for a member to comprehend (e.g., weak, strong, medium, and the like). A rating is typically based on the cumulative effect of a number of factors, not a single factor. For example, a high identity rating may require the member to (1) login from their home or office, (2) provide an iris scan, and (3) have a strong password. However, in some embodiments of the IDM system 1000, a single factor in a collection of factors may dominate the identity rating, for example an iris scan (i.e., some factors may be weighted more heavily than other factors). The following is a list of potential factors which may be employed in determining a member's identity rating during the login process. The list is meant to be exemplary only, and is not intended to include every possible factor.

User Name—One factor for use in determining a member's identity rating is the creation of a user name to access the IDM system 1000, and through the IDM system to the social network/user group. Optionally, the strength of the user name may also "weight" the value of this factor. For examples, the weighting of the user name strength may be greater if a configurable number of characters do not match any known member identity elements (e.g., social security number, name, birthday, street address, and the like). The weighting of the user name strength also may be greater if the user name is not a temporary user name known/assigned by others (e.g., service provider personnel). There are numerous methods which may be used to at least partially conceal a member's identity with a carefully-crafted user name, including random selection by the member. Preferably but not necessarily, the IDM system 1000 facilitates the member's creation of a user name (and provides feedback) using examples, guidelines, comparison checking with known member identity information (e.g., rejecting a user name if the member attempts to use their social security number), rejecting a previously used name, notifying of a weak user name choice, and the like.

Password—Another factor for use in determining a member's identity rating is the creation of a password to access the IDM system 1000, and through the IDM system to the social network/user group. Optionally, the strength of the password may also "weight" the value of this factor. For examples, the weighting of the password may be greater if a configurable number of characters do not match known member identity elements (e.g., social security number, name, birthday, street address, and the like). The weighting of the password strength also may be greater if the password is not a temporary password, includes non-alphabetic characters, includes capitalized and non-capitalized letters, and the like. There are a number of methods which may be used to create a password which would be difficult for others to discover, including random selection by the member. Preferably but not necessarily, the IDM system 1000 facilitates the member's creation of a password (and provides feedback) using examples, guidelines, comparison checking with known member identity information (e.g., rejecting a user name if the member attempts to use their social security number), rejecting a previously used name, notifying of a weak password choice, notifying of obvious number patterns, and the like.

IP address—Still another factor for use in determining a member's identity rating is the location from which the member is accessing the system (e.g., is the member accessing the system from a known IP address). If the member's IP address is known to be a member's residence or office IP address, the rating confidence may increase. Additionally, if the member's IP address is not the member's residence or office, but the IP address may be determined to be within a configurable geographic location matching that of the member, the rating confidence may increase (but likely not to the same degree as the known home/office IP address). Optionally, if the IP address is from a location from which a U.S.-based member is highly unlikely to be accessing the system from (e.g., China, Iran, or North Korea), then the IDM system 1000 may decrease the identity rating significantly, or even not provide access. Preferably but not necessarily, there are procedures by which a member may notify the IDM system 1000 or service provider that he or she is traveling. In such a scenario, the IDM system 1000 may take this notification into account when determining a member's identity rating or require additional login verification (e.g., extra security questions). In this regard, there are a number of ways a detected IP address may be used during login to increase or decrease the system's confidence in the identity of the member.

Recognized device—Yet another factor for use in determining a member's identity rating is whether or not a member is accessing the IDM system 1000 from a known device. If the member has registered a device explicitly and/or even implicitly, using the device to access the IDM system 1000, it may increase the member's identity rating. Conversely, if a member has registered a device and is not using the device to access the system, the member's identity rating may decrease. In some embodiments of the IDM system 1000, a member may be able to register more than one device (typically devices that are commonly used by the member). There are numerous ways to use a recognized device during login to increase or decrease the system's confidence in the identity of the member.

Dynamic Access Code—Another factor for use in determining a member's identity rating is whether or not the member is accessing the system after entering a unique code which is dynamically associated with the member. For example, a member may be provided with an application downloadable to the member's mobile device (e.g., tablet computer, smartphone, and the like). Optionally, this application provides the member with a dynamic access code which the member enters during the system access login process. An example scenario is as follows: The member enters his or her login and password which the IDM system 1000 authenticates. The IDM system 1000 then prompts the member to enter an IDM code. The member selects an application labeled "Verify" on their mobile device. The application wakes up, and optionally queries the mobile device for the location of the mobile device. The application then transmits the mobile device location, user name, and login code request over a wireless data network (preferably but not necessarily, first encrypting the data before transmitting). The IDM system 1000 responds with a generated code, for example, a 5-character alphanumeric/digit string. The member then enters the code displayed by the "Verify" application.

In another embodiment, other example dynamic access code methods may be used. For example, the IDM system 1000 may, in response to receipt of a valid user name and password, send a code to the "Verify" application (described above) which wakes up and displays the code to the member. Optionally, the code may be sent as a Short Message Service ("SMS") message or Multi-Media Service ("MMS") message. Preferably but not necessarily, the member has a smart card type device which displays a frequently changing code which the member enters on login. In this regard, there are a number of ways in which using a dynamic access code may be used to make it difficult for someone to gain access to someone's login. Thus, the use of dynamic access codes may increase the system's confidence in the known identity of the member accessing the IDM system 1000.

Parental Sponsor Access Code—One potential factor for use in determining a member's identity rating is whether or not there is a parental sponsor provided passcode. In such an embodiment, a parental sponsor of a member may be able to control, limit, or completely restrict access to the network for the member of which they are the parent sponsor. In this manner, a parent sponsor may configure their minor-child member's account so that the minor-child member must enter a passcode from the parent sponsor in order to access the system. This enables the parent to control the amount of access (e.g., two hours per night) or type of access (e.g., e-mail, but no video chat) available to the minor-child member. This parental sponsor provided passcode may be generated in conjunction with a downloadable application (as have been previously described) to provide the member with a dynamic access code (authorized by the parent sponsor) which the member enters during the system access login process. In some configurations of the IDM system, the member may not allowed to access the network at all without the parental sponsor provided passcode.

Personal Security Questions—Still another factor for use in determining a member's identity rating is whether or not the member correctly answered one or more personal security questions likely only known by the member. Preferably but not necessarily, an authorized IDM staff member (e.g., an Identify Verification Officer ("IVO")) asks the member during account creation to provide answers to a set of questions. During the login process, for example after user name/password entry and authentication, the member may be presented with one or more security questions. Optionally, the member is randomly presented with a multiple choice answer selection. In some embodiments, the member must successfully answer a question to gain access to the system. In other embodiments, the system is configurable by the service provider or parent/guardian to allow a member access to the IDM system 1000 if the member has failed to provide the correct response to one or more questions. Typically but not necessarily, if the member has failed one or more questions and is allowed to access the IDM system 1000, the member's identity rating may be adversely affected. In this regard, there are a number of ways a set of personal security questions may be used during login to increase or decrease the system's confidence in the identity of the member.

Location—Yet another factor for use in determining a member's identity rating is whether or not the member is accessing the IDM system 1000 from a known location that may be identified by a system and/or application. Preferably but not necessarily, the member's home address is verified during account creation. Additionally, one or more "safe" locations may be identified during account creation (e.g., second parent in a divorce, grandparents, older brother, relative, second home, and the like). In some embodiments, if the member's location may be determined at the time of login/system access and the location is considered a "safe" location, then the system may increase the member's identity rating (increased confidence in member's identity). In other embodiments, if the member's location may not be determined or determined to be outside of a safe location, then the system may decrease the member's identity rating.

When using some versions of the IDM system 1000, the system restricts access if the member is accessing the system from an unknown or unsafe location. Preferably but not necessarily, the IDM system 1000 may dynamically create a list of safe locations based on frequent access and/or other security information which may be acquired from a member when the member is operating from a specific location. For example, if three system accesses occur from a given location where the member has also provided biometric data, then this may qualify the location to be a "safe/approved" location. In this regard, there are a number of ways a member's location information may be used during login to increase or decrease the system's confidence in the identity of the member.

Hand/Palm Scan—Continuing, another factor for use in determining a member's identity rating is whether or not the member is accessing the IDM system 1000 using a biometric palm scan. Palm scans, may be used to measure and compare the structure of the hand and fingers, shape and proportion of the fingers, width and thickness of the hand, width and thickness of the fingers, width and thickness of the finger joints, and other distinguishing features and characteristics including ridges and creases. Preferably but not necessarily, some or all of these attributes of the hand and finger are used in palm scan authentication. In some embodiments, the palm scan may be performed by a scanning device connected to the member's computing device (e.g., a palm scanner connected to a laptop PC or mobile computing device). In other embodiments, the palm scanner may be an application downloadable to a member's computing device (e.g., tablet computer) and the camera technology of the mobile device may be configured as a palm scanner. In such an embodiment, the member may launch an application on the computing device, place his or her hand on the screen (or hovers the palm just above the camera lens), and have the application take a picture/scan of the member's hand. Optionally, the member takes a picture of their hand. Preferably but not necessarily, the palm scan may update within specified tolerances between each scan as the member's hand changes over time (e.g., as a child grows up). In this regard, there are a number of ways that hand/palm scan information may be used during login to increase or decrease the system's confidence in the identity of the member.

Fingerprint Scan—Still another factor for use in determining a member's identity rating is whether or not the member is accessing the IDM system 1000 using a biometric fingerprint scan. A fingerprint scan typically measures the friction ridges of the skin on the underside of the fingerprint. Each individual's fingerprint is unique. In some embodiments, the fingerprint scan may be connected to the member's computing device (e.g., a fingerprint scan connected to a laptop PC or mobile computing device). In other embodiments, the fingerprint scan may be an application that is downloadable to a member's computing device (e.g., tablet computer) and the camera technology in the mobile device may be configured as a fingerprint scan. In such an embodiment, the member may launch an application on the computing device, place his or her finger on the screen (or hovers the finger just above the camera lens), and then have the application take a picture/scan of the member's finger. Optionally, the member takes a picture of their finger. In this regard, there are a number of ways fingerprint information could be used during login to increase or decrease the system's confidence in the identity of the member.

Iris Scan—Yet another factor for use in determining a member's identity rating is whether or not the member is accessing the IDM system 1000 using a biometric iris scan. Iris scans typically record patterns in the iris. Each individual's iris patterns are unique. In some embodiments, an iris camera may be connected to the member's computing device (e.g., an iris camera connected to a laptop PC or mobile computing device). In other embodiments, an application may be downloadable to a member's computing device (e.g., tablet computer) and the camera technology of the computing device may be configured as an iris camera. In such an embodiment, the member may launch an application on the computing device, point the camera lens of the computing device at his or her eye, and then take a picture/scan of the member's iris. In this regard, there are a number of ways iris scan information may be used during login to increase or decrease the system's confidence in the identity of the member.

Facial Recognition Image—One factor for use in determining a member's identity rating is whether or not the member is accessing the IDM system 1000 using a biometric facial image (e.g., picture or video). Facial recognition typically measures and compares the structure, proportions, and shape of the face. Preferably but not necessarily, the technology measures and compares distance between the eyes, nose, mouth, jaw, eye sockets, sides of mouth, cheekbones, area of each facial characteristic, skin texture, and the like. Sometimes three dimensional images may be used in facial recognition imaging steps. In some embodiments, a camera may be connected to the member's computing device (e.g., a camera connected to a laptop PC or mobile computing device). In other embodiments, an application may be downloadable to a member's computing device (e.g., tablet computer) and the camera technology of the computing device may be configured as an image capture device. In such an embodiment, the member may launch an application on the computing device, point the camera lens of the computing device at his or her face, and then take a picture/scan/video. In this regard, there are a number of ways a facial recognition image may be used during login to increase or decrease the system's confidence in the identity of the member.

Voice Recognition—One factor for use in determining a member's identity rating is whether or not the member is accessing the IDM system 1000 using a biometric voice print. Voice recognition and/or voice print typically identify unique characteristics of a member's voice. In some embodiments, a member may be asked to speak a phrase or sentence into their computing device. In this embodiment, the IDM system 1000 may then analyze and/or compare the resulting speech and determine if the speech pattern matches that of the speech patterns stored in the system for the member. In this regard, there are a number of ways voice recognition and/or voice prints may be used during login to increase or decrease the system's confidence in the identity of the member.

Digital Signature—Another factor for use in determining a member's identity rating is whether or not the member is accessing the IDM system 1000 using a digital signature. As used herein, a digital signature is referring to a digital capture of a handwritten signature, and not an encrypted hash value. Preferably but not necessarily, a member may be asked to compose their signature into their computing device. Typically, the IDM system 1000 then analyzes and/or compares the resulting digital signature. In some embodiments, the member may then launch an identity verification application on the member's mobile device and sign in using, for example, a stylus or other writing utensil. In this regard, there are a number of ways a digital signature may be used during login to increase or decrease the system's confidence in the identity of the member.

Vein Scan—Still another factor for use in determining a member's identity rating is whether or not the member is accessing the IDM system 1000 using a biometric vein scan. Vein scans typically record vein patterns in a member's finger or hand. In some embodiments, a vein scanning device may be connected to the member's computing device (e.g., a vein scan camera connected to a laptop PC or mobile computing device). In other embodiments, an application may be downloadable to a member's computing device (e.g., tablet computer) and the camera technology of the computing device may be configured as a vein scan camera. In such an embodiment, the member may launch an application on the computing device, place his or her finger or hand on the computing device screen (or hover the finger or hand just above the camera lens), and then take a picture/scan. In this regard, there are a number of ways a vein scan may be used during login to increase or decrease the system's confidence in the identity of the member.

The following are a list of optional factors which may be used in adjusting a member's identity rating after the login process has begun. In some embodiments, a member's identity rating may increase during a session if behavior characteristics of the session match previously recorded behavior characteristics. In other embodiments, a member's identity rating may decrease during a session if behavior characteristics do not match previously-recorded behavior characteristics. Preferably but not necessarily, a member may train the IDM system 1000 to recognize their behavior characteristics. In one such example, a member may be instructed to type a collection of words and/or phrases to determine their keystroke dynamics (i.e., keystroke analysis is performed by the IDM system 1000). In another aspect of the IDM system 1000, the system records behavior characteristics during a live session. In other embodiments, certain behavior characteristics are not stored or measured during a live session if a member identity rating falls below a configurable threshold (e.g., not measuring behavior when the member is accessing the IDM system 1000 from a location other than the member's home or without biometrics during login). Preferably but not necessarily, the system terminates a peer-to-peer interaction if one of the member's session identity rating falls below a threshold (e.g., due to atypical behavior characteristics, or due to other factors). Optionally, the system warns the affected members of the pending session termination. The list below is meant to be exemplary and not intended to include every possible behavior characteristic.

Keystroke Dynamics/Patterns—One factor for use in determining a member's identity rating is the member's keystroke dynamics. Otherwise stated, a member's unique way of typing may be compared across sessions using sophisticated algorithms that are known in the art. In one embodiment, during a live session, the IDM system 1000 may compare the member's keystroke dynamics when words and/or phrases are detected by the session monitoring IDM system 1000. In this regard, there are a number of ways keystroke dynamics may be used during a live session to increase or decrease the system's confidence in the identity of the member.

Communication Methods—Another factor for use in determining a member's identity rating is the member's choice and frequency of communication methods. In some embodiments, a member primarily using "store and forward" types of communication (e.g., email) may be considered a lower risk than, for example, a real-time chat. In other embodiments, video conferencing may be considered a low risk form of communication because a member may visually confirm the identity of the caller/called party.

Suspicious Language/Phrases—Another factor for use in determining a member's identity rating is the member's composition style, as well as use of certain language and/or phrases. In one embodiment, a member employing profanity during a session may cause the member's session identity rating to fall. In another embodiment, a member employing language to entice a peer to meet face-to-face may cause the member's session identity rating to fall. Preferably but not necessarily, the use of certain language may cause one or more system alerts to be sent to a parent/guardian or IDM administrator. Optionally, the system may simply count occurrences and alerts, and/or adjusts the member's identity rating when a configurable threshold has been exceeded. In some embodiments, the IDM system 1000 may employ an algorithm based on one or a number of factors, including when to count a word or phrase as an event and when to assign a weighting to the event. Such factors may include, for example, a word or phrase, the age of the member, the threshold peer interaction identity rating assigned by the parent/guardian, the IDM system's learned member behavior, gender, and the like.

Language Style—Still another factor for use in determining a member's identity rating is the member's use of language dynamics/patterns, which may be compared across sessions. Such language dynamics/patterns include, for example, if the member typically uses abbreviations for certain words, phraseology, lexicons, and the like. In some embodiments, the system also detects frequently used misspellings. Preferably but not necessarily, the IDM system 1000 monitors the number of inconsistent word and/or style uses during a live session and if a count of inconsistent word/style uses by a member exceeds a configurable threshold, the member's identity rating is decreased. As discussed above, a pattern of language style may be developed for each member through continuous session monitoring.

In one embodiment, the IDM system rating server(s) 630 includes self-learning attributes. Preferably but not necessarily, the IDM system 1000 aggregates data from hundreds/millions of sessions across the multiple factors described above over time to further enhance the system's identity detection capabilities. For example, extensive analyses of discovered imposter sessions may be used to determine improved means of preventing future fraudulent access. Similarly, the IDM system 1000 may learn how the use of certain terms and/or language may detect certain personality characteristics which might be considered a threat to other individuals within the user group. Optionally, individuals which are deemed to be a threat may be removed from the system and/or trigger alarms to parents/guardians or system administrators/service provider personnel.

In another aspect of one embodiment, the IDM system 1000 contains a registration server(s) 640 which may be used to access the data store 690 to create, modify, and delete member accounts. Preferably but not necessarily, the IDM system 1000 includes user accounts and user supervisory accounts (e.g., guardian accounts). Optionally, the IDM system 1000 includes IDM system authorized personnel accounts used for administering and maintaining the IDM system and creating and/or supervising the creation of other types of accounts (e.g., user and supervisory accounts). Typically, users are able to modify their account/profile. However, in some embodiments users are restricted from modifying any or some attributes/parameters of their account.

In accordance with one version of the IDM system 1000, guardians/parents may modify attributes of their account and/or the associated user/member account(s). In one embodiment, member accounts may be created directly by members using a user data terminal 130 in a secure/authentication web session connected over a data network 400 or phone network 500 following authentication (610 server) to the registration server 640. In another embodiment, user accounts may be created at an authorized Identity Verification Site (e.g., a school, government office, retail store, and the like) ("IVS") with user data terminals 130 connected to the registration server 640 (optionally, following authentication) over an internal LAN. Preferably but not necessarily, user accounts are created only by authorized IDM system 1000 personnel at an IVS location. Usually, accounts may be deleted by members, parental sponsors, guardian sponsors, and authorized IDM personnel.

In some embodiments, the IDM system 1000 may contain record detail server(s) 650. This back-end server may be used to manage and record the massive amounts of data created by the myriad of call and data sessions (e.g., user, guardian, management, web, and the like). Optionally, the record detail server(s) compresses the data and/or stores the data in an organized manner in order for the IDM system 1000 to quickly access the data to perform timely authentication and rating analysis. The following is a list of example record details. The list is meant to be exemplary only and not intended to include every possible record detail or attribute/parameter of a session.

Authentication Login Detail Record—One record detail is the authentication login detail record which records known or determinable information associated with an attempted login (successful or not). The login record optionally includes: IP address, web page/Uniform Resource Locator ("URL") presented to the user, user name, number of attempts, if an invalid error message presented to the user, time and date of login, user device, user location, login biometrics used, identity rating assigned, proxy name, and the like. Preferably but not necessarily, the authentication login record is recorded after a failed or successful login.

Logout Detail Record—Another record detail is the logout detail record which records known or determinable information associated with a logout. The logout record optionally includes: IP address, method of logout (e.g., sign out, browser close, timeout), and the like.

Data Session Detail Record—Still another record detail is the data session detail record which records known or determinable information/data associated with an authenticated web session. The session detail record optionally includes: session start time and date, session end time and date, URLs, cookies, and the like. In this regard, there are numerous attributes (too numerous to list in this specification) associated with a web session which may be logged during and/or at the termination of a web session to record the session characteristics and the activities associated with the data session.

Call Detail Record—Yet another record detail is the call detail record which records known or determinable information/data associated with a call between two or more users within a data session. The call detail record optionally includes: time and date of the beginning and end of the call, called and calling party (if known), video used, how call was originated (e.g., number entered by user or use of contact record), answer, busy, ring-no answer, do-not-disturb, voice mail, and the like. In this regard, there are numerous attributes associated with a call which may be logged during and/or at the termination of a call in order to record the call characteristics and certain activities associated with the call.

Chat Detail Record—Another record detail is the chat detail record which records known or determinable information/data associated with a chat or instant messaging session between two or more users within a data session. The chat detail record optionally includes: time and date of the beginning and end of the chat, called and calling party (if known), video used, how the chat was originated (e.g., user name entered by user or use of contact record), answer, no answer, and the like. In this regard, there are numerous attributes associated with a chat session which may be logged during and/or at the termination of a chat session in order to record the chat session characteristics and certain activities associated with the chat session.

Messaging Detail Record—Still another record detail is the chat detail record which records known or determinable information/data associated with a messaging session (e.g., email, social network messaging, and the like) between two or more users within a data session. The message detail record optionally includes: mail recipient address, sender mail address, message routing information, return receipt, and the like. In this regard, there are numerous attributes associated with the receipt or delivery of an electronic message which may be logged in order to record the message and message characteristics.

In one embodiment, the IDM system 1000 contains monitoring server(s) 660. This type of back-end server may be used to manage and record to the data store information detected within a data session, for example a chat session or words and/or phrases used in a chat session. When using some settings, the monitoring server 660 only captures and stores certain types of data relevant to the IDM system 1000 (e.g., use of profanity, sexually-explicit material, and the like).

In some embodiments, the IDM system servers 600-660 described above may be centralized at a single location (e.g., in a service provider's centralized data center). In other embodiments, the servers may be geographically distributed in a number of different data center locations. The IDM system 1000 may sometimes be configured as a standalone system (e.g., an IDM system shared by a number of service providers) while in other situations the IDM system 1000 may be configured as a suite of services functioning as a virtual system that is integrated into a service provider's internal systems (e.g., those systems employed to provide user's online information and e-commerce services).

Preferably but not necessarily, the IDM system 1000 is connected to a data communication network 400 and a phone network 500. In some embodiments, the IDM system 1000 interconnects with the phone network 500 using standard telecommunication interfaces (e.g., ISDN or SS7) and via data communication networks using a secure router subsystem and a SMS server subsystem which optionally serves as a mail relay to transmit and receive SMS and MMS messages via a Short Message Service Center (e.g., an SMSC operated by a network carrier). In one configuration, the IDM system 1000 is realized in one or more service provider-owned data centers. In another configuration, the IDM system 1000 is realized by a service provider that is renting or leasing the processing and data storage services from a "cloud" computing provider. A "cloud" computing refers to accessing logical computational resources (data, software) via a computer network (through a WAN, Internet, or the like), rather than from a local computer or local server. The computational resources are typically located on server farms.

In one embodiment of the IDM system 1000, the system interconnects to one or more Social Networking System(s) ("SNS") 800 via the data network 400. SNS broadly refers to a group of individuals connected through a data network (e.g., Internet, WAN, LAN, or corporate network) interacting with fixed or mobile computing devices. Preferably but not necessarily, the IDM system 1000 acts as a proxy for data communication sessions which route through the IDM system enabling the IDM system to perform, for example, security and monitoring tasks described herein. Optionally, the IDM system 1000 is also interconnected to the SNS via a secure network 700. In some configurations, the secure network 700 is not accessible by the public. In other configurations, a secure/private data connection is implemented over a public data network using data communication security techniques (e.g., encryption). According to some implementations, the SNS is part of the IDM system 1000 and the features and functions of the SNS are realized as applications running on one or more of the IDM system servers 600-660 and using the IDM system data store 690.

In some configurations, the IDM system 1000 may interconnect to one or more external servers 900 hosting access to external data stores 910 (e.g., data bases). Optionally, the IDM systems 1000 may interconnect to the external data stores using the data network 400 and/or a secure network 700. Preferably but not necessarily, a secure/private data connection is implemented over a public data network using data communication security techniques (e.g., encryption). In one embodiment, the IDM system 1000 may access external data stores to facilitate certain tasks (e.g., security and monitoring tasks described herein). In such an embodiment, the IDM system 1000 may accesses an external data store to determine location information associated with GPS coordinates.

Figure 2:
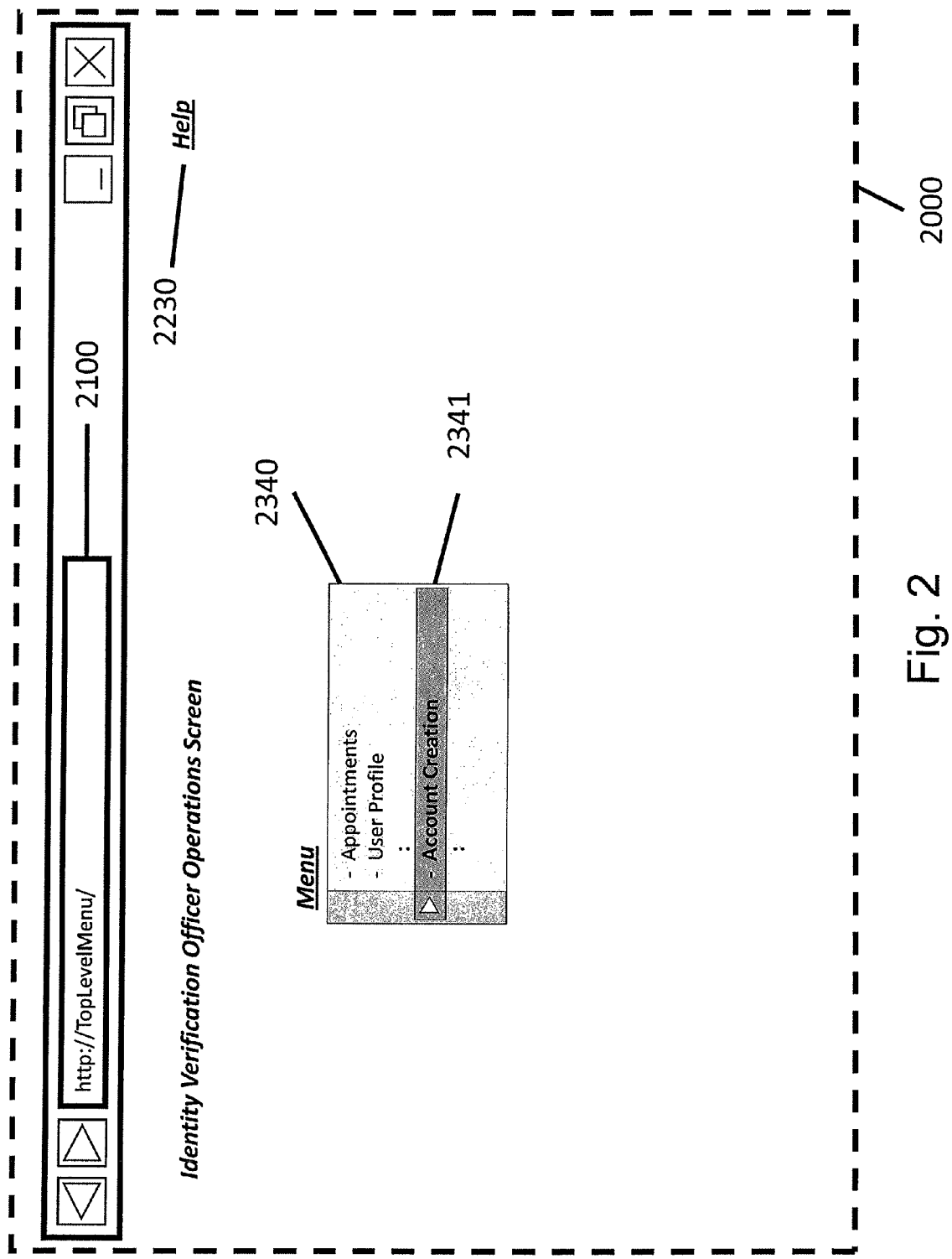
FIG. 2 illustrates an embodiment of an IDM administration user interface menu selection screen.

Referring now to FIG. 2, one embodiment of an IDM system administrator interface 2000 is presented via a browser (or other interface application) to a system administrator. The browser may be, by way of example only, and not by way of limitation, executed on a computer terminal 140, such as a PC, a Wireless Application Protocol ("WAP") or a browser-enabled phone 140, a PDA, or the like. According to one configuration of the IDM system administrator interface 2000, the web page may be accessed by selecting controls on other web pages to exit the system administrator to the top level screen or by supplying the appropriate URL to the browser 2100. Upon accessing this page, the IDM system 1000 may display a menu of selection controls 2340 which in this example enable the IVO to perform certain tasks (e.g., review/manage appointments, edit the IVO's profile, create user accounts, and the like). In this example, the system administrator has selected the "Account Creation" control 2341. Continuing with this example, the web page user interface for the IDM system 1000 also includes a "Help" web page control 2230 that when selected provides help information regarding the use of the system and or information provided by the system. Optionally, in response to the system administrator's selection of the "Help" control 2230, the system responds by displaying a collection of help web pages.

Figure 3:
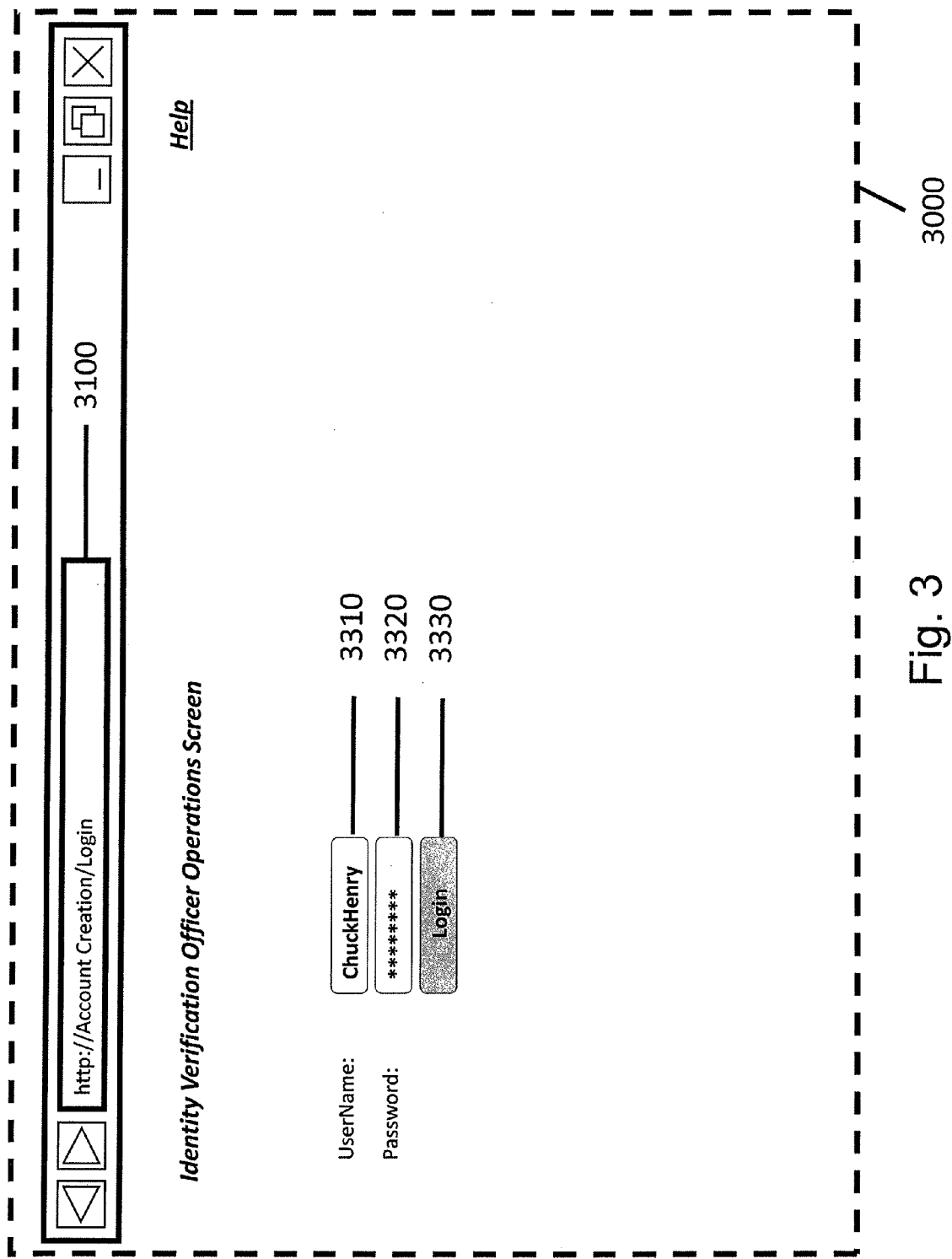
FIG. 3 illustrates an embodiment of an IDM administration user interface login screen.

As shown in FIG. 3, one embodiment of an IDM system user interface 3000 is presented via a browser (or other interface application) to a system administrator. The browser may be, by way of example only, and not by way of limitation, executed on a computer terminal 140, such as a PC, a WAP or browser-enabled phone, a PDA or the like. According to one configuration of the IDM system user interface 3000, the web page may be accessed by selecting the "Account Creation" control 2341 (see FIG. 2). Preferably but not necessarily, the web page may be accessed by supplying the appropriate URL to the browser 3100. The example system administrator login includes a user name entry field 3310 and a password entry field 3320. When the system administrator clicks on the "Login" control 3330, the entered user name and password are transmitted to the authentication server 610 over the secure local area network 400 for authentication.

Figure 4:
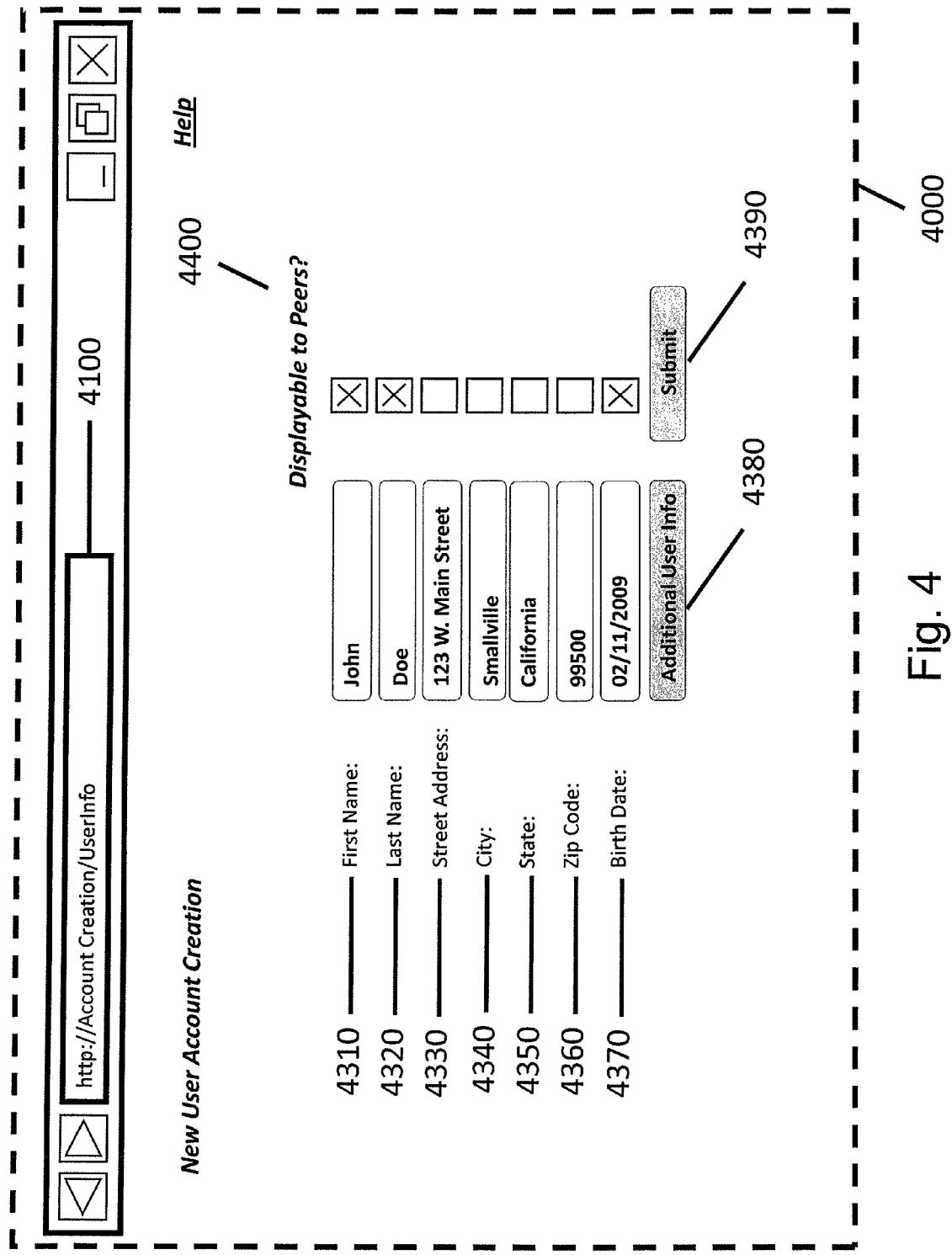
FIG. 4 illustrates an embodiment of an IDM administration user interface new user account creation screen.

As depicted in FIG. 4, an embodiment of an IDM system user interface 4000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page is accessed by selecting the "Account Creation" control 2341 (see FIG. 2) after the IVO/system administrator has logged in/authenticated. Preferably but not necessarily, the web page may be accessed by supplying the appropriate URL to the browser 4100 (this access method optionally may require the system administrator to first login by submitting a user name and/or password). In this example, the IVO/member enters in new member account information in the designated fields including name 4310, 4320, address 4330-4360, and birth date 4370. In this manner, the IDM web server 620 may provide a control to provide additional information regarding the new user 4380 (e.g., social security number).

In one embodiment of an IDM system user interface 4000, the user interface includes a control 4400 next to each item of personal information. If the control is checked, the information is displayed or displayable by a peer to the new account user. In this example, in response to the selection of the additional information control 4380, a fill-in new user information form is presented to the IVO/member with the information previously entered and temporarily or permanently stored. Continuing, the IDM web server 620 provides a "Submit" control 4390. In response to the selection of the "Submit" control, the IDM web server 620 of this embodiment error checks the entered data (e.g., syntax or home address not found errors) and then stores the data in the IDM data store 690 with the associated new user account. Preferably but not necessarily, the IDM web server 620 also generates a temporary user name and password.

Figure 5:
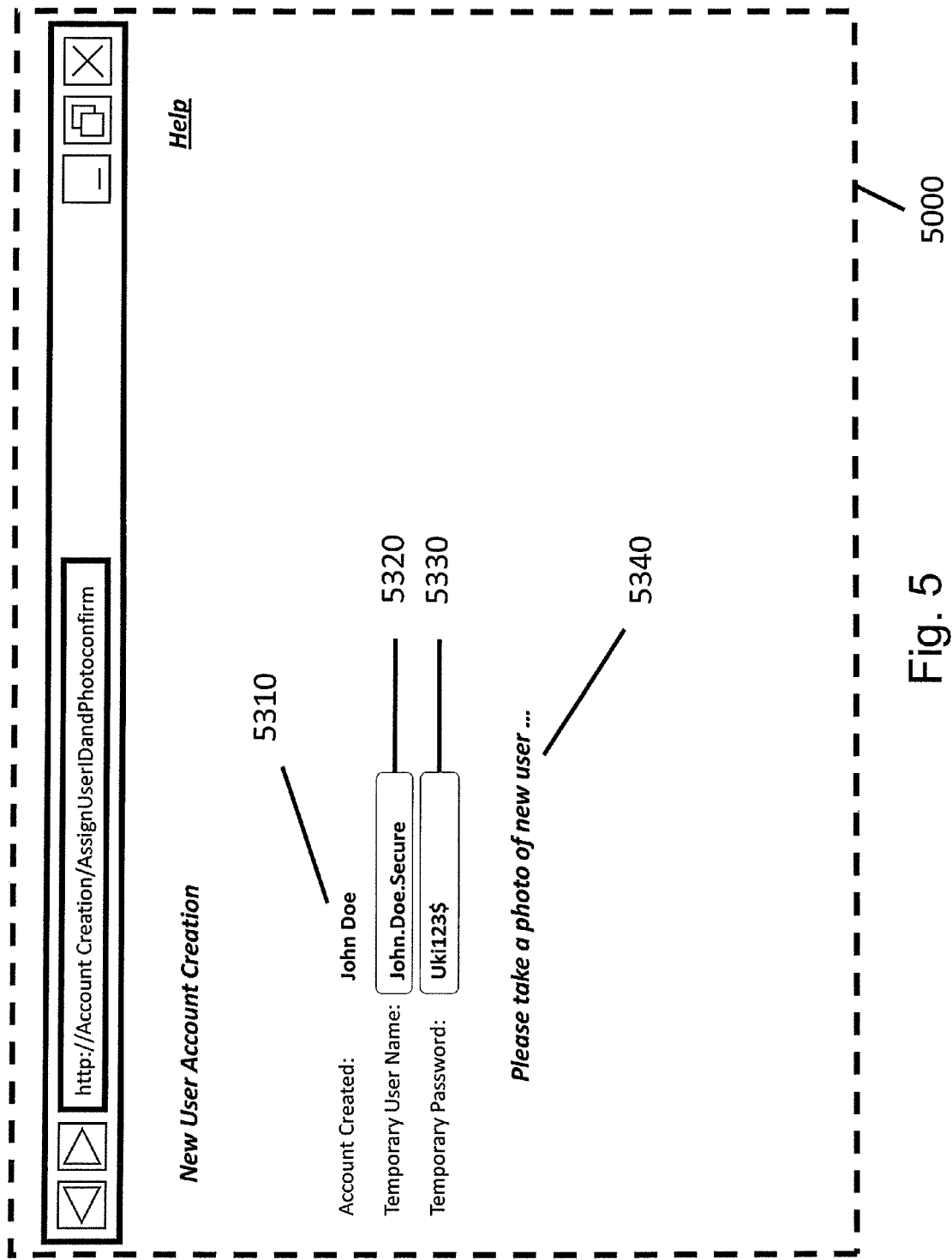
FIG. 5 illustrates an embodiment of an IDM administration user interface temporary user name and password assignment screen.

Referring now to FIG. 5, an embodiment of an IDM system user interface 5000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page may be accessed by selecting the "Submit" control 4390 (see FIG. 4) after the IVO/member has entered member profile information associated with the member. In another aspect of this embodiment, the IDM web server 620 or IDM registration server 640 displays the new account user's name 5310, the temporary user name 5320, and the temporary password 5330. Optionally, the IDM web server displays a message to the IVO/member to take a photograph of the new account member.

Figure 6:
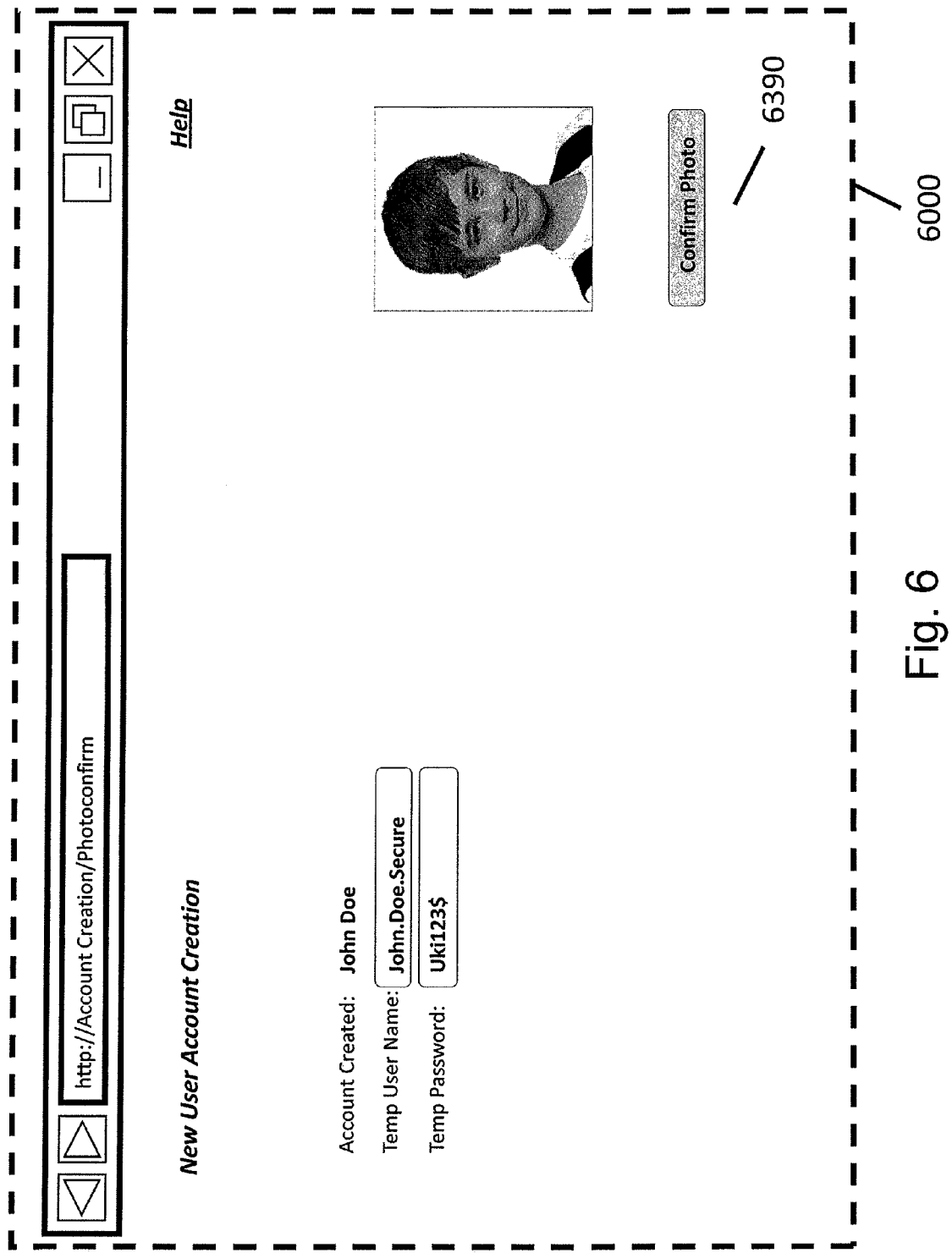
FIG. 6 illustrates an embodiment of an IDM administration user interface photograph upload confirmation screen.

As shown in FIG. 6, one embodiment of an IDM system user interface 6000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page may be accessed/displayed in response to the completion of a downloaded photo (e.g., by an IVO/member downloading a photo and/or attaching to photo using an "Attach" web control). Optionally, the IDM web server 620 includes in the display a "Confirm Photo" control 6390. Preferably but not necessarily, the "Confirm Photo" control causes the IDM web server 620 to store the photo in association with a new member account.

Figure 7:
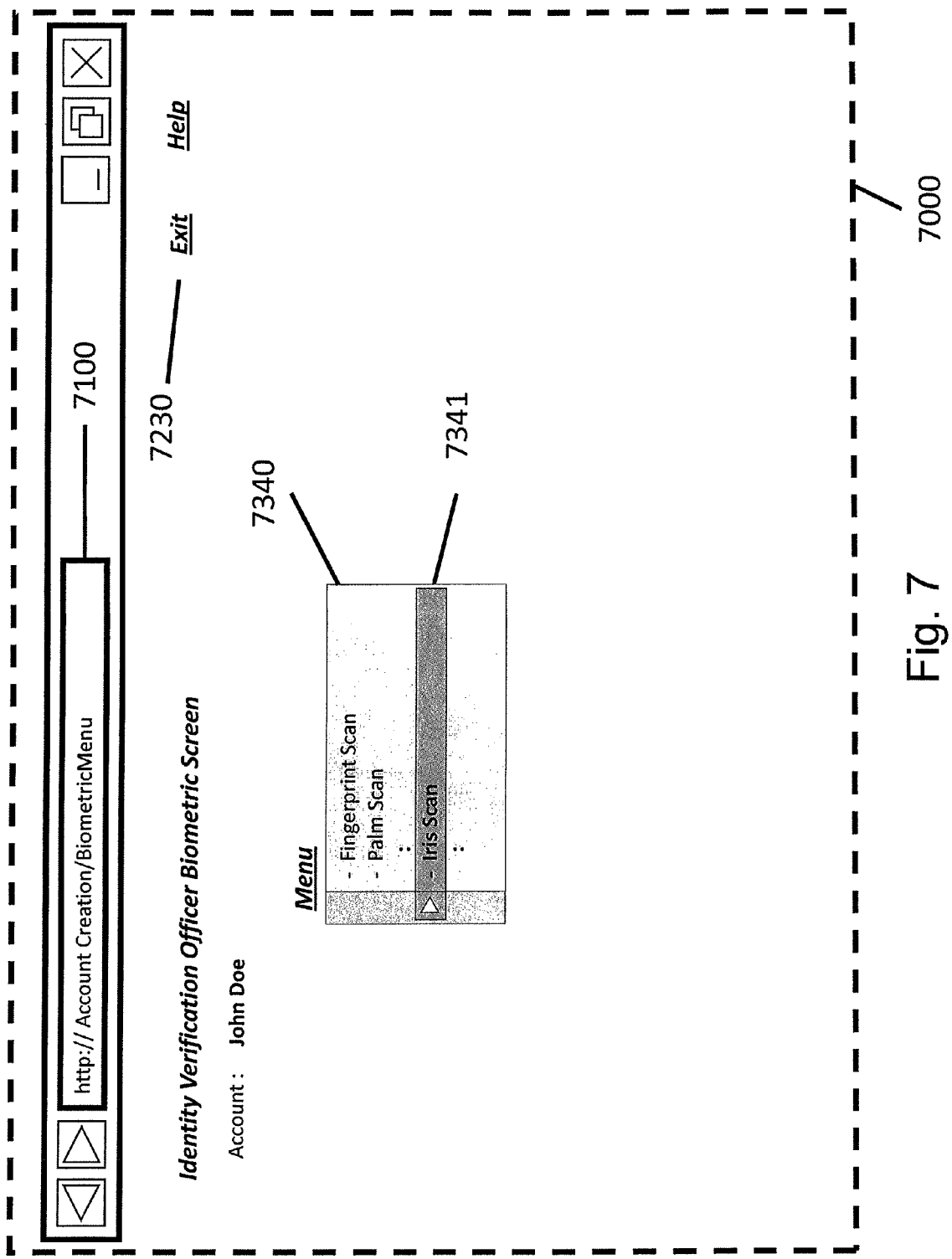
FIG. 7 illustrates an embodiment of an IDM administration user interface, new user, biometric capture selection screen.

As depicted in FIG. 7, one embodiment of an IDM system user interface 7000 is presented via a browser (or other interface application) to a system administrator. The browser may be, by way of example only, and not by way of limitation, executed on a computer terminal 140, such as a PC, a WAP, or browser-enabled phone, a PDA or the like. In some configurations, the web page may be accessed by selecting controls on other web pages to send the system administrator to the top level screen or by supplying the appropriate URL to the browser 7100 (after successful login). In other configurations, the web page may be accessed only after a biometric has been captured. Upon accessing this page, the IDM system 1000 displays a menu of selection controls 7340 which in this example enables the IVO to gather biometric data on the new member including, fingerprint scans, palm scans, iris scans, and the like. In this embodiment, the system administrator has selected the "Iris Scan" control 7341 which causes the IDM web server 620 to display a new web page (or web page element) and transitions into a wait state for the download/receipt of an iris scan. Continuing with this embodiment, the IDM web server 620 includes an "Exit" control 7230 in the display, which when selected by a system administrator, exits the new member account creation/biometrics capture screen.

Figure 8:
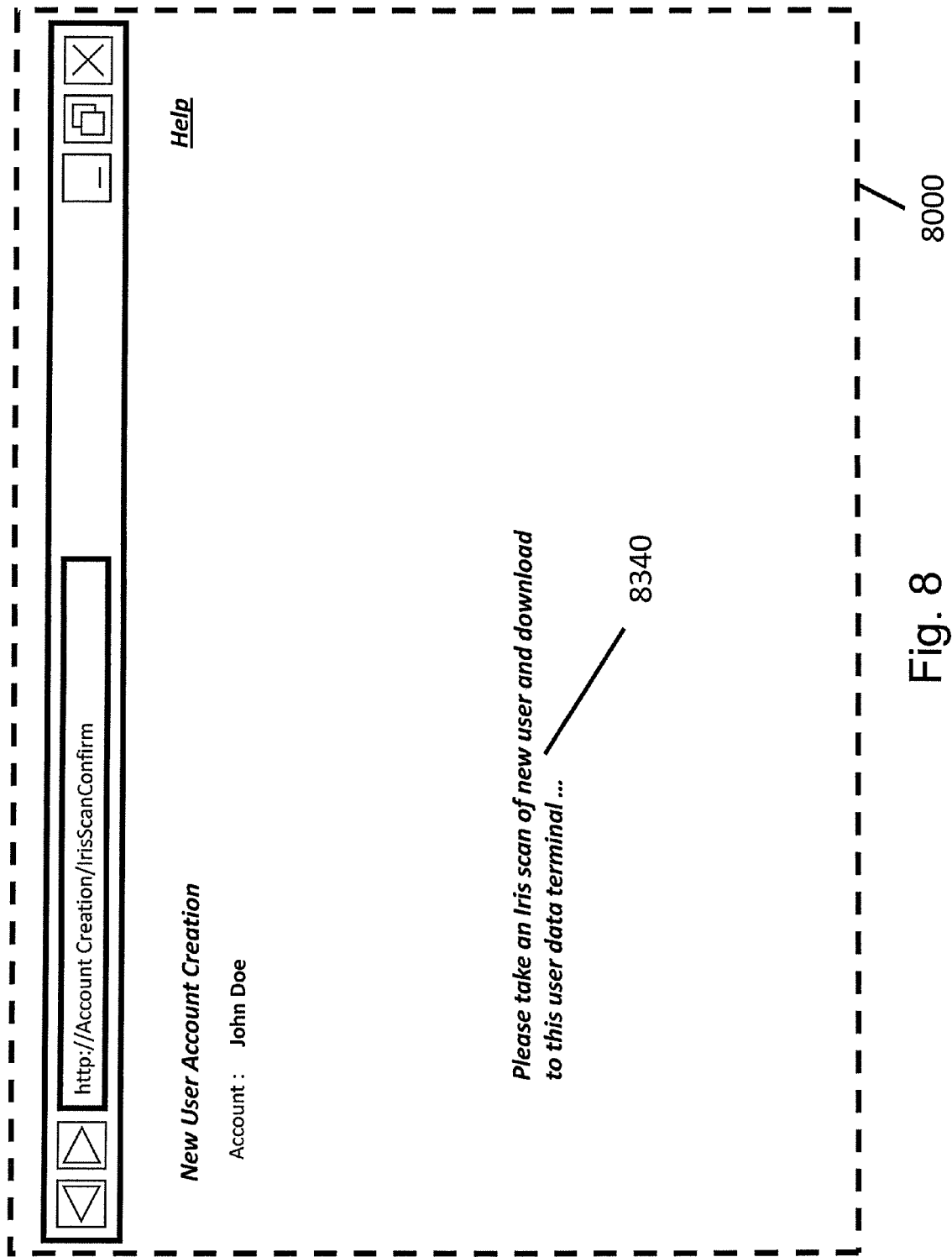
FIG. 8 illustrates an embodiment of an IDM administration user interface iris scan instruction screen.

Referring now to FIG. 8, an embodiment of an IDM system user interface 8000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page may be accessed by selecting the "Iris Scan" control 7341 (see FIG. 7). Optionally, the IDM web server displays a message to the IVO/member to take an iris scan of the new account member and download the scan to the data terminal.

Figure 9:
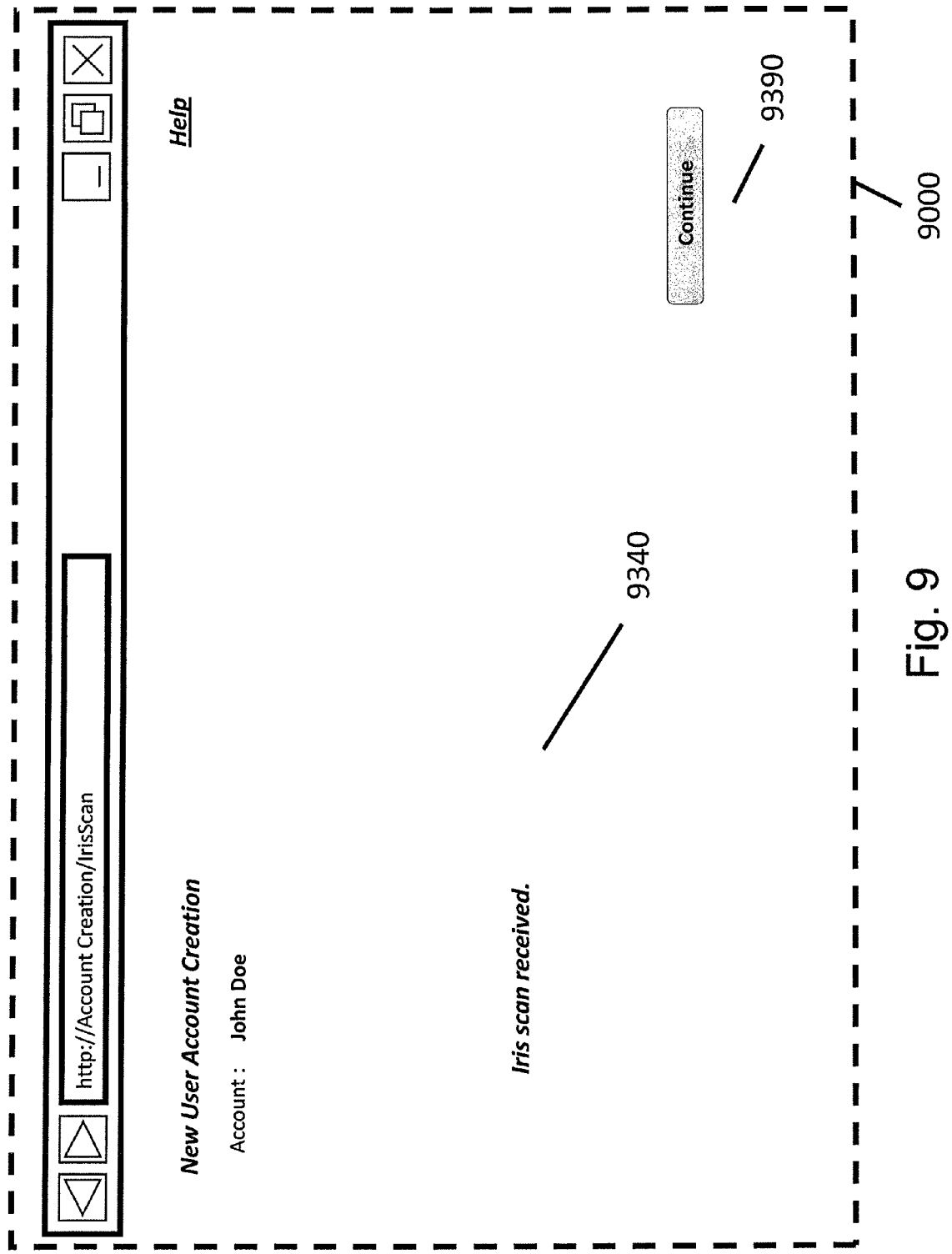
FIG. 9 illustrates an embodiment of an IDM administration user interface iris scan upload confirmation screen.

As shown in FIG. 9, one embodiment of an IDM system user interface 9000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page may be accessed/displayed in response to the completion of a downloaded iris scan (e.g., by an IVO/member downloading an iris scan and/or attaching an iris scan using an "Attach" web control). In another aspect of this embodiment, the IDM web server displays a message 9340 to the IVO/member after the iris scan has been downloaded to the data terminal. Optionally, the IDM web server includes a "Continue" control 9390 which, in this example, causes the IDM web server 620 to display the gather biometric data web page (see FIG. 7).

Figure 10:
FIG. 10 illustrates an embodiment of an IDM administration user interface security questions selection screen.

As illustrated in FIG. 10, one embodiment of an IDM system user interface 10000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page may be accessed/displayed in response to the selection of the "Exit" control 7230 on the capture biometric data web page (see FIG. 7). In another aspect of this embodiment, the IDM web server displays a listing of twenty questions of which fifteen need to be answered by the member at the IVS. In this example, four possible answers are displayed for each question. Once a correct answer is identified by the member, the IVO selects the check-box control adjacent to the answer. Preferably but not necessarily, the IDM web server receives the control and determines if the answer is correct before accepting another web control request (e.g., answering another question). Continuing with this example, the web display includes a "Scroll" control 10200 which enables an IVO/member to access additional questions not displayable in the limited screen space. Optionally, the display includes a "Submit" control 10340 which when selected by an IVO/member stores the answered fifteen questions in association with the new member account.

Referring now to FIG. 11, an embodiment of an IDM system user interface 11000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page may be accessed/displayed in response to the selection of the "Submit" control 10340 on the twenty-question web page, see FIG. 10. In another aspect of this embodiment, the IDM web server 620 displays a list of potential identity credentials 11310 a member brought to the verification session (e.g., social security card, birth certificate, passport, government issued ID, driver's license, school or educational institution issued ID, and the like). Typically, the IVO selects the box next to the credentials which were verified in the session. The more identify credentials (i.e., identification components) that the member brings to the verification session, the higher the member's identity rating is likely to be. Additionally, some types of identify credentials may provide higher identity rating due to their nature or source of origin (e.g., a passport provides a very high rating because it is issued by the federal government and has a photograph incorporated, a birth certificate provides a high rating because it is issued by the government but it does not incorporate a photograph, school issued ID provides a medium rating because it is issued by a school but it does (typically) incorporate a photograph, and the like).

Continuing in this example, the IDM web server 620 again displays a list of potential identity credentials 11320 a parent/guardian brought to the verification session (e.g., social security card, birth certificate, passport, and the like). Again, the IVO typically selects the box next to the credentials which were verified in the session. Preferably but not necessarily, the IDM web server may include an "Options" control 11330 which, in this example, causes the IDM web server 620 to display a menu of options including, for example, an option to select a second parent's list of credentials, and the like. In some embodiments, the IDM web server 620 includes a "Submit" control 11340 which stores the selected verified credential information associated with the member and/or parent/guardian account.

Figure 12:
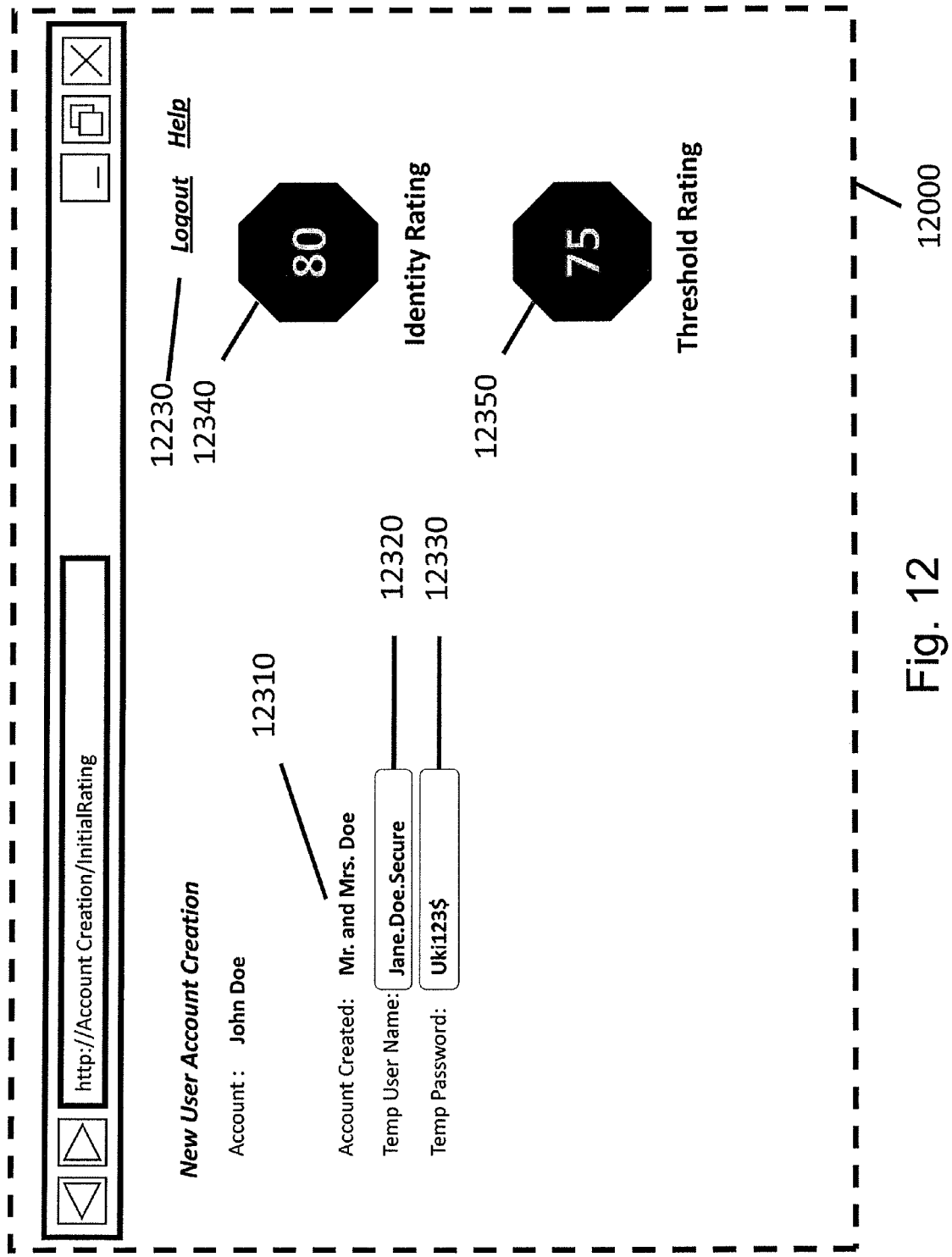
FIG. 12 illustrates an embodiment of an IDM administration user interface initial and threshold identity rating display.

As shown in FIG. 12, one embodiment of an IDM system user interface 12000 is presented via a browser (or other interface application) to a system administrator. The browser may be, by way of example only, and not by way of limitation, executed on a computer terminal 140, such as a PC, a WAP or browser-enabled phone, a PDA or the like. In some configurations, the web page may be accessed/displayed in response to the selection of the "Submit" control 11340 on the credential list verification web page (see FIG. 11). In another aspect of this embodiment, the IDM web server 620 or IDM registration server 640 displays a new parent/guardian account user name 12310, temporary user name 12320, and temporary password 12330. In this example, the IDM web server 620 displays the new member account identity rating 12340. Continuing in this example, the IDM web server web page includes a "Threshold Rating" control 12350. The IVO may adjust the threshold rating higher or lower if the parents feel the rating is too high or too low (e.g., by editing the number displayed). In some embodiments, the IDM web server web page includes a "Logout" control 12230, which if selected by the IVO/member, will terminate the current web session.

Figure 13:
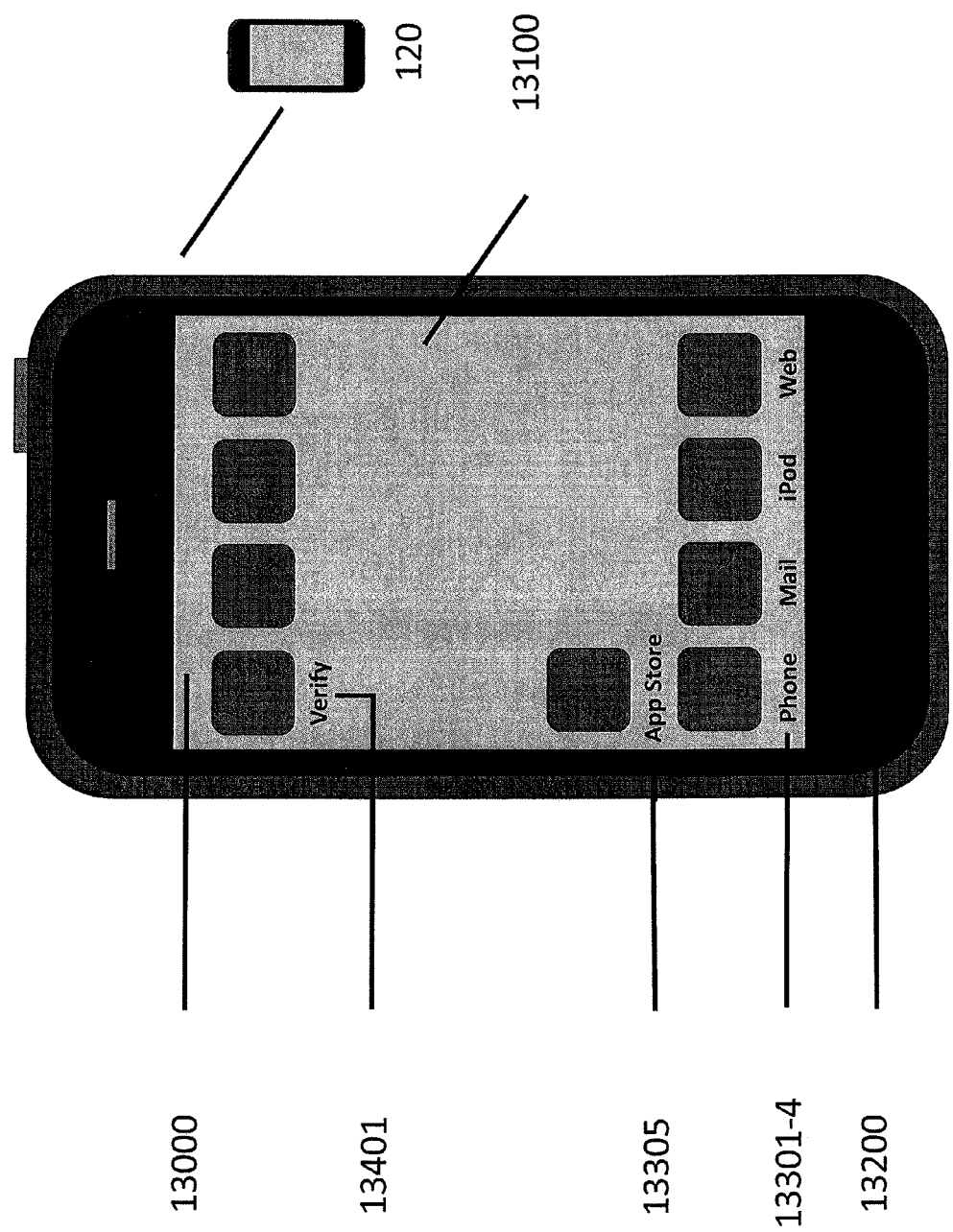
FIG. 13 illustrates an embodiment of a smartphone user interface with the IDM system application icon, "Verify."

As depicted in FIG. 13, one embodiment of a mobile smartphone device 120 is shown that runs various member-selected application programs 110. Preferably but not necessarily, the mobile device display 13000 identifies one or more of the software applications previously pre-installed at the time of purchase or downloaded by the member. In another aspect of this embodiment, the mobile device displays member downloaded software applications 13401 and preinstalled or fixed applications 13301-13304. Continuing in this embodiment, the mobile device displays an "Icon/Member Interface" control 13305 that may be selected by the member to access a marketplace/store to access free and paid downloadable applications to the member's mobile device.

In this disclosed embodiment, the list of applications in the figure includes the IDM Verify application 13401 described in the first and second example embodiments below. Preferably but not necessarily, the mobile device illustrated includes a touch sensitive screen 13100 which enables a member to open, close, and navigate applications/services with a touch or stroke of a finger. In some embodiments, the mobile device display 13000 in FIG. 13 also includes a "Home button" user control 13200 which when selected by the member exits any open mobile device application.

Figure 14:
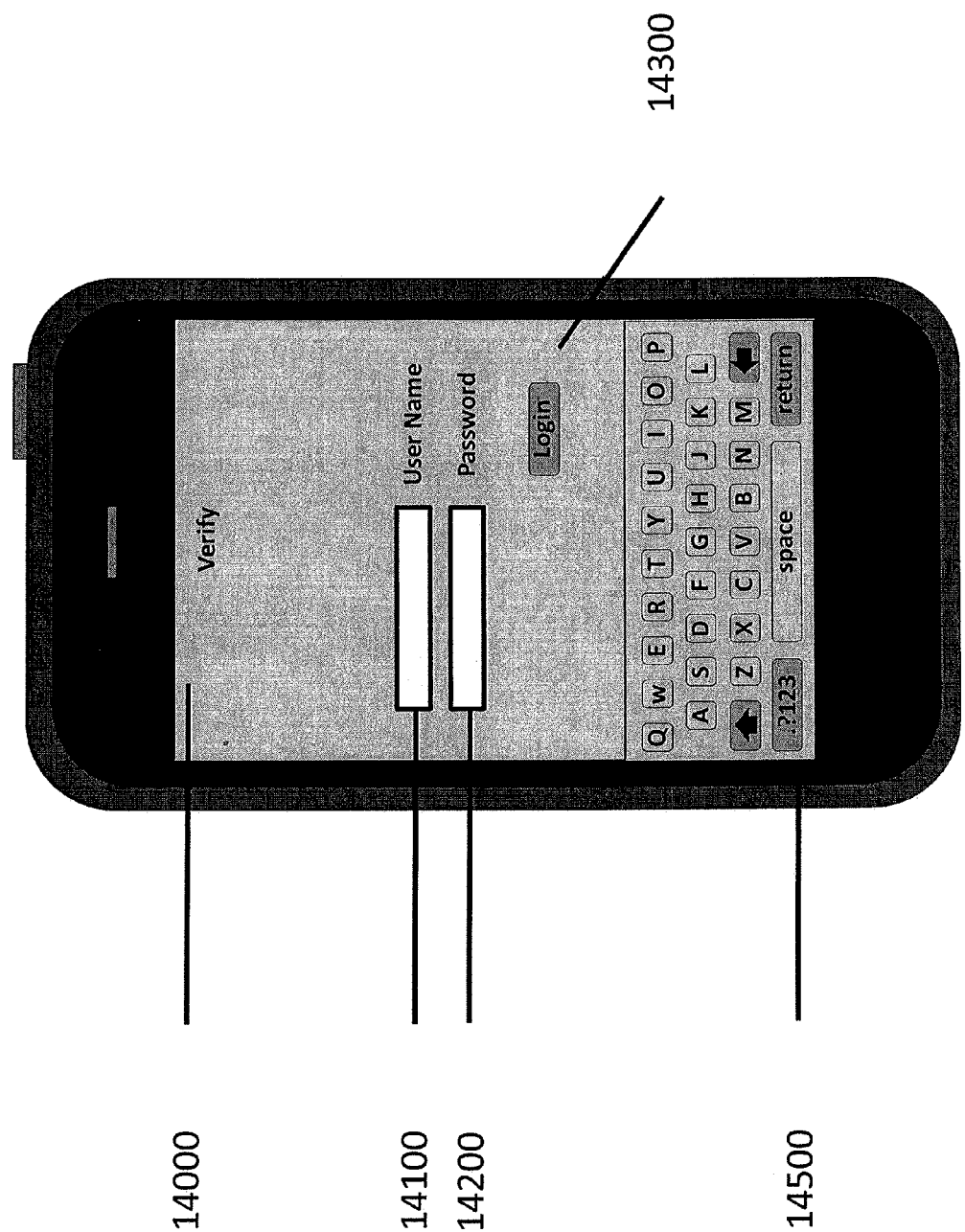
FIG. 14 illustrates an embodiment of a smartphone application display requesting user name and password entry.

Referring now to FIG. 14, an embodiment of a mobile device 110 is illustrated as well as an application presentation following a member selection of the verify application icon 13401 (see FIG. 13). In this embodiment, the IDM Verify application user interface screen 14000 displays a user name text field 14100 and a password text field 14200. In other embodiments, the application displays a soft key pad 14500 which may be used to enter text in the text fields. In another aspect of this embodiment, the IDM Verify application user interface screen also includes a "Login" control 14300 which when selected by a member validates the entered user name and password, typically by sending the entered data to the IDM authentication server and/or other IDM server.

Figure 15:
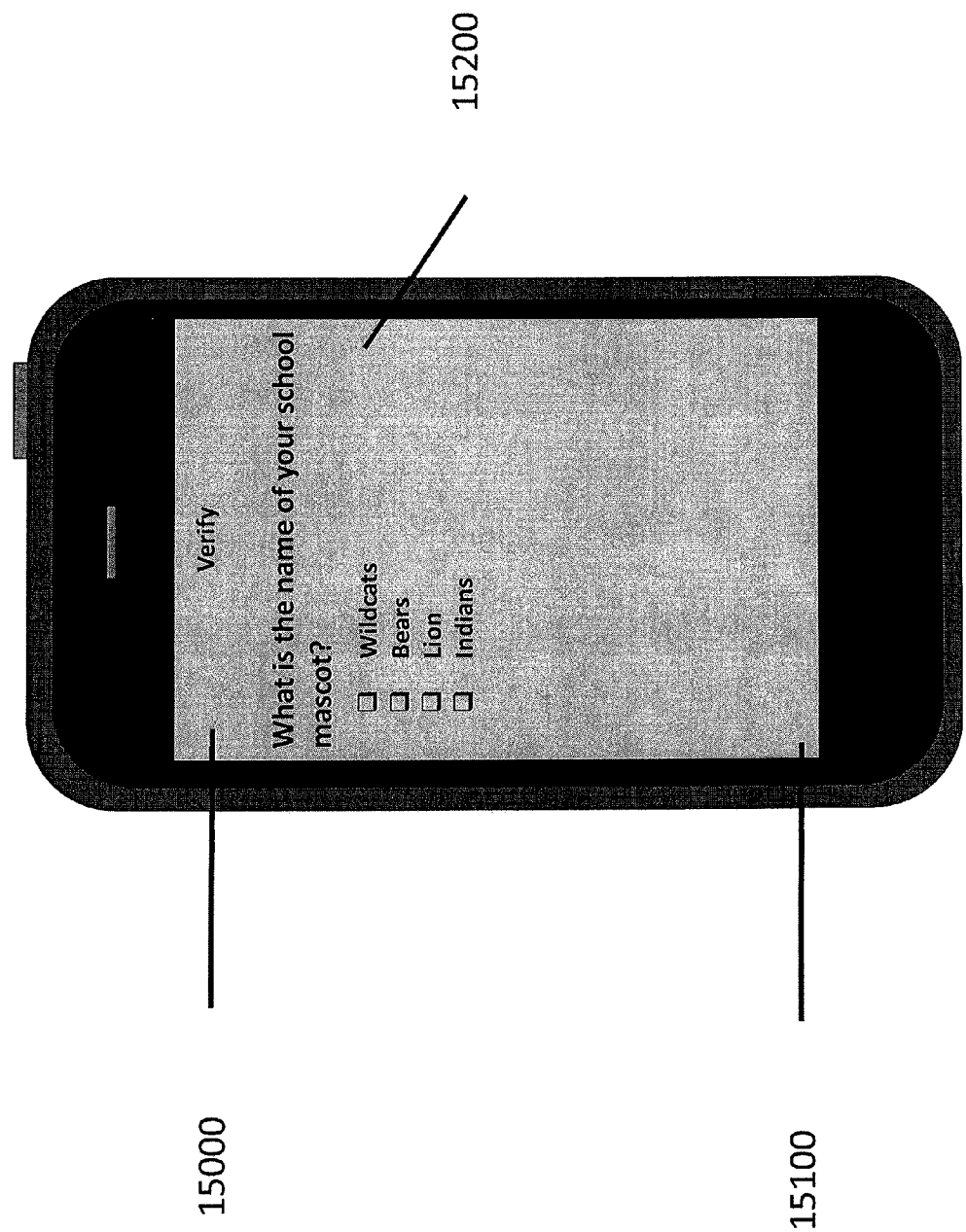
FIG. 15 illustrates an embodiment of a smartphone application display depicting the display of a security question.

As shown in FIG. 15, one embodiment of a mobile device 110 is illustrated, as well as an application presentation following a member selection of the "Login" control 14300 (see FIG. 14) in which the user name and password entered were valid. In this embodiment, the IDM Verify application user interface screen 15000 displays a question and a series of potential answers 15200. Preferably but not necessarily, the member may select one of the boxes/controls next to the displayed answers (e.g., touching the box) to indicate to the IDM Verify application an answer selection. Optionally, the IDM verify application prompts the member to confirm the selected answer (not shown).

Figure 16:
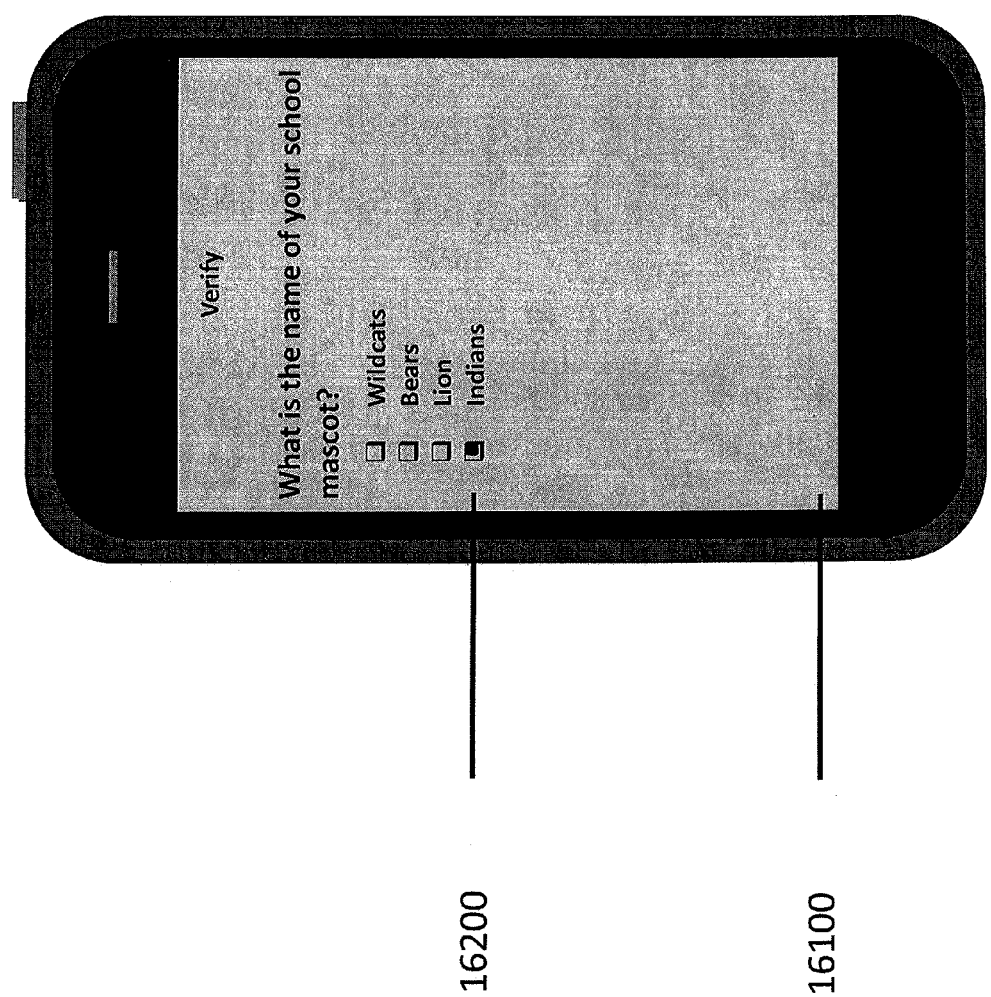
FIG. 16 illustrates an embodiment of a smartphone application display depicting a user selection of an answer to a security question.

As depicted in FIG. 16, one embodiment of a mobile device 110 is illustrated, as well as an application presentation following a member selection of an answer to a question 15200 (see FIG. 15). In some configurations, the selected answer box 16200 in the application screen 16100 is darkened in response to the member selection.

Figure 17:
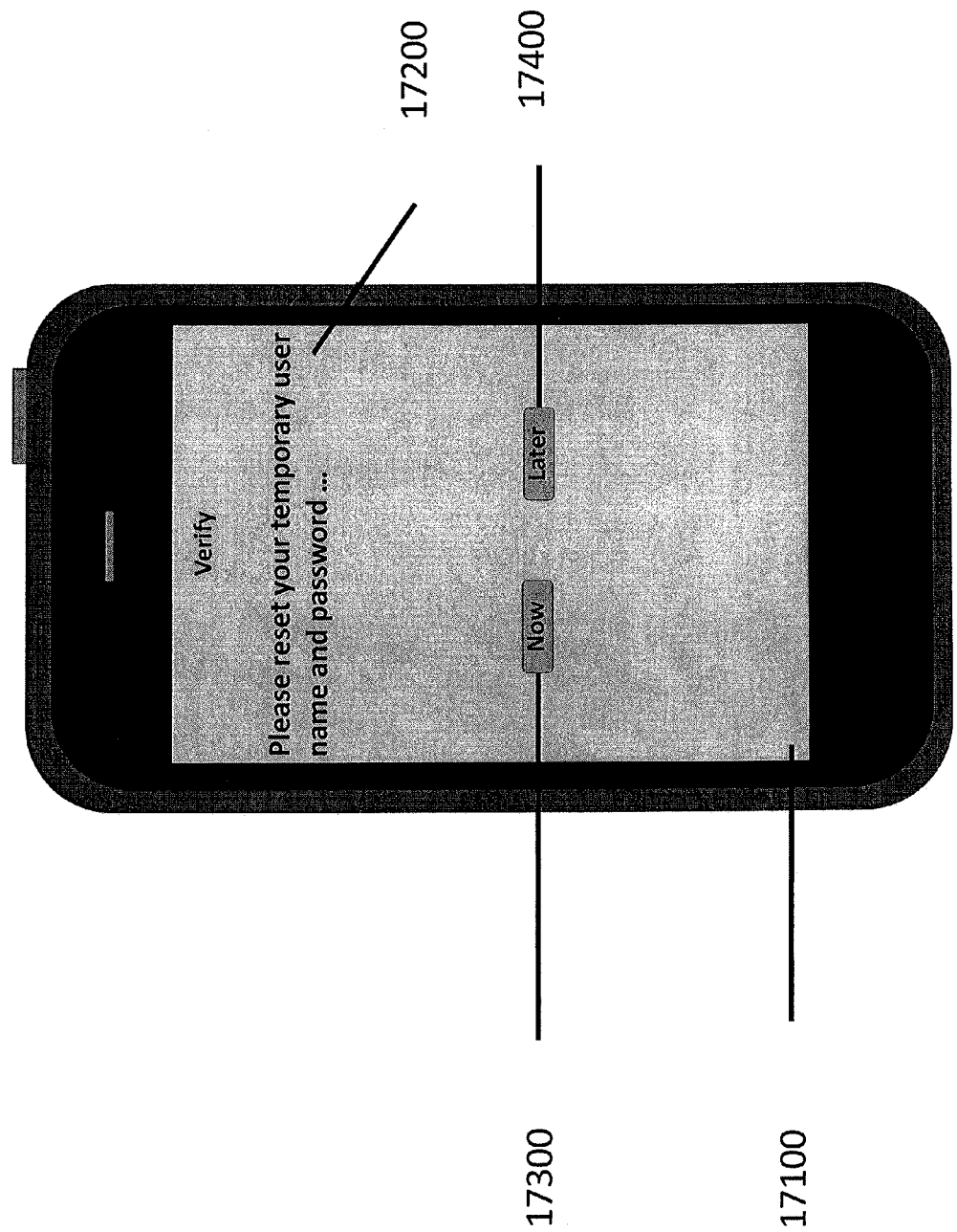
FIG. 17 illustrates an embodiment of a smartphone application display depicting a display requesting the user to reset their temporary user name and password.

Referring now to FIG. 17, an embodiment of a mobile device 110 is illustrated, as well as an application presentation following a member selection of an answer 16200 (see FIG. 16). In this embodiment, the text display 17200 displayed on the user interface screen 17100 reminds the member that they have a temporary user name and password and that they should change their login credentials. In another aspect of this embodiment, the IDM Verify application user interface display includes a "Now" control 17300 and a "Later" control 17400. Preferably but not necessarily, a member selecting the "Now" control 17300 is prompted to enter a new user name and password. In this regard, a member selecting the "Later" control 17400 is electing to skip the user name and password reset procedure.

Figure 18:
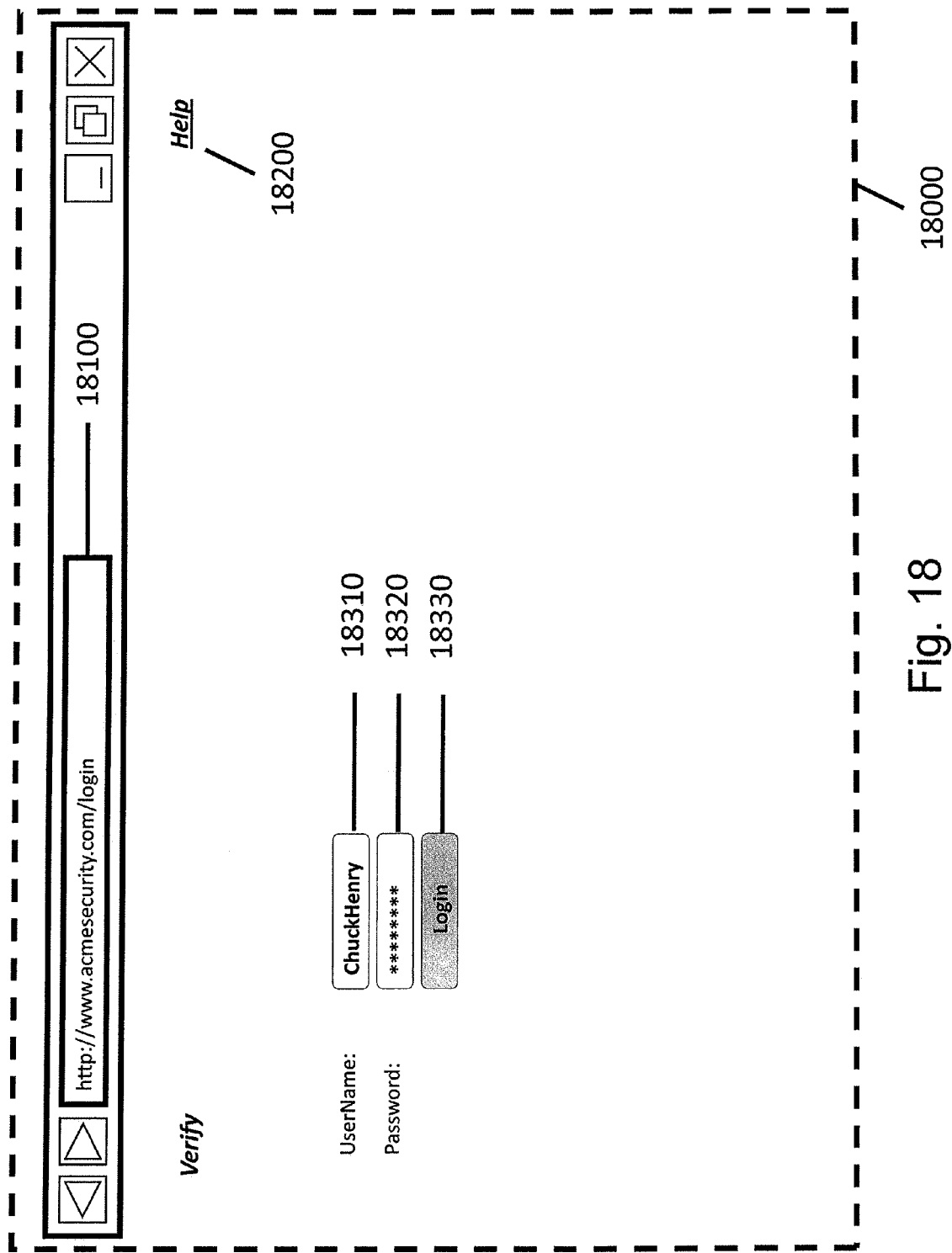
FIG. 18 illustrates an embodiment of an IDM user interface user login screen.

As shown in FIG. 18, one embodiment of an IDM system user interface 18000 is presented via a browser (or other interface application) to a member. The browser may be, by way of example only, and not by way of limitation, executed on a computer terminal 130, such as a PC, a WAP or browser-enabled phone, a PDA or the like. In some configurations, the login web page may be accessed by supplying the appropriate URL 18100 to the browser, by selecting a link in response to a search query, or the like. In this embodiment, the user login includes a user name entry field 18310 and a password entry field 18320. Typically, when the member clicks on the "Login" control 18330, the entered user name and password are transmitted to the web server 620 over the data network 400 for authentication.

Figure 19:
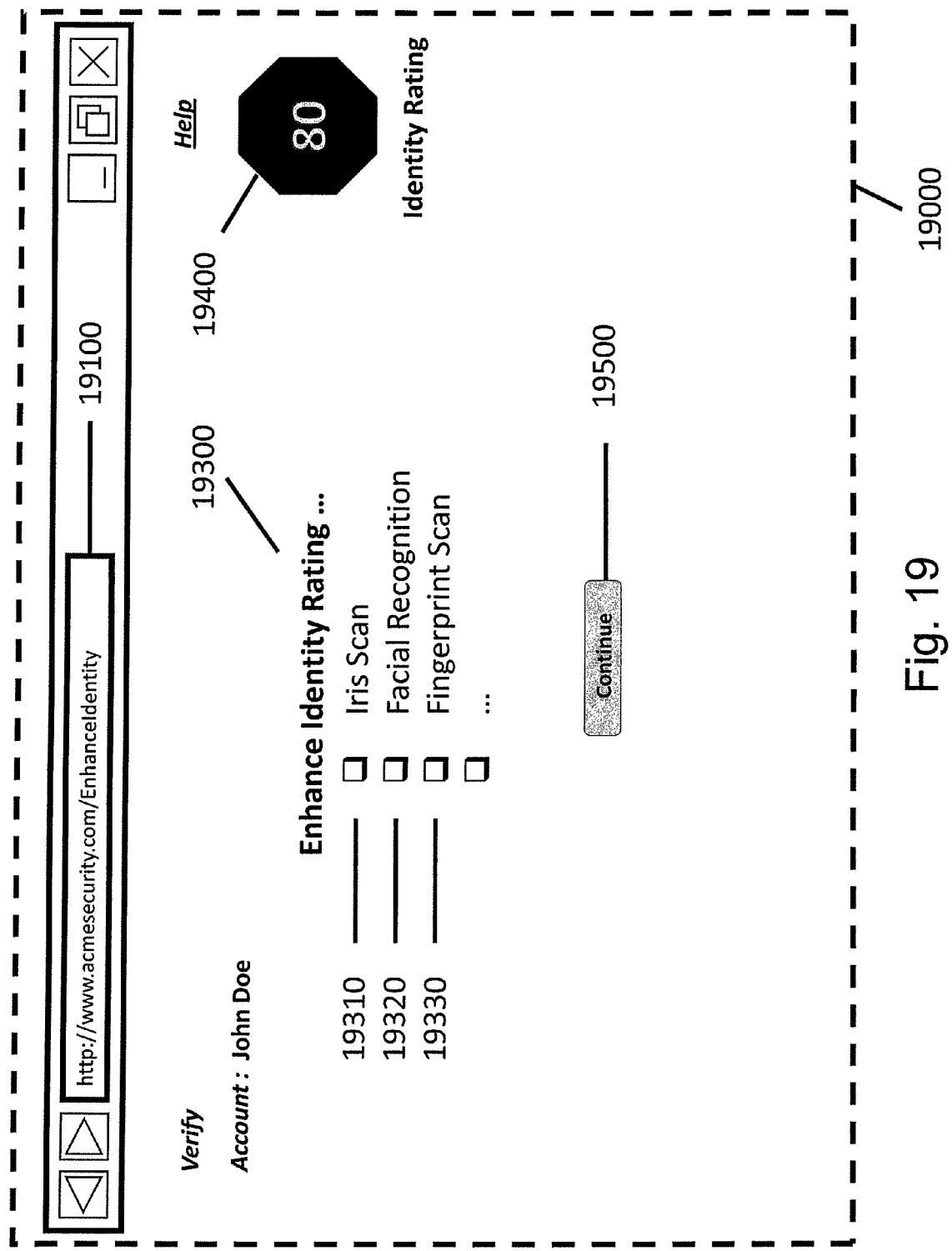
FIG. 19 illustrates an embodiment of an IDM user interface depicting a menu of means for enhancing a user's session identity rating.

As depicted in FIG. 19, one embodiment of an IDM system user interface 19000 is presented via a browser (or other interface application) to a member. The browser may be, by way of example only, and not by way of limitation, executed on a computer terminal 130, such as a PC, a WAP or browser-enabled phone, a PDA or the like. In some configurations, the login web page may be accessed by supplying the appropriate URL 19100 to the browser, by selecting a link in response to a search query, or the like (but requires a valid user name and password entry prior to accessing this page). In another aspect of this embodiment, web pages may be accessed via direct URL entry into the browser, by selecting a link in response to a search query, or the like. This method of access to the browser-based web pages is the same throughout the IDM system 1000 unless otherwise stated, and as such, is not repeated with respect to the figure descriptions below.

In some configurations, the user interface 19000 may be accessed by a member entering a valid user name and password followed by the "Login" control 18330 (see FIG. 18). The disclosed user interface includes an identity rating 19400 which displays the current member session identity rating. Preferably but not necessarily, the user interface web page display includes a menu of options 19300 that a member may select to improve their current member session identity rating. An exemplary menu of options 19300 includes an Iris Scan option 19310, a Facial Recognition option 19320, and a Fingerprint Scan option 19330. Optionally, the user interface includes a "Continue" control 19500 which enables a member to skip selecting additional identity enhancement options.

Figure 20:
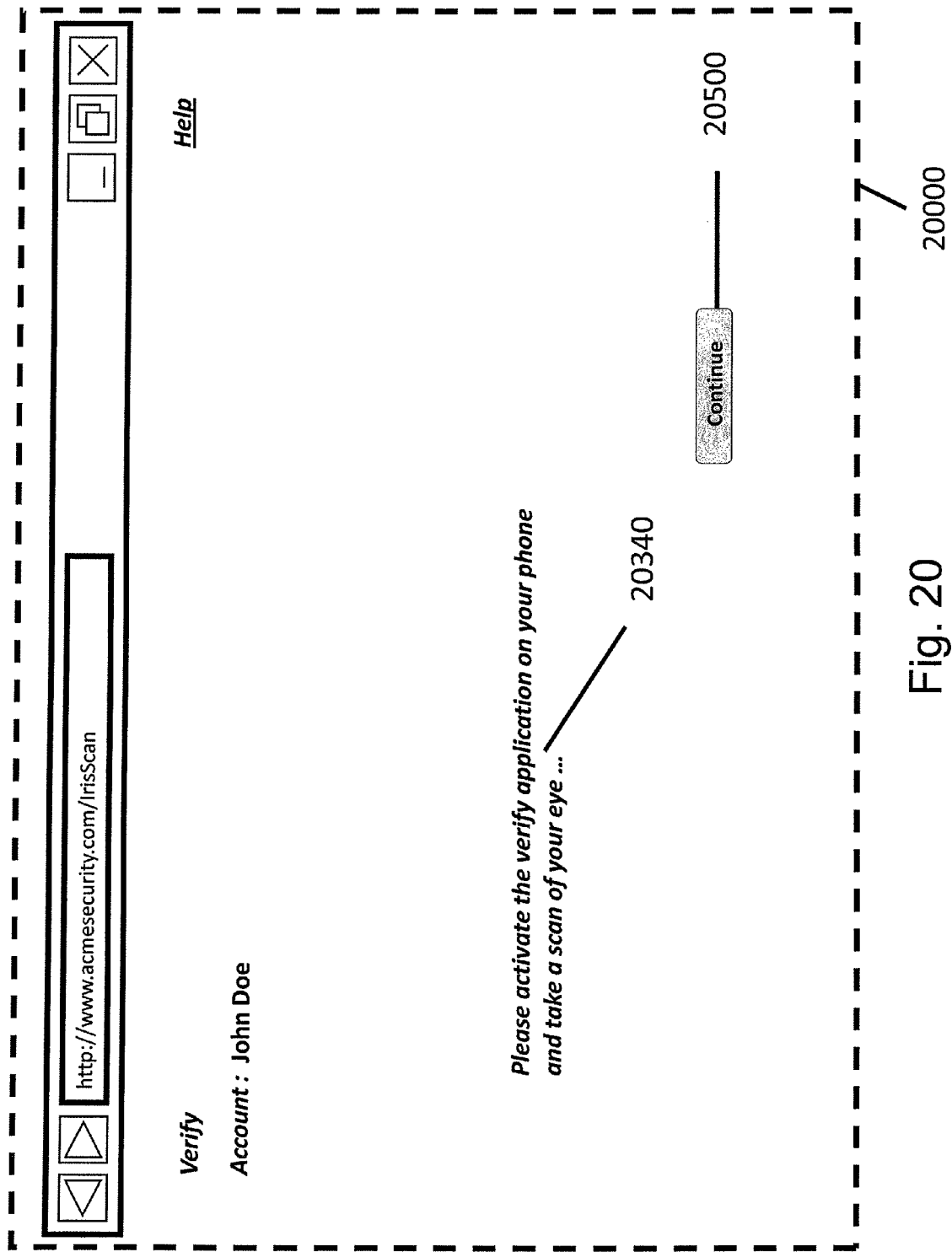
FIG. 20 illustrates an embodiment of an IDM user interface depicting user instructions for capturing an iris scan.

Referring now to FIG. 20, an embodiment of an IDM system user interface 20000 is presented via a browser (or other interface application) to a member. The browser may be, by way of example only, and not by way of limitation, executed on a computer terminal 130, such as a PC, a WAP or browser-enabled phone, a PDA or the like. In some configurations, the web page is accessed by selecting the "Iris Scan" control 19310 (see FIG. 19). In this embodiment, the user interfaces with the IDM web server 620 that displays a message to the member to launch an Iris scan verification application on their phone and take a picture/scan of their eye. In another aspect of this embodiment, there is a "Continue" control 20500 which when selected by a member checks to see if the iris scan taken is valid and matches that of the member, and if so, logs the member into their account.

Figure 21:
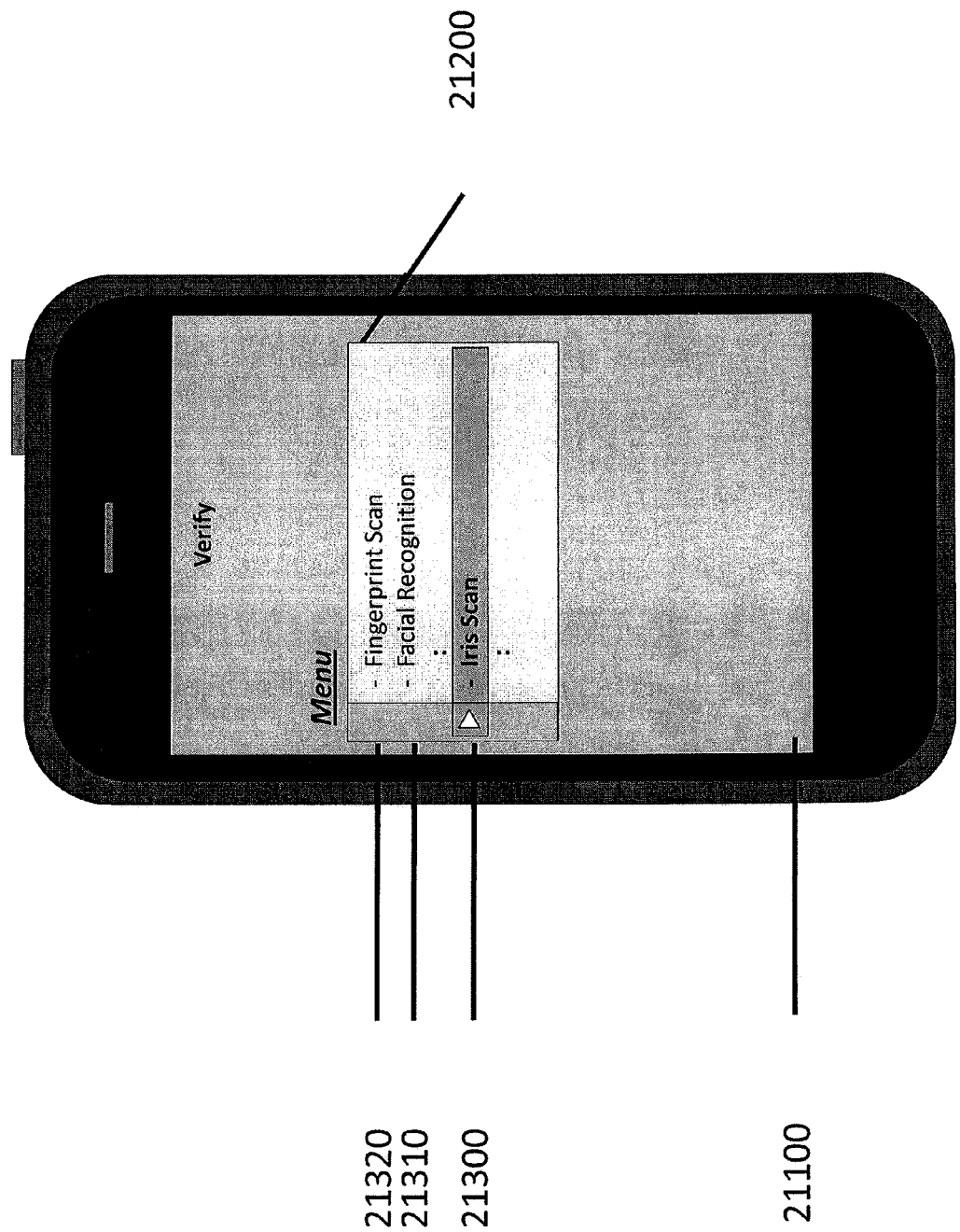
FIG. 21 illustrates an embodiment of a smartphone application depicting a menu of biometric identity verification options.

As shown in FIG. 21, one embodiment of a mobile device 110 is illustrated, as well as an application presentation 21100 following a member launching a verify application on their phone 13401 (see FIG. 13). In one configuration, the verify application determines that the member is "logged in" on another device and the member wishes to increase the current session identity rating using, for example, a biometric. In this embodiment, the IDM Verify application displays a menu of options 21200 including an Iris Scan option 21300, a Facial Recognition option 21310, a Fingerprint option 21320, and others.

Figure 22:
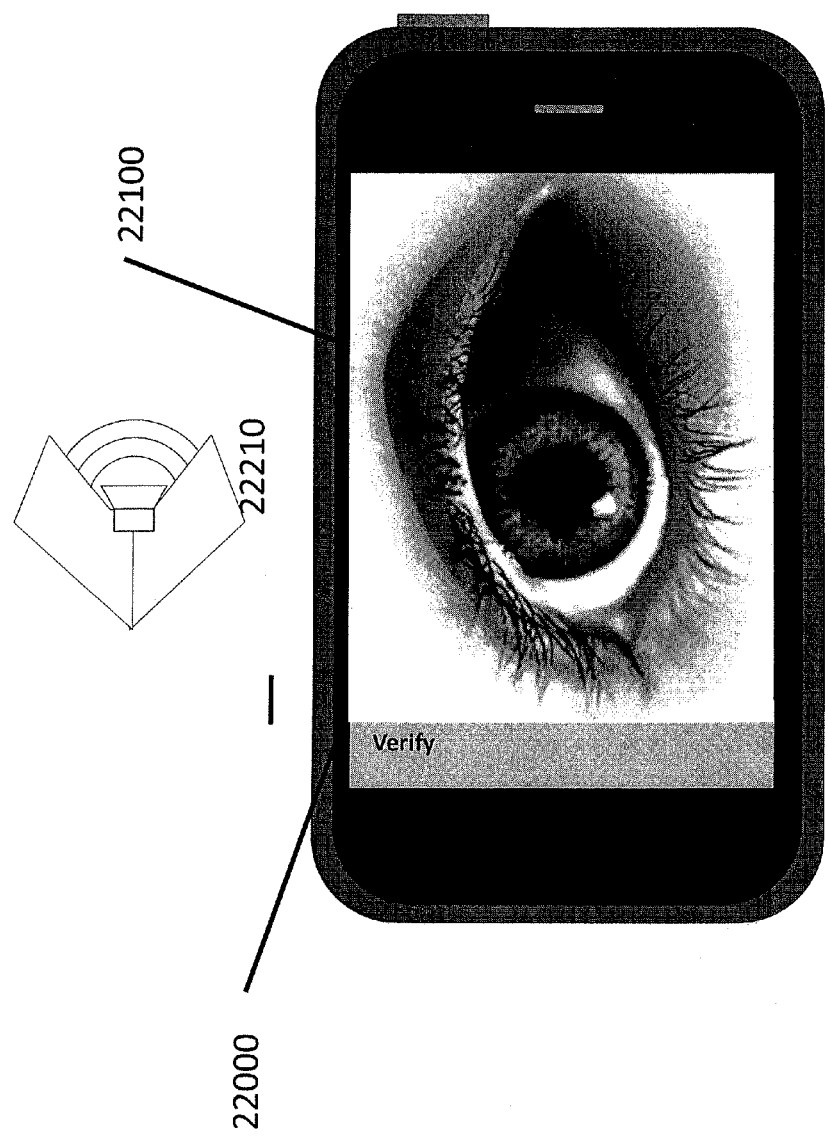
FIG. 22 illustrates an embodiment of a smartphone IDM application display in iris scan image capture mode.

As depicted in FIG. 22, another embodiment of a mobile device 110 is illustrated, as well as an application presentation 22000. In this configuration, the screen is displayed/accessed in response to a user selecting the Iris scan option 21300 (see FIG. 21). In another aspect of this embodiment, the application indicates to the member that the mobile device is in camera picture taking mode. The mobile device displays on the user interface screen the view through the camera lens 22100 of the image that would be captured if the user were to select a soft key/control. In this embodiment, the IDM Verify application automatically takes the picture so a control is not required. Optionally, the IDM Verify application program audibly 22210 provides the user with additional user guidance or plays an alert (e.g., tone) when an image has been captured.

Figure 23:
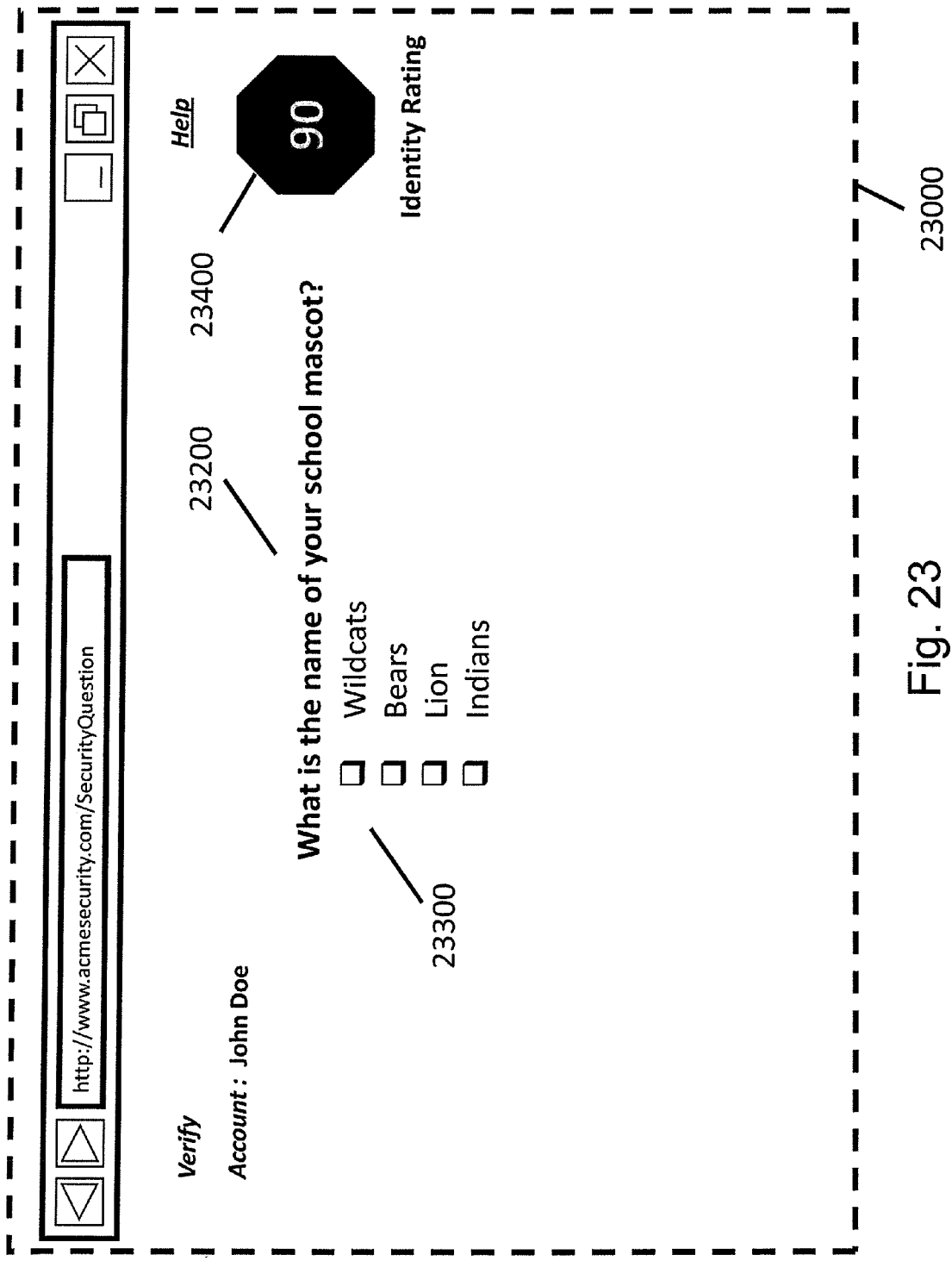
FIG. 23 illustrates an embodiment of an IDM user interface depicting a display requesting the user to answer a security question.

Referring now to FIG. 23, an embodiment of an IDM system user interface 23000 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed after the completion of an Iris Scan and the user selecting the "Continue" control 19500 (see FIG. 19). In this embodiment, the user interface of the IDM web server 620 (or other IDM server) displays a security question 23200 and a selection of potential answers 23300. In other embodiments, no selection of potential answers is provided and the user may provide the answer without assistance. Preferably but not necessarily, the IDM web server displays the user's current session identity rating 23400 (presuming the user answers the question correctly).

Figure 24:
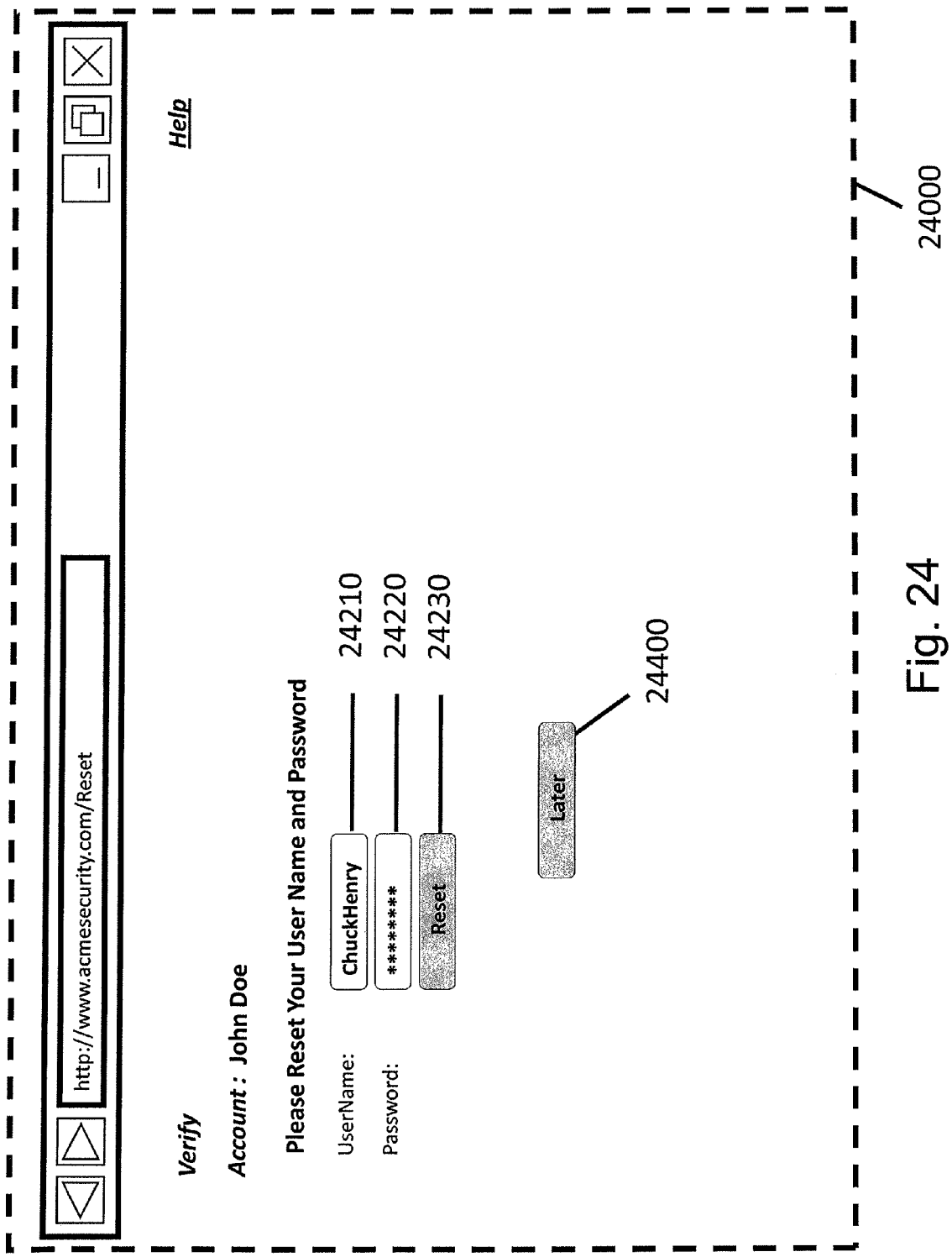
FIG. 24 illustrates an embodiment of an IDM user interface depicting a display requesting the user to reset their temporary user name and password.

As shown in FIG. 24, another embodiment of an IDM system user interface 24000 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed after answering the security question correctly 23300 (see FIG. 23). In this example, the user interface of the IDM web server 620 (or other IDM server) displays instructions for the user to enter a new user name in the text field 24210 and a new password in the text field 24220 and then select the "Reset" control 24230. Further in this example, the IDM web server displays a "Later" control 24400 that, if selected by the user, allows the user to reset their user name and password in a different login. Optionally, the IDM system 1000 may restrict the member to a configurable number of access attempts and/or period of time. If the user selects the "Later" control 24400 the user is logged into their account.

Figure 25:
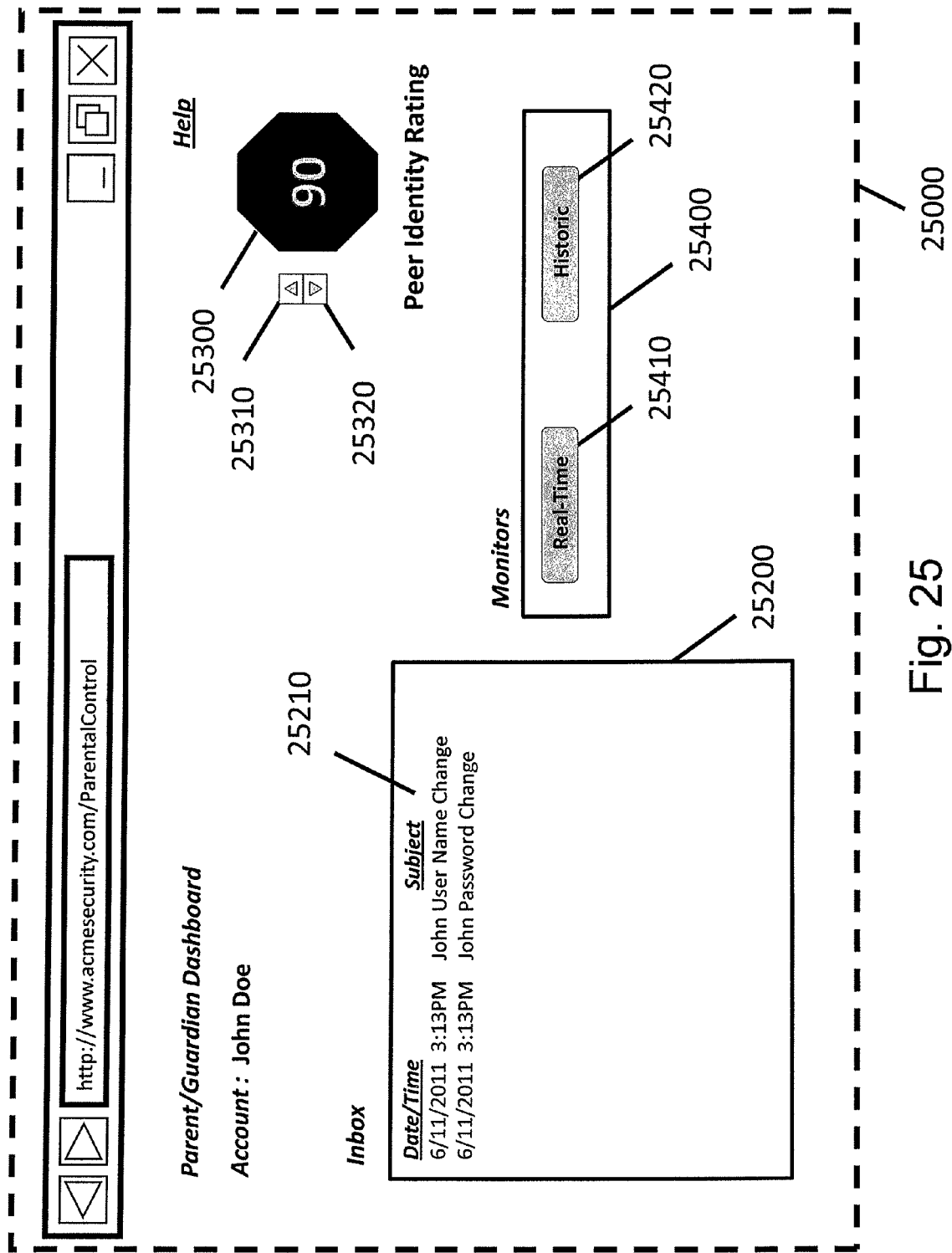
FIG. 25 illustrates an embodiment of an IDM user interface depicting a parent/guardian dashboard display.

As depicted in FIG. 25, one embodiment of an IDM system user interface 25000 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed after a parent/guardian logs into their account. In this example, the user interface of the IDM web server 620 (or other IDM server) displays a parent/guardian web page (e.g., dashboard) containing a collection of controls and displays to monitor their child's network/user group access. In another aspect of this embodiment, there is a display of notifications/messages 25200 sent to the user. In this embodiment, a terse summary of their messages are displayed in the window 25200 including the date and time the message was sent and the subject of the message. Optionally, selecting a message 25210 causes the full text of the message to be displayed along with messaging controls including, for example, delete, save, forward, reply, and the like (not shown).

In one embodiment of the user interface, the child's peer identity rating threshold 25300 is displayed. Preferably but not necessarily, the parents may adjust the rating threshold higher (e.g., in increments of 1) by selecting the "Increase" control 25310. In this example, the parents may adjust the rating threshold lower (e.g., in increments of 1) by selecting the "Decrease" control 25320. Continuing in this embodiment, the parents/guardians may monitor their child's network access in real-time by selecting one of the monitor controls 25400. In some embodiments, the "Real-Time" monitor control 25410 causes the IDM web server to open up a new browser (not shown) if the child is online enabling the parents to monitor the activities of the child.

In another aspect of this embodiment, the real-time browser display includes a series of scrolling messages describing the child's actions including for example, Composing A Message, Chat Text, Site Being Viewed (including a link to the site being viewed), In A Call (with an option to eaves drop on the audio of the call), In A Video call (with an option to eaves drop on the video/audio of the call), and the like. Optionally, if the child is not online, the system displays a message that the child is not currently online. In this example, if the parent/guardian selects the "Historic" monitor control 25420, a display of the user's activity is displayed in a new browser window in tabular form (see FIG. 26).

Figure 26:
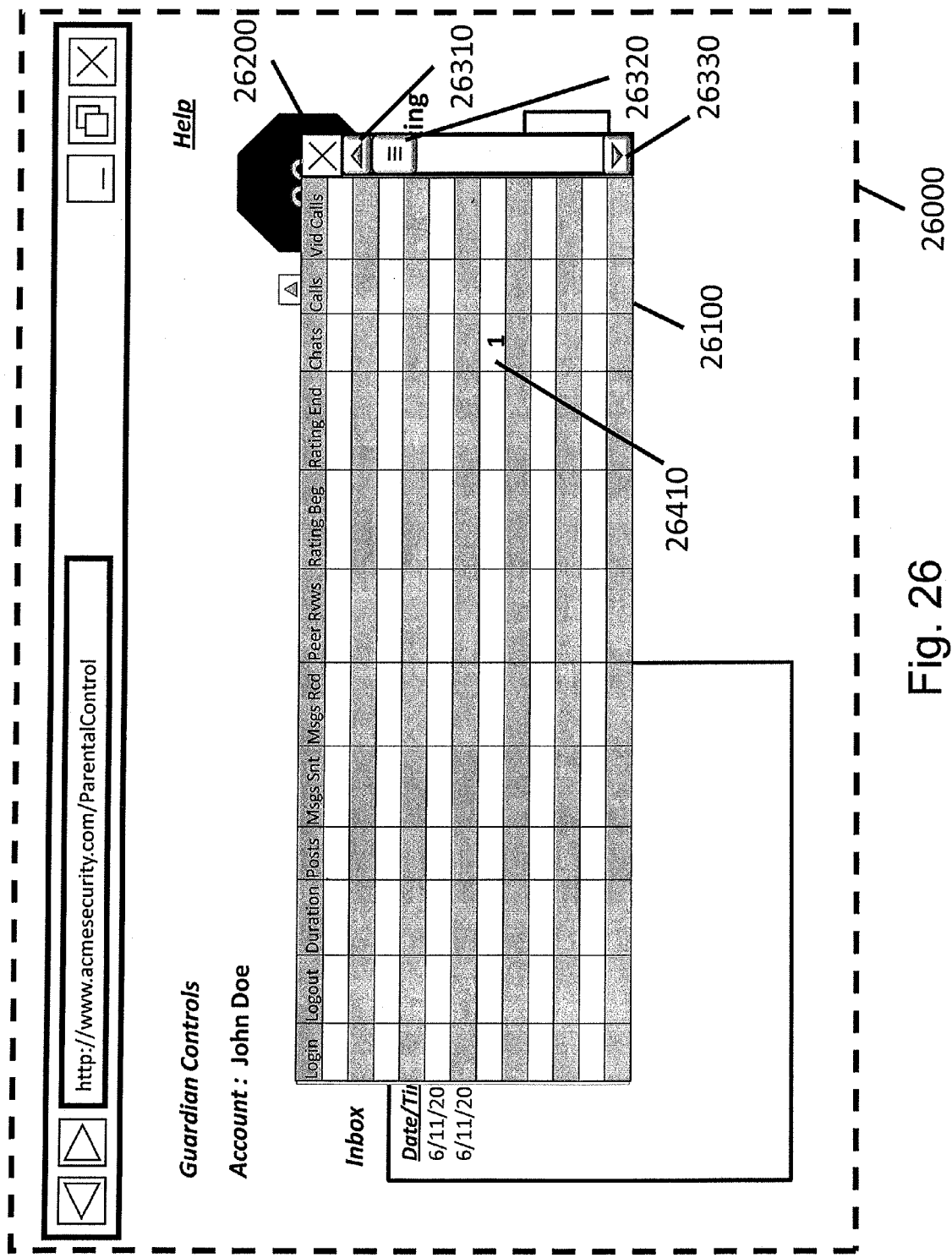
FIG. 26 illustrates an embodiment of an IDM user interface depicting a tabular display of a user's transaction history.

Referring now to FIG. 26, an embodiment of an IDM system user interface 26100 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed after a parent/guardian selects the "Historic" monitor control 25420. In this embodiment, a user interface to the IDM web server 620 (or other IDM server) causes a new browser window 26100 to be presented to the user (e.g., as an overlay to the current browser display) displaying in a tabular manner a list of transactions associated with the child. In this example, the browser window may be closed by selecting the "Close" control 26200.

In another aspect of this embodiment, there are several controls which enable the user to scroll up and down the tabular list of transactions 26310, 26320, and 26330. Continuing in this embodiment, each cell 26410 in the display maybe a controller which allows the member sponsor (i.e., parent/guardian) to obtain additional information on the event or transaction. In this example, the tabular display includes for each session the login time, logout time, session duration, number of posts to a member's site or their own, number of messages sent, number of messages received, identity rating at the beginning of the session, identity rating at the end of the session, number of chat sessions, number of calls, number of video calls, and the like.

Figure 27:
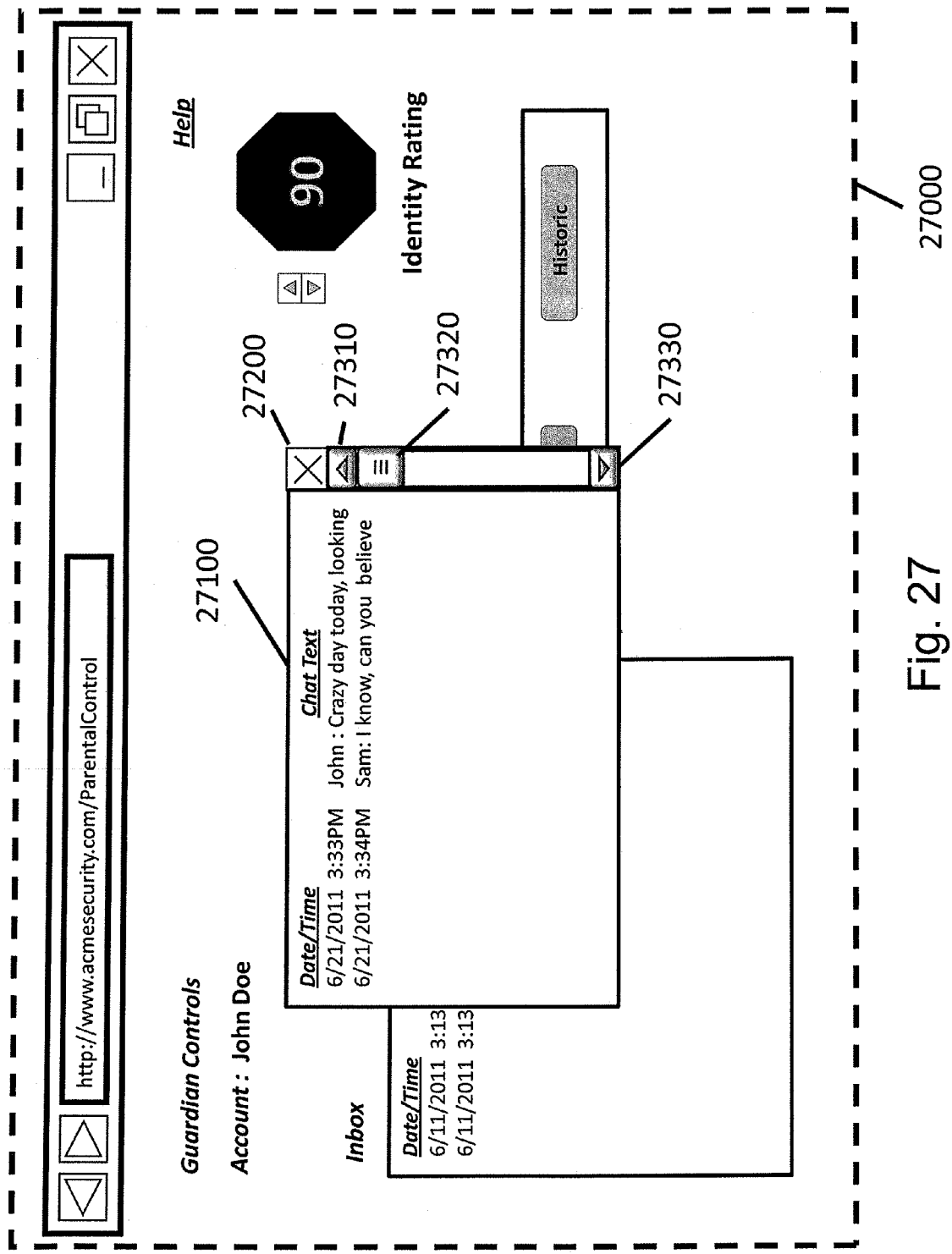
FIG. 27 illustrates an embodiment of an IDM user interface depicting a display of a user's previous chat session.

As shown in FIG. 27, one embodiment of an IDM system user interface 27100 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed after a parent/guardian selects cell/control 26410. In this example, a user interface to the IDM web server 620 (or other IDM server) causes a new browser window 27100 to be presented to the user (e.g., as an overlay to the current browser display) displaying information associated directly or indirectly with the transaction (e.g., the text of a chat session).

In another aspect of this embodiment, the IDM system 1000 provides internal and external (e.g., consulting external databases) information about the event/transaction of interest. For example, in a chat session the IDM system 1000 may provide, in addition to the text of the chat, additional information about the participant(s). Further, the IDM system 1000 may provide the general location of the IP addresses of the participant(s) (e.g., by accessing an external database 910). Optionally, the browser window may be closed by selecting the "Close" control 27200. Typically, there are several controls which enable the user to scroll up and down the tabular list of transactions 27310, 27320, and 27330. Preferably but not necessarily, the date and time of each chat message is displayed along with the participant and text of the message.

Figure 28:
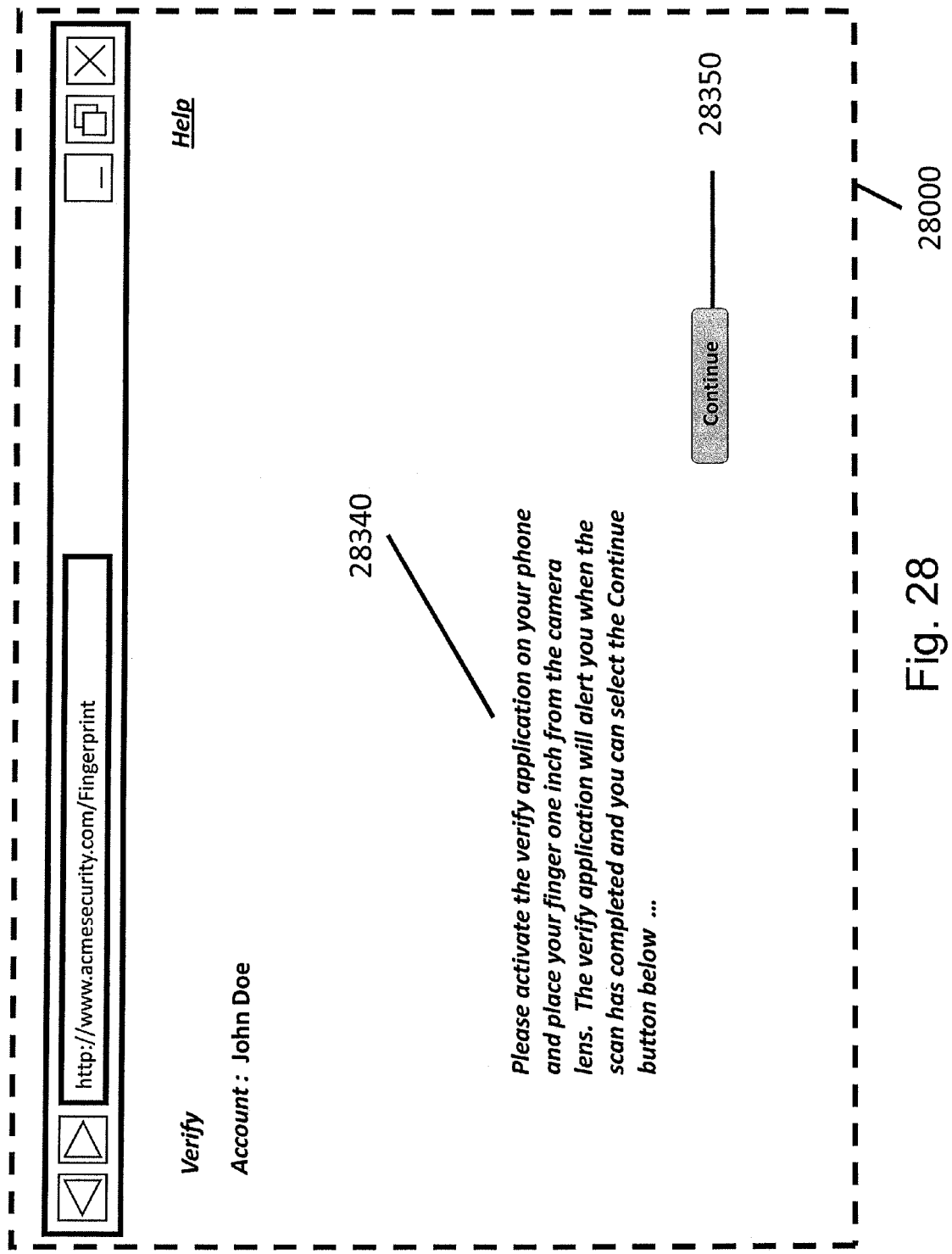
FIG. 28 illustrates an embodiment of an IDM user interface depicting user instructions for capturing a fingerprint scan.

As depicted in FIG. 28, another embodiment of an IDM system user interface 28000 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed by selecting the "Fingerprint Scan" control 19330 (see FIG. 19). In another aspect of this embodiment, the IDM web server 620 displays a message to the user to launch a fingerprint scan verification application on their phone and take a picture/scan of their forefinger. In this embodiment, there is a "Continue" control 28350 which when selected by a user checks to see if the fingerprint taken is valid and matches that of the user, and if so, logs the user into their account.

Figure 29:
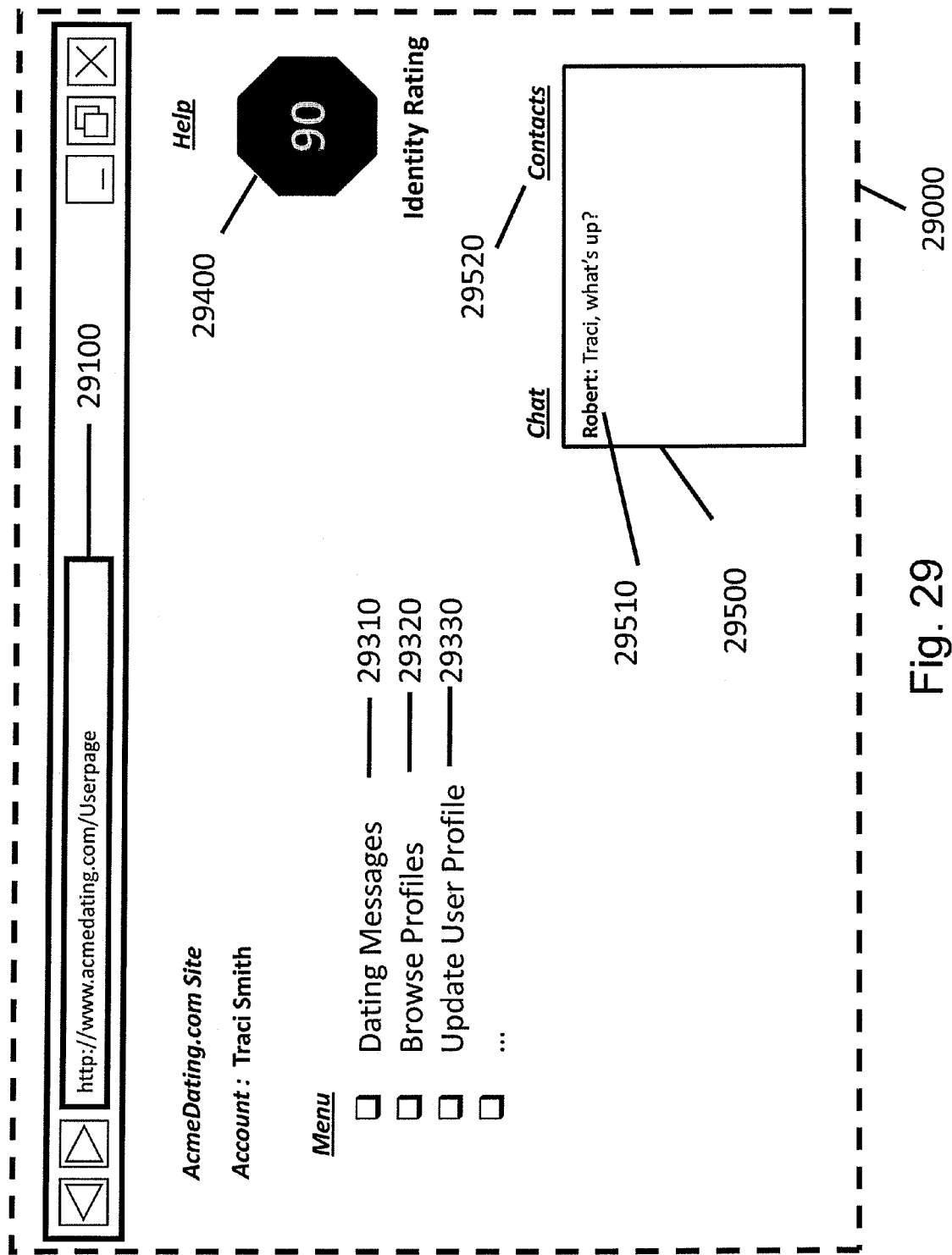
FIG. 29 illustrates an embodiment of an IDM user interface depicting a dating site user home page.

Referring now to FIG. 29, an embodiment of an IDM system user interface 29000 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed by a user selecting the "Continue" control 28350 (see FIG. 28) (successfully logging in with enhanced identity techniques). In another aspect of this embodiment, the web page displayed by the IDM web server 620 includes a collection of controls and displays. The user interested in reviewing a message from other prospective partners may select the "Dating Message" control 29310 which lists received messages. Preferably but not necessarily, the IDM system 1000 supports standard email controls including save, delete, reply, forward, and the like. The user interested in browsing/searching user profiles may select the "Browse Profiles" control 29320. Optionally, the IDM system 1000 supports one or more searching methods and/or filters including simply browsing a list of photographs of members.

In this embodiment, a member interested in updating their profile may do so by selecting the "Update Profile" control 29330. Preferably but not necessarily, the selection of the "Update Profile" control enables the user to add updated pictures to their profile, update biographical information, adjust their peer threshold identity rating, and the like. In this example, the IDM web server 620 displays the user's current session identity rating 29400. In some embodiments, the IDM system 1000 includes a chat window 29500 where text chat sessions may take place between the user and other members (subject to identity ratings exceeding thresholds values). Chat session messages 29510 may appear in the display 29500. In this embodiment, chat sessions are initiated by a user selecting the "Contacts" control 29520 and then selecting a chat member from a list or entering the user name of a chat member (not shown).

Figure 30:
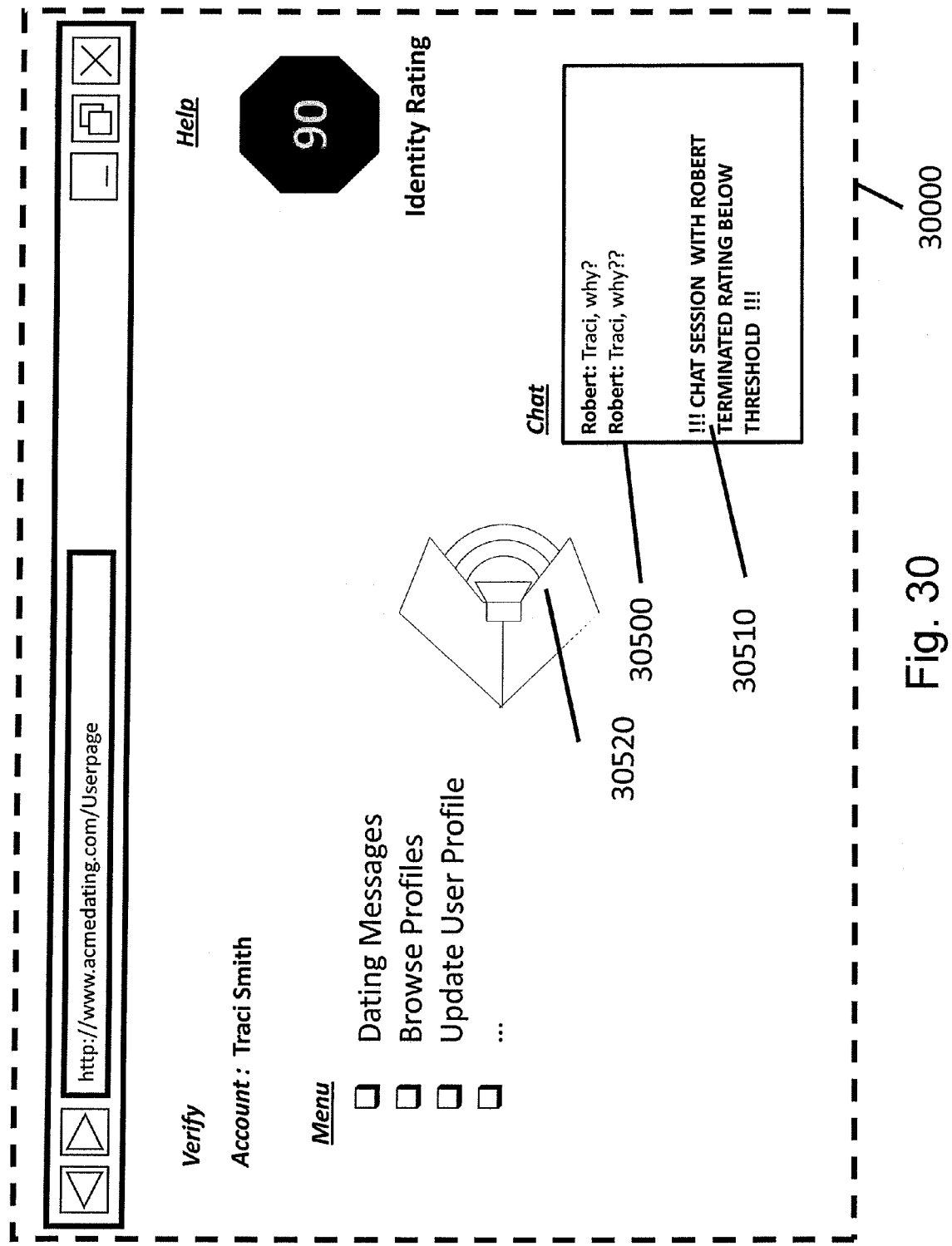
FIG. 30 illustrates an embodiment of an IDM user interface depicting a dating site user home page with a system terminated chat session.

As shown in FIG. 30, one embodiment of an IDM system user interface 30000 is presented via a browser (or other interface application) to a user. The browser may be, by way of example only, and not by way of limitation, executed on a computer terminal 130, such as a PC, a WAP or browser-enabled phone, a PDA or the like. In some configurations, the web page is accessed by a user selecting the "Continue" control 28350 (see FIG. 28) (successfully logging in with enhanced identity techniques). In another aspect of this embodiment, the web page is the same as that described in FIG. 29 with the difference being the chat window display 30500. In this embodiment, there are two chat messages and an IDM system notification to the user that the chat session with the user (e.g., Robert) has been terminated 30510 (e.g., because the member's or user's identity rating has fallen below a minimum peer identity threshold level). Optionally, the IDM system 1000 plays an audible alert 30520 if a chat session has been terminated by the system or user.

Continuing, FIGS. 31-40 illustrate example workflows of operation in an IDM system 1000, as described in detail above. Process states are listed on the left and major elements of the operating environment of FIG. 1 are listed across the top. Using solid lines with arrows to signify the direction of information flow, the diagram pictorially represents process flow and interactions between the elements in each example embodiment. Dashed lines are used to highlight nonstandard (but acceptable) delivery mechanisms.

These workflows depict various example embodiments in which an individual's identity is verified and the individual becomes a member of a secure, closed network. Further, the examples depict how the IDM system 1000 creates and manages an identity rating as the member accesses and utilizes the closed network. The embodiments also illustrate how the identity rating may change in response to the member's behavior, and how the identity rating may be used to monitor and restrict the member's access to other members and content.

In the first example of a functioning IDM system 1000, a minor is interested in becoming a member of a social network, e.g., Facebook. The minor, along with the minor's parent (i.e., parental sponsor or guardian sponsor) registers for the service at an authorized IVS. This first example further illustrates the use of the IDM system 1000 to monitor and grant access to the social network, including generating and managing identity ratings. Lastly, this example illustrates parental access to the IDM system 1000, including monitoring and restriction controls.

Social Network Embodiment:

In this example, a minor boy of 12 ("User A"), wants to become a member of a large social network ("Big Network") so he may interact with and be a part of his peer group. His parents agree but only if he becomes a member of a closed social networking user group which is associated with Big Network (e.g., acts as an access and monitoring proxy) and uses the identity verification, monitoring, and access controls of the IDM system 1000. Some of the steps below in the workflow are not accompanied with a separate figure. These steps are labeled with the phrase "not shown" and are typically used when the step or action are well known to those developing and using Internet-based web sites (e.g., accessing a web page).

Figure 31:
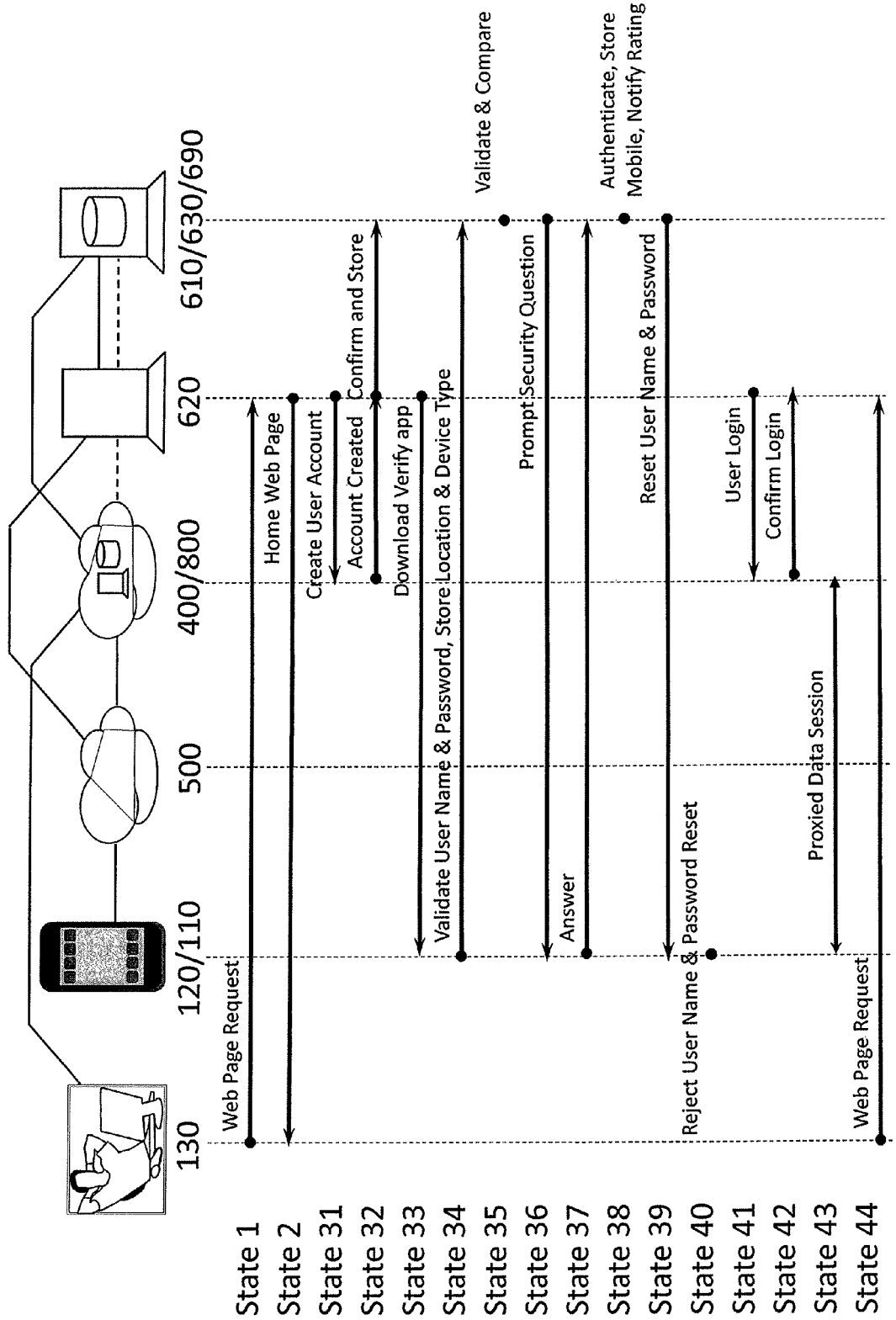
FIGS. 31-37 illustrate the operating environment/process workflow of a first embodiment of a social network member scenario.

Referring now to FIG. 31, State 1 is shown. In State 1, User A's parents open an account for their son by accessing a service provider utilizing the IDM system 1000. User A's parents access the service provider's web site by entering a web address into their browser running on their user data terminal 130 that corresponds to the service provider's web site (not shown). The web page address is received by the web server 620.

In State 2, upon receipt of the parent's web page request, the IDM web server 620 responds by displaying the service provider's home page (not shown). In this embodiment, the user selects a "New user application" web page control. Optionally, User A's parents could have selected a "Print application form" control if they did not want to fill out the application online. The web page provides User A's parents with information about the social networking proxy service, provides the location of the nearest IVS, hours of operation, and lists the parent/guardian and child identity information which will be needed during enrollment. Preferably but not necessarily, the web page lists a toll-free number that User A's parents may call to schedule an appointment. Typically, the system provides an online form for appointment scheduling.

Figure 32:
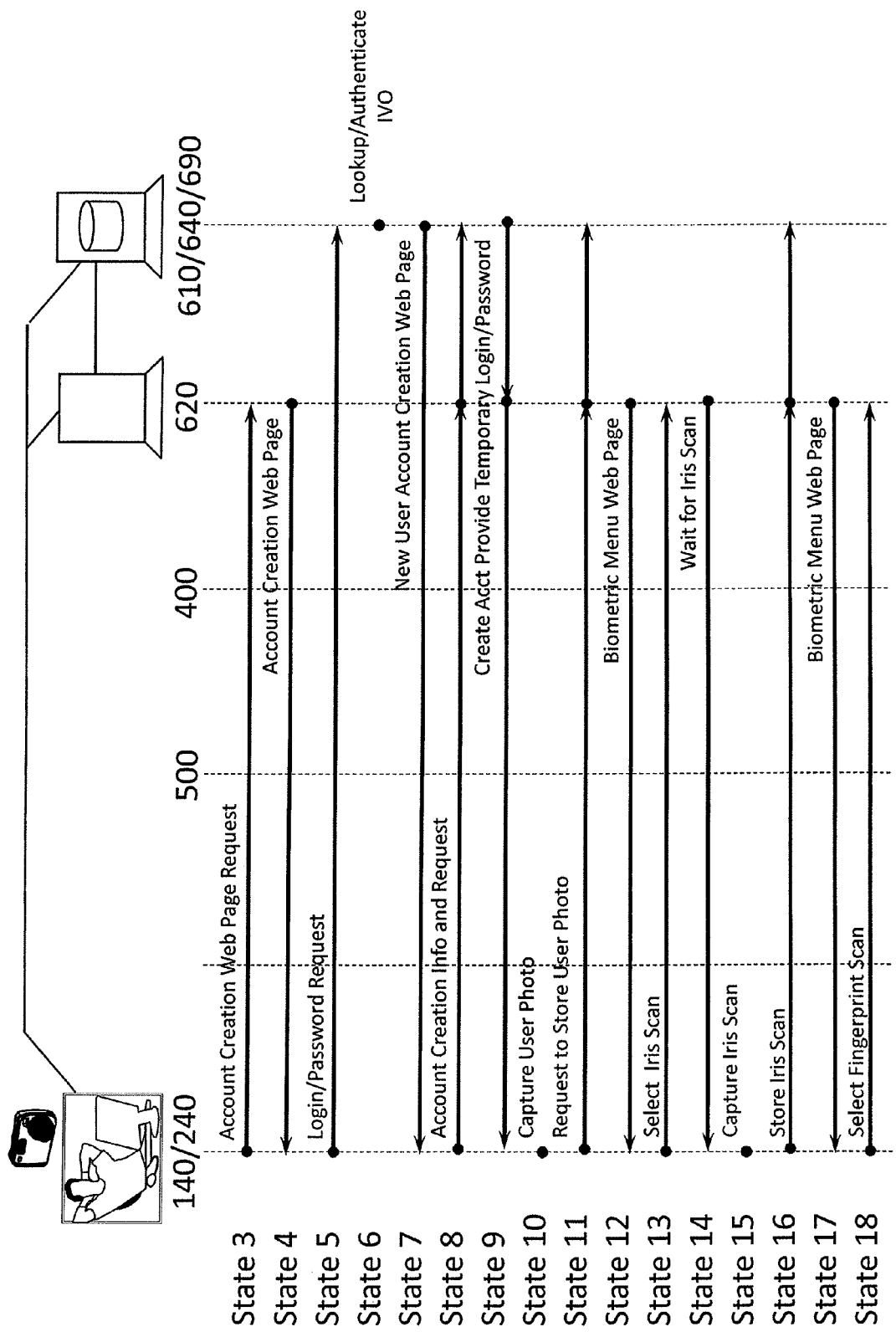
Figure 33:
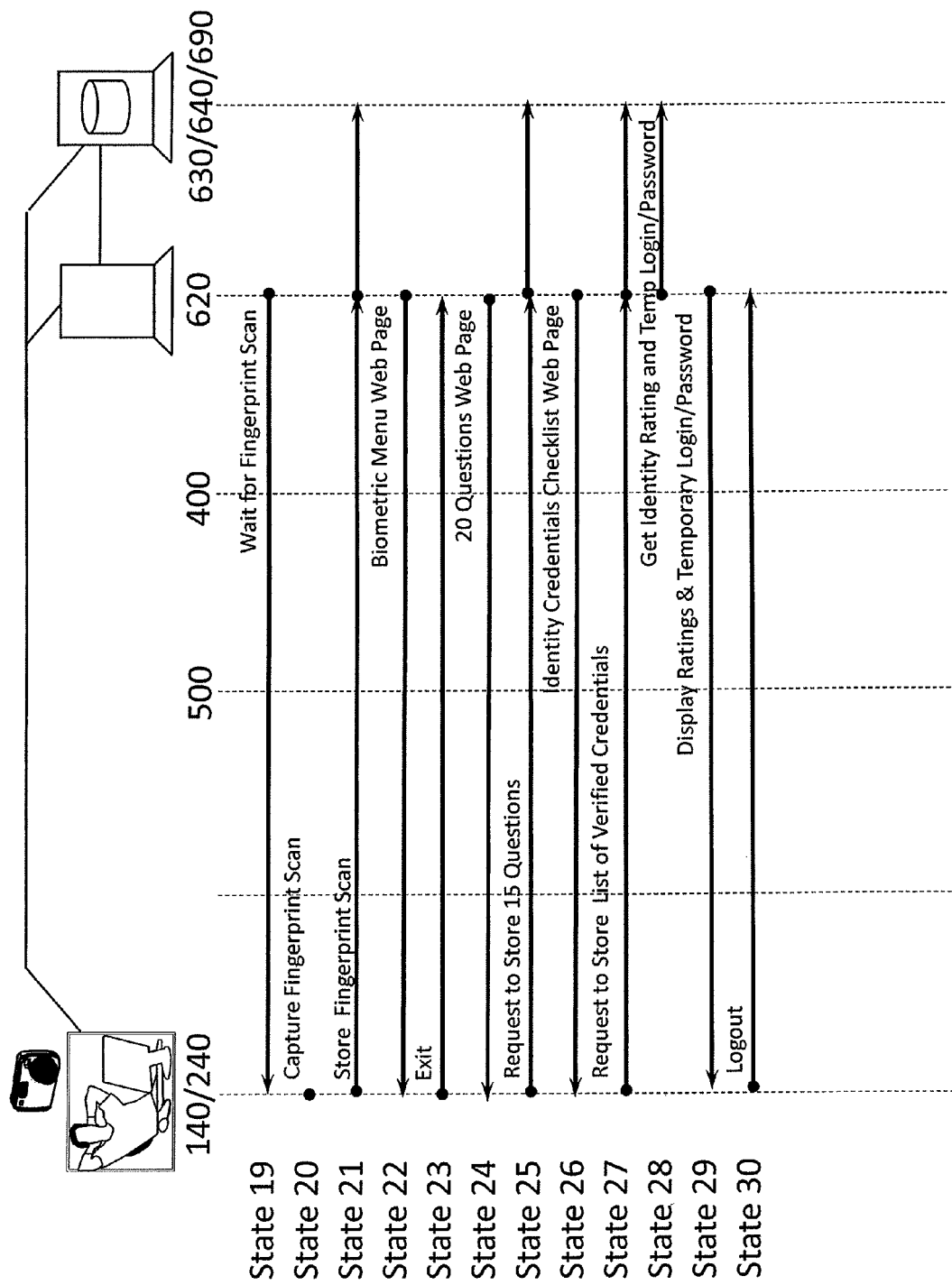

Referring now to FIG. 32, State 3 is shown. In State 3, User A and his parents drive to the nearest IVS location for their scheduled appointment. At the IVS location, User A's identity is verified by an IVO (e.g., company agent, off-duty law enforcement officer, and the like). Depending upon the extent of the identity verification, the prospective member is assigned an initial member identity rating. In this example, User A receives a member identity rating of 80. In this embodiment, User A receives a high rating because (a) User A's parents attend the identity verification session with all their appropriate credentials, (b) User A brought his personal credentials including birth certificate and social security number, and (c) User A agreed to provide 3 types of biometric data (fingerprint, facial recognition, and iris scan) as described below.

After User A has been verified by the IVO, the IVO creates a member account for User A with a temporary user name. The IVO accesses the account creation page of the IDM system 1000 by first logging into the secure IDM system 1000. The account creation page of the IDM system 1000 is only accessible from a secure physical location with a network with limited connectivity to other systems/servers and protected against intrusion/hackers. In this embodiment, the workstation/data terminals have no public Internet access. The IVO selects the account creation option 2341 from the menu of options in the top level menu screen 2000 (see FIG. 2).

In State 4, the IDM web server 620 responds to the account creation page request by displaying a login page 3000 (see FIG. 3). Continuing in State 5, the IVO enters a unique set of authentication credentials (e.g., user name 3310 and password 3320 or optionally using smart card technology) followed by the selection of the "Login" control 3330 from the user data terminal 140 (see FIG. 3000).

In State 6, the IDM authentication server 610 receives the IVO's login and password and authenticates the received credentials. In this embodiment, the entered credentials match that of the credentials stored in the IDM data store. Continuing in State 7, the IDM authentication server 610 responds to the IVO user by confirming the successful login and presenting a new account creation web page 4000 and fill-in form (see FIG. 4).

As shown in State 8, the IVO completes a new account creation fill-in form presented by the IDM web server 620 with User A's first 4310 and last name 4320, birth date 4370, and home address 4330-4360. The IVO then selects the "Submit" control 4390 for the new account form on the web page (see FIG. 4). In another aspect, the IDM web server 620 receives the IVO's new account creation request and forwards the request to the IDM registration server 640.

Referring now to State 9, the IDM registration server 640 creates a new member account in data store 690 and stores User A's name, birthdate, and home address in association with the account. In this embodiment, the IDM registration server 640 also may create a temporary user name and temporary password which is transmitted to the IDM web server 620. The IDM web server 620 displays the new temporary user name 5320 and temporary password 5330 to the IVO (see FIG. 5). Preferably but not necessarily, the IDM software application prompts User A to enter a temporary password (not visible to the IVO). Additionally, in this embodiment, the IDM web server 620 also prompts the IVO agent to take a photograph of the new member 5340, User A.

Continuing in State 10, the IVO agent takes a photograph of User A using a digital camera 240 and downloads the photograph to his or her workstation/data terminal 140. This photograph, optionally with a watermark certification seal, may become User A's member profile photograph on the social network web site. In this embodiment, the IDM software application running on the agent's workstation/data terminal 140 (or the IVO manually attaches the photograph to the page) detects either the snapshot or the download of the photograph and prompts the IVO to confirm 6390 (e.g., via a web page control) that the photograph is to be associated with the newly created member account (see FIG. 6).

Referring now to State 11, the IDM web server 620 receives the association request and transfers the photograph to the new account data store 690 where the photograph of User A is stored in association with the new temporary account. Continuing in State 12, after the photograph is stored in the server, the IDM web server 620 responds by displaying in a user interface screen, a selection of biometric data 7340 which may be obtained from the user (see FIG. 7).

As depicted in State 13, the IVO responds to the biometric prompt by selecting the "Iris Scan" option 7341 (see. FIG. 7). The IDM web server 620 receives the IVO selection. Continuing in State 14, the IDM web server 620 responds by displaying a new web page instructing the IVO officer to take an iris scan 8340 (see FIG. 8).

Referring now to State 15, the IVO agent scans User A's iris using an iris scanner 240 (device 240 may also take digital photo's as described above) and downloads the scanned data to the data terminal 140. In this embodiment, the IDM application detects the iris scan data download (or the IVO manually attaches the iris scan to the page), performs a test on the scanned data to confirm the sufficiency of the data (in this example the data is sufficient), and then prompts the IVO to select a "Continue" control 9390 (see FIG. 9). In another embodiment, the scan is instead performed by one or more of the IDM servers.

As shown in State 16, the IVO responds by selecting the "Continue" control 9390 presented by the IDM web server 620 displayed on the IVO's workstation/data terminal 140. The IDM web server 620 receives the request and transfers the scanned iris data to the new account data store 690 where the scanned iris data of User A is stored in association with the new temporary account.

Referring now to State 17, in another aspect of the embodiment, after the iris scan data is stored in the server, the IDM web server 620 responds by displaying a selection of biometric data which may be obtained from the member. In this embodiment, the iris scan option/control is grayed out since this biometric data has already been captured by the system.

As shown in States 18-21 (see FIGS. 32 and 33), User A's fingerprint scan is taken. At the point, States 13-16 are repeated with the system recording into the data store 690 in association with the new member account for User A's fingerprint scan. Continuing in State 22, after the fingerprint scan data is stored in the server, the IDM web server 620 responds by displaying a selection of biometric data which may be obtained from the user. In this embodiment, the iris and fingerprint scan options/controls are grayed out since this biometric data has already been captured by the system.

Referring now to State 23, in this embodiment the IVO exits the biometric data capture screen presented by the IDM web server 620 by selecting the "Exit" control 7230 (see FIG. 7). Continuing in State 24, the IDM web server 620 receives the IVO's exit request. The IDM web server 620 responds to the exit request by displaying a new screen 10000 which prompts the IVO to answer a list of twenty multiple choice security/login questions 10310 (see FIG. 10). The IVO sends this list of questions to User A. In this embodiment, User A must select answers for fifteen of the twenty questions. In other embodiments, a larger or small number of questions are utilized. In this regard, answering a larger number of questions correctly may have greater increasing effect on a member's identity rating.

As depicted in State 25, once fifteen questions have been selected and answered by User A, the IVO selects the "Submit" control 10340 (see FIG. 10). In some embodiments, the IDM web server 620 receives the submit request and stores the answered fifteen questions in association with new user account.

Referring now to State 26, in this embodiment the IDM web server 620 displays a new screen 11000 prompting the IVO to select from a list 11310 those credentials used to verify User A's identity and if a parent/guardian attended 11320 the verification session (see FIG. 11). Continuing in State 27, User A brought to the identity verification session his passport, social security card, and birth certificate. The IVO inspects the three identity credentials and approves each by selecting the respective "Credential" controls 11310 (see FIG. 11). Further, in this embodiment, User A's parents attended the verification session and brought their passports and driver's license. The IVO inspects the passports and driver's license and approves each by selecting the respective "Credential" controls 11320 and then selecting the submit button 11340. The IDM web server 620 receives the selection of credentials verified by the IVO. The IDM web server 620 stores the credentials verified in the session in the data store 690 in association with the new member account. The steps of user verification are now complete.

As shown in State 28, the IDM web server 620 queries the rating server 630 to determine User A's identity rating given the credentials verified and data captured. The rating server 630 responds to the web server 620 query with an identity rating, which in this embodiment is 80 on a scale of 0 to 100 (see State 3). Continuing, the IDM web server 620 also queries the data store to retrieve a temporary user name and password for the parents.

As illustrated in State 29, the web server 620 displays to the IVO the rating server results 12340, the default peer interaction threshold rating 12350, and a temporary user name 12320 and password 12330 for User A's parents, since the IVO selected confirmed User A's parents were in attendance at the verification session (see FIG. 12). In this embodiment, the IVO asks the parents at what identity rating User A is allowed to interact with his peers. Continuing in this example, the default setting is that the identity rating of User A's peers must be 75 or greater to allow interaction with his peers. The User A's parents decide to leave the threshold rating at 75. The IVO then provides User A's parents with their temporary user name and password.

Referring now to State 30, the identity verification session is over and the IVO logs out of the IDM system 1000 by selecting the "Logout" control 12230 (see FIG. 12). Optionally, User A's parents may enter a temporary password (not visible to the IVO). In this embodiment, the password is stored in association with User A's parents' new account in the data store 690 (not shown). The IDM web server 620 receives the logout request and terminates the web session. In this configuration, the transaction data associated the verification session performed by the IVO is logged by the session detail server 650.

As illustrated in FIG. 31, State 31 depicts the IDM web server 620 (although other servers such as the general processing server(s) 600, authentication server(s) 610 or other servers are illustrated in FIG. 1) opening a server-to-server data session over a secure network 400 to the Big Network system 800 and creating a closed user group account for User A using User A's first and last name and User A's photograph. In some configurations, the new account is created with other user information including for example, the user's email address or an email address of the IDM system 1000 associated with the user. In some embodiments, this is a public accessible social networking site which supports closed user groups. In other embodiments, the social network system 800 is operated by the IDM system 1000 provider.

Continuing in State 32, the IDM web server 620 receives a confirmation message from the Big Network system 800 that the account is successfully created. In this embodiment, the IDM web server 620 stores the Big Network account information in the IDM data store 690 in association with the new user account for User A.

Referring now to State 33, User A returns home and on his smartphone with data capabilities downloads a free IDM mobile device application called "Verify." Preferably but not necessarily, User A may download the IDM Verify application before or after the identity verification steps, described above. The process of downloading an application is well known to those skilled in the art of mobile application development and is not shown in the work flow figures.

In one embodiment, User A powers on his smartphone 120 and accesses the application store in the data network Cloud 400 by pressing its icon 13305 on the smartphone's touch screen. The smartphone prompts User A to enter his password to access the application store. User A enters his password using the keypad on the touch screen and then selects the Enter soft key, also on the touch screen. The smartphone displays the application store interface which allows the user to search or browse for available smartphone applications. User A reviews available applications and selects the IDM Verify application, "Verify." User A presses the "Buy App" button on the touch screen (in this example, the application is free). The phone next requests that User A confirm or cancel his purchase request. User A presses the "Confirm" soft key. The smartphone then begins the IDM Verify application download and instructs User A to wait for several seconds for the download to complete. When the download completes the application launches.

As shown in State 34, the IDM Verify application prompts User A to enter his user name and password. In this case, User A enters his temporary user name 14100 and password 14200 and selects the Enter key on the soft key pad 14500. The IDM Verify application receives the user name and password, encrypts the data, and transfers the user name and password over the wireless data network 500/400 to the IDM system authentication server 610.

The IDM Verify application queries User A's smartphone to determine User A's location (e.g., using GPS capabilities of the smartphone). User A's location information is encrypted and transferred to the authentication server 610. The IDM Verify application queries User A's smartphone to determine identifying characteristics of the mobile device User A is using (e.g., phone address, Electronic Serial Number ("ESN"), and the like). User A's mobile device identifying characteristics are transferred to the authentication server 610.

Referring now to State 35, the IDM system authentication server 610 receives the transferred encrypted data from the IDM Verify application. The authentication server optionally decrypts the received data and validates User A's temporary username and password. In this embodiment, the entered user name and password are valid. The authentication server compares the user's location against the address registered for the user above. Continuing, in this embodiment, the location and registered address match. In some embodiments, if the location and registered address did not match, the login fails. In other embodiments, the login is configured to fail if the location data does not match only until the temporary username and password have been reset. Additionally, similar comparisons may be made with identifying characteristics of the user's mobile device which were optionally determined and transferred.

As depicted in State 36, the IDM system authentication server 610 queries the account data base and, in this example, randomly selects one of the fifteen security/login questions. The selected question and answer is transferred (with or without encryption) to the IDM Verify application. Notably, the answer need not have been transferred in this step. Optionally, the answer to the question may persist at the authentication server 610 and/or data store 690. The IDM Verify application receives the security/login question. In this embodiment, the security/login question and multiple choice answers 15200 are decrypted and displayed to User A in the screen 15100 (see FIG. 15).

Continuing in State 37, User A selects one of the "Answer" controls 16200 using the touch screen 16100 (see FIG. 16). Typically, the answer selection is encrypted and transferred to the authentication server 610. Further, as shown in State 38, the authentication server 610 receives the transferred answer, decrypts the answer, and compares the answer with the answer stored in the data store associated with User A's account. In this embodiment, the answers are the same. Preferably but not necessarily, the identifying characteristics of the user's mobile device are now stored. In another aspect, the authentication server notifies the identity rating server of the authenticated login session.

Referring now to State 39, the rating server receives the notification and determines, for this session the identity rating for User A. Since User A successfully logged in without a failed attempt from his home, User A's identity rating for this login session is tagged at 87 (higher than at the time of his initial identify verification because User A has been validated as logging in from his home). The authentication server responds to the IDM Verify application confirming the successful login and notifies the application regarding the need for User A to reset his user name and password.

As shown in State 40, the IDM Verify application receives the authentication server 610 response and prompts the user to reset their temporary user name and password 17200 (see FIG. 17). Preferably but not necessarily, there is a "Later" control 17400 which allows User A to skip this step if User A is within the allowed number of temporary user name and password access attempts. In this embodiment, User A skips the user name and password reset.

Continuing in State 41, the IDM web server 620 (although other servers such as the general processing server(s) 600, authentication server(s) 610 or other servers illustrated in FIG. 1) opens a data network connection with the social network system 800 acting as a proxy. User A's social network user name and password is encrypted and transmitted over the secure data network connection 700 along with the User A's identity rating. Optionally, the social network user name and password are the same as or may be different than those entered by User A into the IDM system 1000.

Referring now to State 42, in this embodiment the IDM web server 620 receives a confirmation from the social networking site that the user name and password are valid. Continuing in State 43, the IDM system 1000 bridges the data session between User A and his mobile device 120 and the social networking site. User A now may interact with his peers, provided his peers have a session identity rating of 75 or greater.

As depicted in State 44, User A later decides to login to the social networking site from his laptop/user data terminal 130. User A enters the URL of the website or enters a search request for the company's website and selects the search results URL.

Figure 34:
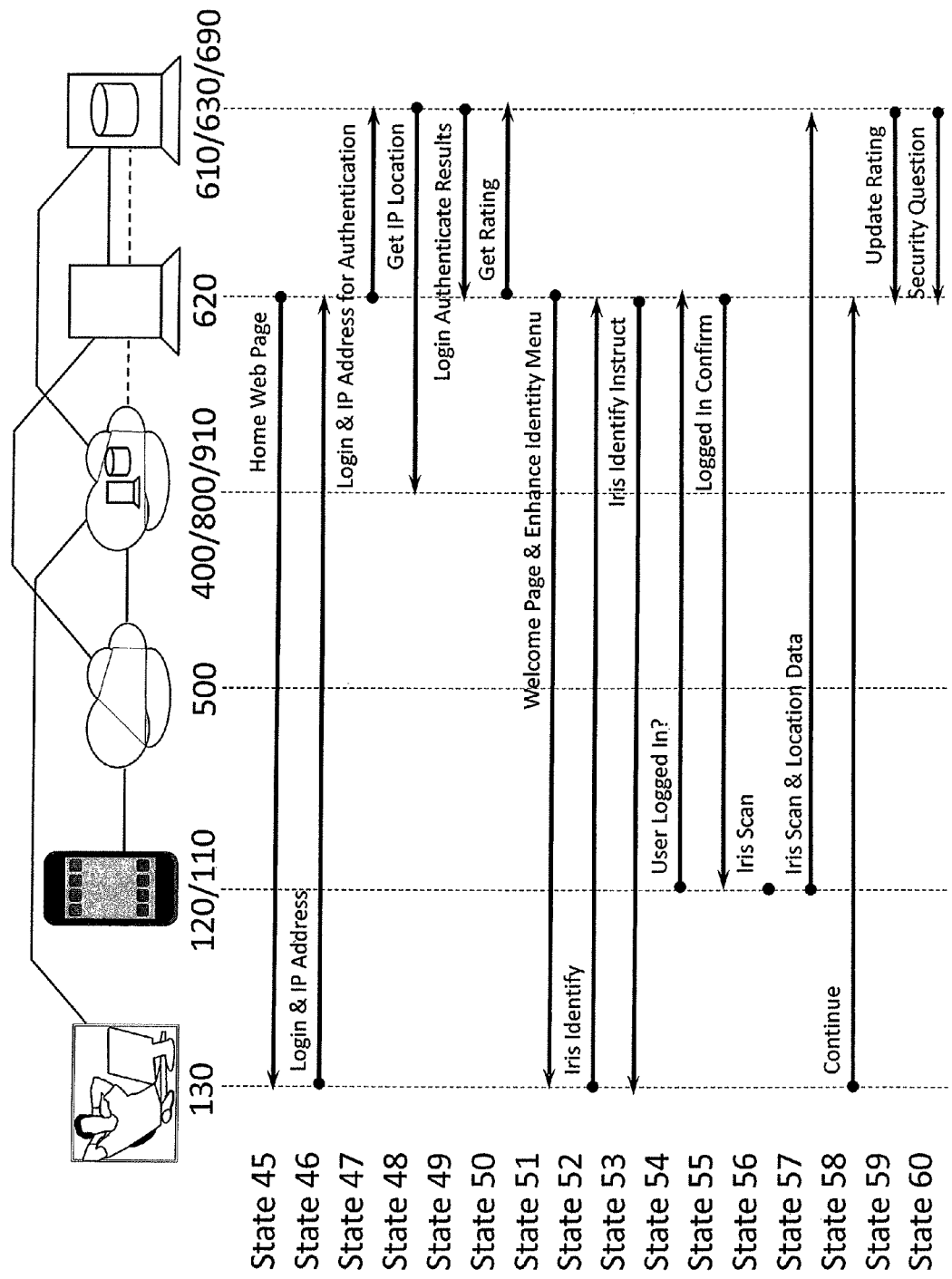

As illustrated in FIG. 34, State 45 depicts the IDM web server 620 responding by displaying a login home page 18000, upon receipt of the web page request (see FIG. 18). Continuing in State 46, User A enters his temporary user name 18310 and password 18320 and selects the "Login" control 18330 (see FIG. 18).

Referring now to State 47, in response to selection of the "Submit" control, the IDM web server 620 receives the temporary user name and password along with the user's IP address. The IDM web server 620 passes the login information and IP address to the authentication server 610. Next in State 48, the login information is validated and the IDM authentication server determines by querying one or more internal or external databases 910 that the IP address is highly likely to be within a certain location threshold (e.g., within State of California). Continuing in State 49, the IDM authentication server 610 reports the results to the IDM web server 620.

As shown in State 50, the IDM web server 620 queries the rating server 630 for the user's session identity rating, which in this example is 70, given that User A is operating with a temporary password and only broad IP address region information is being used to identify the user. Continuing in State 51, the IDM system 1000 does not prompt the user to change their temporary user name and password unless additional identity information is provided. The IDM web server 620 displays a welcome page 19000 which includes the user's identity rating 19400 and prompts the caller to provide additional identity information 19300 (see FIG. 19). Optionally, User A selects the "Continue" control 19500 to access the Big Network closed user group.

Referring now to State 52, User A realizes that he is not able to interact with his peers at the current identity rating level (70) and selects the "Iris Scan" control 19310 (see FIG. 19). Continuing in State 53, the IDM web server 620 receives the user request and displays user instructions 20340 on how to take a photo of their eye using their smartphone. In this example, the web page includes a "Continue" control 20500 which User A is prompted to select once his iris image has been captured (see FIG. 20).

Next in State 54, User A grabs his smartphone and selects/touches the identity verification icon/application, 13401 (see FIG. 13). The identity verification icon application launches and queries the web server 620 to see if User A is currently logged in. At State 55, the IDM web server 620 determines User A is logged in, receives the verify query, and displays a menu of identity verification enhancement methods. The Verify application prompts User A to select which identify verification method he would like to use to enhance his current login session. In this embodiment, User A selects Iris Scan verification.

As shown in State 56, the IDM Verify application receives User A's selections and transitions the smartphone into camera mode 22100 (see FIG. 22). User A positions the smartphone with the camera lens directed at his face near his eye.

Continuing in State 57, the Verify application automatically takes a picture of User A's eye once the camera lens is located at the correct distance from the eye. The image is stored on the smartphone. In this embodiment, the image is checked for errors/usability for an iris scan. (If an iris cannot be detected in the image, the user may be asked to take another picture. Optionally, the image is transferred to the IDM authentication server 610 for usability determination.) In this embodiment, the image of User A's eye appears to be sufficient. Additionally, the Verify application queries the smartphone to determine User A's location. The Verify application transfers the image (iris scan) and User A's location to the authentication server 610 (and may also include smartphone identification information). The user interface on the Verify application transitions out of camera mode and, in this example, exits the application.

Referring now to State 58, User A sets his smartphone down and selects the "Continue" control 20500 on the IDM web server 620 web page (see FIG. 20). In this embodiment, the IDM system 1000 detects the receipt of the iris scan from the Verify application and transitions the web page to the next step without the user having to select the "Continue" control. Additionally, the IDM system web page receives the user requests and queries the IDM authentication server 610.

As depicted in State 59, the IDM authentication server 610 receives the IDM web server query request for a security update for User A. The IDM authentication server 610 responds to the IDM web server query with the results of the iris scan. In this embodiment, User A's iris scan matched the iris scanned in User A's account. Further, in this embodiment, the location matched User A's account address stored in the data store 690. The IDM authentication server 610 responds to the IDM web server query with the positive iris scan identification and new rating of 90. According to this configuration, the IP address of User A's laptop/user data terminal (and other potential information associated with the device, for example, operating system) is stored in the data store 690, since it may be inferred that User A is logged in from his home when the iris scan was taken.

Continuing in State 60, the IDM system authentication server 610 queries the account data base and, in this example, randomly selects one of the fifteen security/login questions. In this regard, the selected question and answer is transferred (with or without encryption) to the IDM web server 620.

Figure 35:
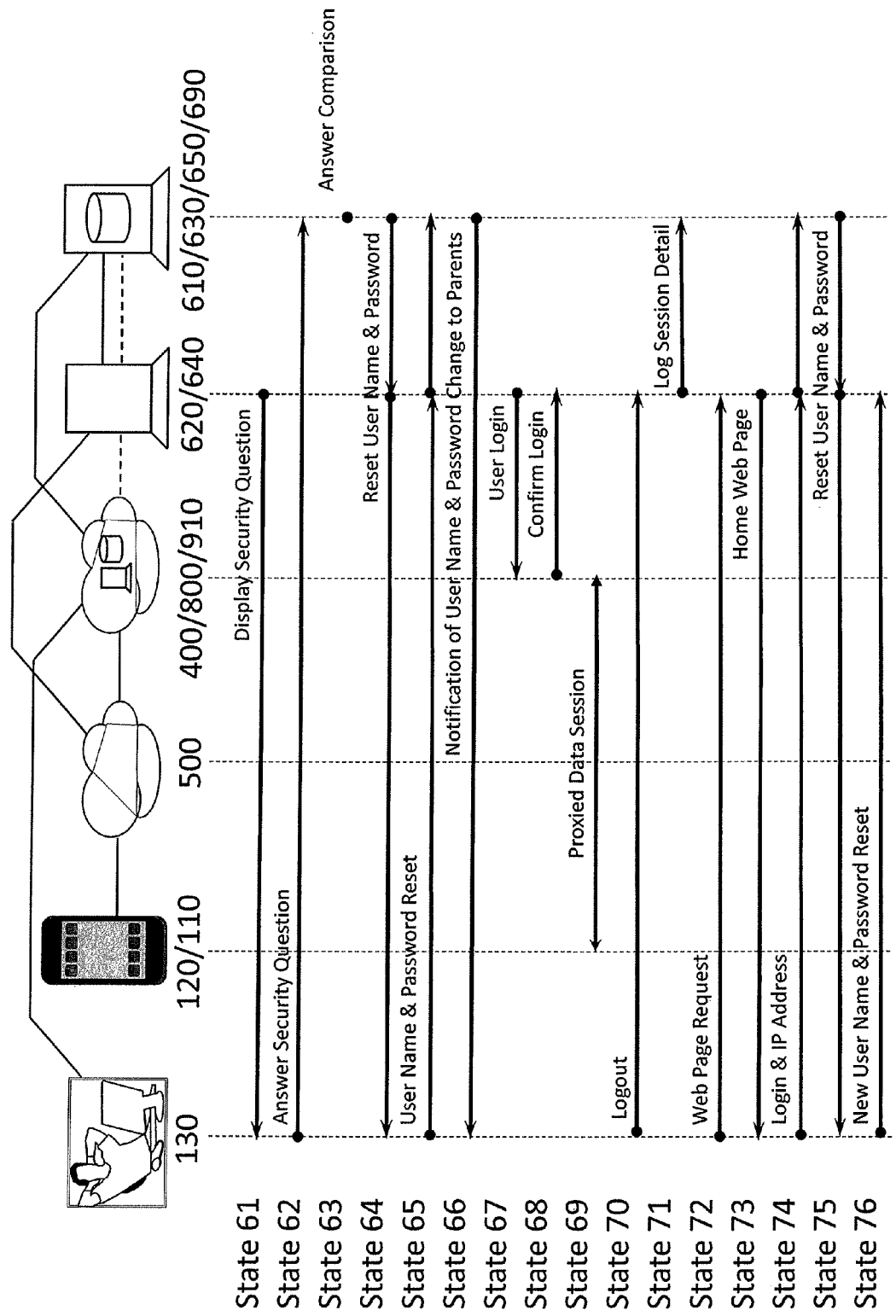

Referring now to FIG. 35, State 61 shows the IDM web server receiving the security/login question. In this embodiment, the security/login question and multiple choice answers 23200 are decrypted and displayed to User A along with User A's updated identity rating 23400 (see FIG. 23). Notably, in this example, the identity rating displayed is the rating User A will receive provided he answers the security question correctly. Optionally, if User A misses the security question, a new question is posed and his identity rating is decreased in the display. In this regard, if one or more security questions are not successfully answered, User A is restricted from accessing the system, in accordance with the current setting of the system.

As shown in State 62, User A selects one of the answers (e.g., by selecting an "Answer" Control 23300 adjacent to one of the 4 multiple choice answers). Typically, the answer selection is encrypted and transferred to the authentication server 610. Continuing in State 63, the authentication server 610 receives the transferred answer, decrypts the answer, and compares the answer with the answer stored in the data store associated with User A's account. In this embodiment, the answers are the same.

Further, as depicted in State 64, the IDM web server 620 receives the authentication server 610 response and gives the elevated identity rating prompts the user to reset their temporary user name and password. In this embodiment, User A enters a new user name in the text field 24210 and password text field 24220 followed by the "Reset" control 24230 (see FIG. 24).

Referring now to State 65, the IDM web server 620 receives the user name and password change request. Preferably but not necessarily, the IDM web server 620 forwards the requested change to the IDM authentication server 610 which validates/confirms the entry. The entry is then stored in association with User A's account in the data store 690 with the new user name and password. Continuing in State 66, a user name and password change notification is sent to the email inbox of User A and, optionally, User A's parents.

As shown in State 67, the IDM web server 620 (although other servers such as the general processing server(s) 600, authentication server(s) 610 or other servers illustrated in FIG. 1) opens a data network connection with the social network, system 800 acting as a proxy. Preferably but not necessarily, User A's social network user name and password is encrypted and transmitted over the secure data network connection 700 along with the User A's identity rating.

As illustrated in State 68, the IDM web server 620 receives a confirmation from the social networking site that the user name and password are valid. Continuing in State 69, the IDM system 1000 bridges the data session between User A and his mobile device 120 and the social networking site (e.g., Big Network). User A now may interact with his peers provided his peers have a session identity rating of 75 or greater.

Next in State 70, User A logs out of his session with the social networking site (e.g., Big Network). The IDM system 1000 closes the login session by tearing down the data connection between User A and Big Network. Subsequently in State 71, the IDM detail record server 650 logs to the data store the monitoring transaction history including, but not limited to messages sent, discarded, received, chat peers, length of session, photos viewed, and the like. In some embodiments, detail records are logged at the beginning and end of sessions and/or during sessions if the user invokes certain monitoring features (e.g., chat).

Referring now to State 72, User A's parents (after conversing with some friends) realize they may have set their son User A's peer identity threshold too low at 75. They would like to increase the threshold to 80. They were also requested to reset their temporary user name and password when their account was created. User A's parents enter the URL of the company's website or enters a search request for the company's website and selects on the search results URL. Continuing in State 73, upon receipt of the web page request, the IDM web server 620 responds by displaying the company's website home page 18000 (see FIG. 18).

As shown in State 74, User A's parents enter their temporary user name and password and select the "Login" control 18330 (see FIG. 18). In this embodiment, the IDM web server 620 receives the temporary user name and password along with their IP address. The IDM web server 620 passes the login information and IP address to the authentication server 610. The IDM authentication server determines that the IP address matches the IP address used by User A (see State 47) which was previously inferred to be associated with the parent's home.

Next in State 75, the IDM authentication server 610 notifies the IDM web server 620 of the valid login information. In this embodiment, the IDM system 1000 does prompt the user to change their temporary user name 24210 and password 24220 because the system was able to infer the login location from the IP address (see FIG. 24). Subsequently in State 76, User A's parents enter into the text field a new user name 24210 and password 24220 followed by the "Submit" control 24230 (see FIG. 24).

Figure 36:
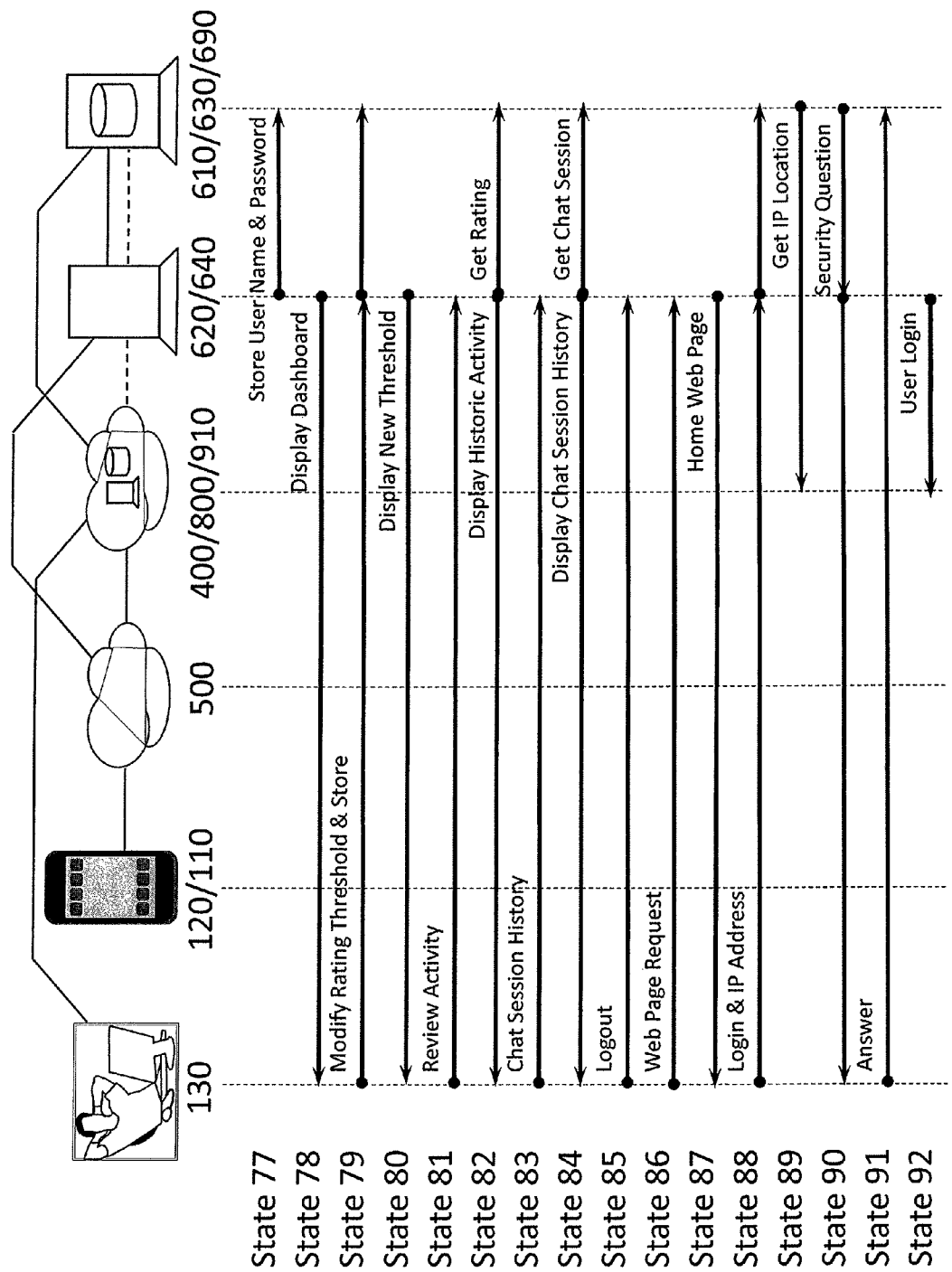

Referring now to FIG. 36, State 77 shows the IDM web server 620 receiving the user name and password change request. The IDM web server 620 forwards the requested change to the IDM authentication server 610 which validates/confirms the entry and then stores in association with User A's account in the data store 690 the new user name and password.

Continuing in State 78, after creating a new user name and password, the IDM web server 620 displays a parental/guardian dashboard page. In this embodiment, from the dashboard page, User A's parents may review a security message list display 25200, change User A's peer identity threshold rating 25300, and monitor User A's actions within the social network 25400 (see FIG. 25). User A's parents glance at the list of security messages 25200 and see these relate to their son changing his temporary user name and password. They will later access and delete the messages (not shown).

As shown in State 79, User A's parents select the icon to increase the threshold of "Peer Identity Rating" control 25310 five times (e.g., increments by one of each selection) to increase User A's peer threshold rating to 80 (see FIG. 25). Next in State 80, the IDM web server 620 displays a new peer threshold rating for User A in response to each incremental increase. Subsequently in State 81, User A's parents notice that the activity monitor is displaying User A's current status as "Logged Out." They would next like to review User A's recent activity so they activate the "Historic" monitor control 25420 (see FIG. 25).

Referring now to State 82, the IDM web server 620 queries the data store 690 and retrieves a collection of monitoring data regarding User A's accesses and usage of the social network displayed, which in this example, is a child browser window 26100. User A's parents scroll through the access transactions (each access session record includes in this example, login time, logout time, length of session, messages posted count, messages reviewed count, number of peer accounts reviewed, average identity rating, minimum identity rating, maximum identity rating, number of chats sessions, number of calls, number of video calls, and the like). In some embodiments, additional information about each session may be obtained by selecting the field of interest (which is a user interface control).

Continuing in State 83, the parents are interested in the chat sessions that occurred on Jun. 21, 2011 at 3:33 PM. The parents double click with their cursor on the chat field 26410 (see FIG. 26), which corresponds to the transaction of interest. Next in State 84, the IDM web server 620 receives the user request, queries the data store 690, retrieves the chat session log, and displays the log in a new browser window 27100 (see FIG. 27). The browser window is a complete display of the chat log including user name of chat participants, identity rating for the session, and text of each chat session.

Subsequently in State 85, User A's parents are finished reviewing User A's activity and adjusting User A's rating threshold so they logout by selecting the "Logout" control. Optionally, the transaction data associated with the parent's session is logged via the session detail record server 650.

Continuing in State 86, on the way home from school, User A and his minor-aged friend ("User B") agree to have a chat session later that evening to discuss their homework. User A enters the URL of the company's website or enters a search request for the company's website and selects on the search results URL that evening.

Referring now to State 87, upon receipt of the web page request, the IDM web server 620 responds by displaying the company's website home page 18000 (see FIG. 18). Next in State 88, User A enters his user name 18310 and password 18320 in the text fields and selects the "Login" control 18330 (see FIG. 18). The IDM web server 620 receives User A's user name and password along with the User A's IP address. The IDM web server 620 passes the login information and IP address to the authentication server 610.

As shown in State 89, the login information is validated and the IDM authentication server 610 determines by querying one or more internal or external databases 910 that the IP address is highly likely to be within a certain location threshold (e.g., within the State of California). Next in State 90, the IDM system authentication server 610 queries the account data base and, in this example, randomly selects one of the fifteen security/login questions. In other embodiments, more than one security question may be required to be correctly answered. The selected question and answer is transferred (with or without encryption) to the IDM web server 620. In this embodiment, the security/login question and multiple choice answers 23200 are decrypted and displayed along with User A's session identity rating 23400 (see FIG. 23).

Next in State 91, User A selects one of the answers (e.g., by selecting an "Answer" control 23300 adjacent to one of the four multiple choice answers) (see FIG. 23). Preferably but not necessarily, the answer selection is encrypted and transferred to the authentication server 610. The authentication server 610 receives the transferred answer, decrypts the answer, and compares the answer with the answer stored in the data store associated with User A's account. In this embodiment, the answers are the same.

Continuing in State 92, the IDM web server 620 (although other servers such as the general processing server(s) 600, authentication server(s) 610 or other servers illustrated in FIG. 1) opens a data network connection with the social network system 800 acting as a proxy. User A's social network user name and password is encrypted and transmitted over the secure data network connection 700 along with the User A's identity rating.

Figure 37:
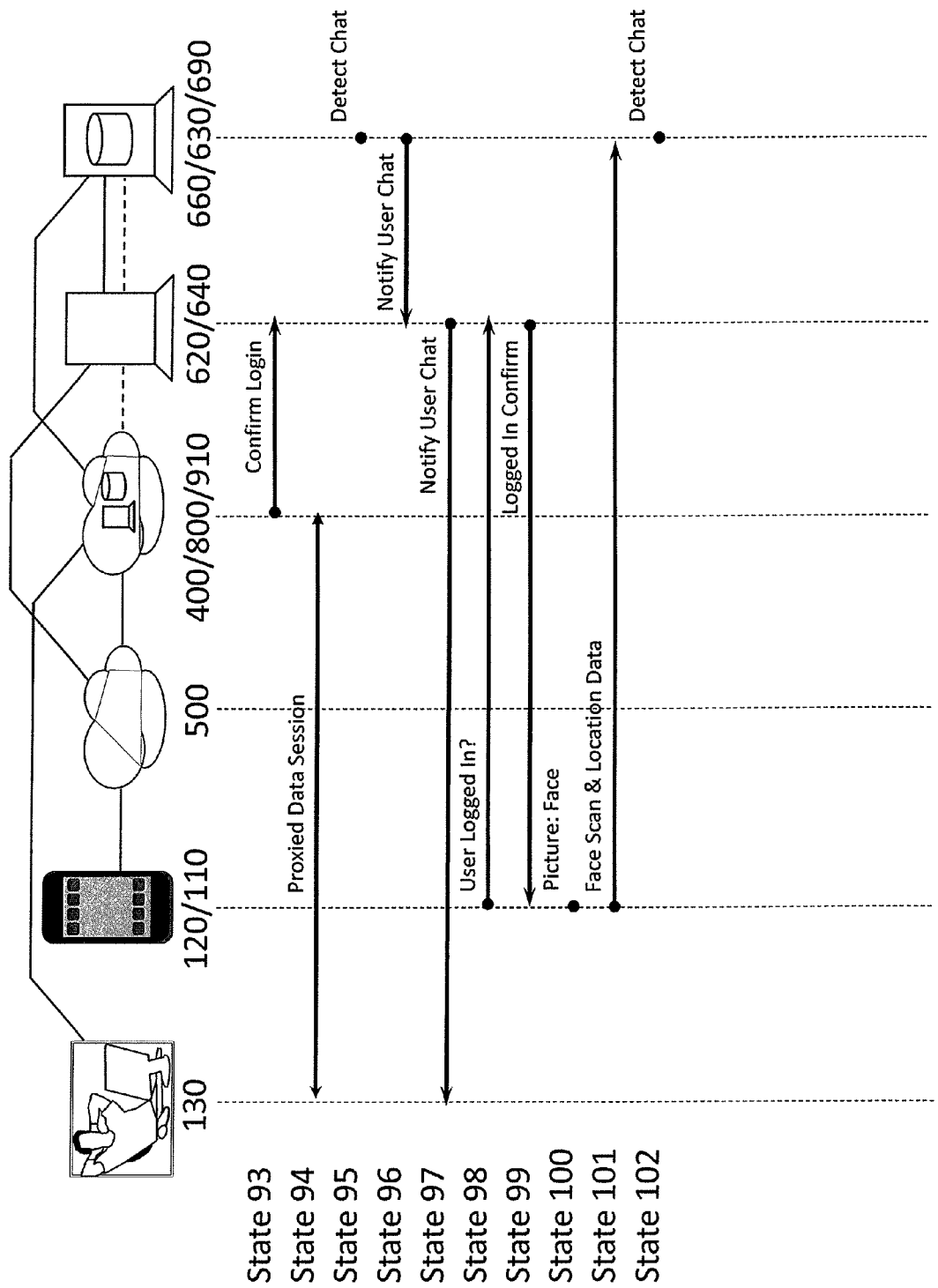

Referring now to FIG. 37, in State 93 the IDM web server 620 receives a confirmation from the social networking site that the user name and password are valid. Next in State 94, the IDM system 1000 bridges the data session between User A and his laptop 130 and the social networking site. User A now may interact with his peers provided his peers have a session identity rating of 75 or greater. Once in the Big Network, User A attempts to connect to User B. User A makes this attempt by browsing to User B's home/profile page (not shown) and selecting a "Chat" control on the page.

Subsequently in State 95, the IDM monitoring server 660 detects the selection of the "Chat" control. The monitoring server 660 (accesses User A and User B's session identity rating and peer identity level thresholds from the data store 690) compares the allowed threshold for User A to communicate with User B and vice versa against their session identity ratings. In this embodiment, User B's session identity rating of 70 is below User A's threshold of 80.

As shown in State 96, the IDM monitoring server 660 notifies the IDM web server 620 of the threshold violation. In some embodiments, the IDM monitoring server 660 also logs the threshold violation to the data store 690 in association with User A's member account. Continuing in State 97, the IDM web server displays an error/warning message to User A that User B's session identity rating is too low, and they will not be able to have a chat session (not shown).

Referring now to State 98, in this embodiment User A texts User B and informs him he needs to increase his identity rating. User B grabs his smartphone and selects/touches the IDM Verify application. The IDM Verify application launches and queries the web server 620 to see if User B is currently logged in. Continuing in State 99, the IDM web server 620 receives the verify query, determines User B is logged in, and notifies the Verify application that User B is logged in. The Verify application displays a menu of identity enhancement options 21200 that User B may select from to increase his current session identity rating. In this embodiment, User B selects the Facial Recognition option 21310 (see FIG. 21).

Next in State 100, the IDM Verify application receives User A's selections and transitions the smartphone into camera mode 22100 (see FIG. 22). In this embodiment, User A positions the smartphone with the camera lens directed at his face. The IDM Verify application automatically takes a picture of User B's face once the camera lens is located at the correct distance from the face. The image is stored on the smartphone. Continuing in this embodiment, the image is checked for errors/usability for a face scan. If a facial image cannot be detected in the image, the user may be asked to take another picture. Optionally, the image is transferred to the IDM authentication server 610 for usability determination. In this example, the image of User B's face appears to be sufficient. As such, the Verify application queries the smartphone to determine User B's location.

As depicted in State 101, the Verify application transfers the image (face scan) and User B's location to the authentication server 610 (and may also include smartphone identification information). In some embodiments the user interface on the Verify application then transitions out of camera mode and in this example exits the application. Given a highly likely face match and a home location match, User B's identity rating increases to 85.

Finally in State 102, User B attempts to contact User A by browsing to User A's social network home page and selects the "Chat" control. In this embodiment, the IDM monitoring server 660 detects the selection of the "Chat" control. Continuing, the monitoring server 660 (accesses User A and User B's session identity rating and peer identity level thresholds from the data store 690) compares the allowed threshold for User A to communicate with User B and vice versa against their session identity ratings. In this example, User B's session identity rating of 85 is above User A's threshold of 80 which exceeds the necessary thresholds so User B and User A are able to communicate via a chat session.

The example scenario above illustrates how the IDM system 1000 may be used to facilitate identity verification in an example industry, social networking. Screening users and maintaining an identity rating gives parent/guardian's and user's confidence they may interact with others in a safe environment. Further, the above example illustrates how the IDM system 1000 may employ a multitude of verification and monitoring technologies in order to effectively provide a dynamic identity rating, and how the identity rating may be used to restrict access and interactions. Still further, the above example illustrates how the IDM system 1000 may employ varying technologies including smart applications in order to greatly simplify the user's experience. Notably, the industry environment discussed above, social networking, was selected for example only, and not by way of limitation. The disclosed embodiments of the IDM system 1000 may be employed in various different industries, as is further discussed below.

Online Dating Embodiment:

This embodiment illustrates the flexibility of the IDM system 1000 to integrate into an online dating service. In this configuration, a single woman ("Member W") wants to become a member of an online dating/social network. Member W decides she wants to enroll in an online dating site which utilizes the IDM system 1000 because she only wants to interact and date members where the identity of the member is known with high confidence. For example, Member W does not want to date a married philanderer who indicates he is unmarried in order to pursue extramarital affairs. In another aspect of this embodiment, Member W does not want to date an individual who has lied about his age, location of residence, location of employment, or other parameter that is confirmed by the IDM system 1000. In this embodiment, the IDM system 1000 is not proxying the social network as in embodiment above. Rather, the IDM system 1000 and the online dating service of this example are one system. Some of the steps below in the workflow are not accompanied with a separate figure. These steps are labeled with the phrase "not shown" and are used when the step or action are well known to those developing and using Internet-based web sites (e.g., accessing a web page).

Figure 38:
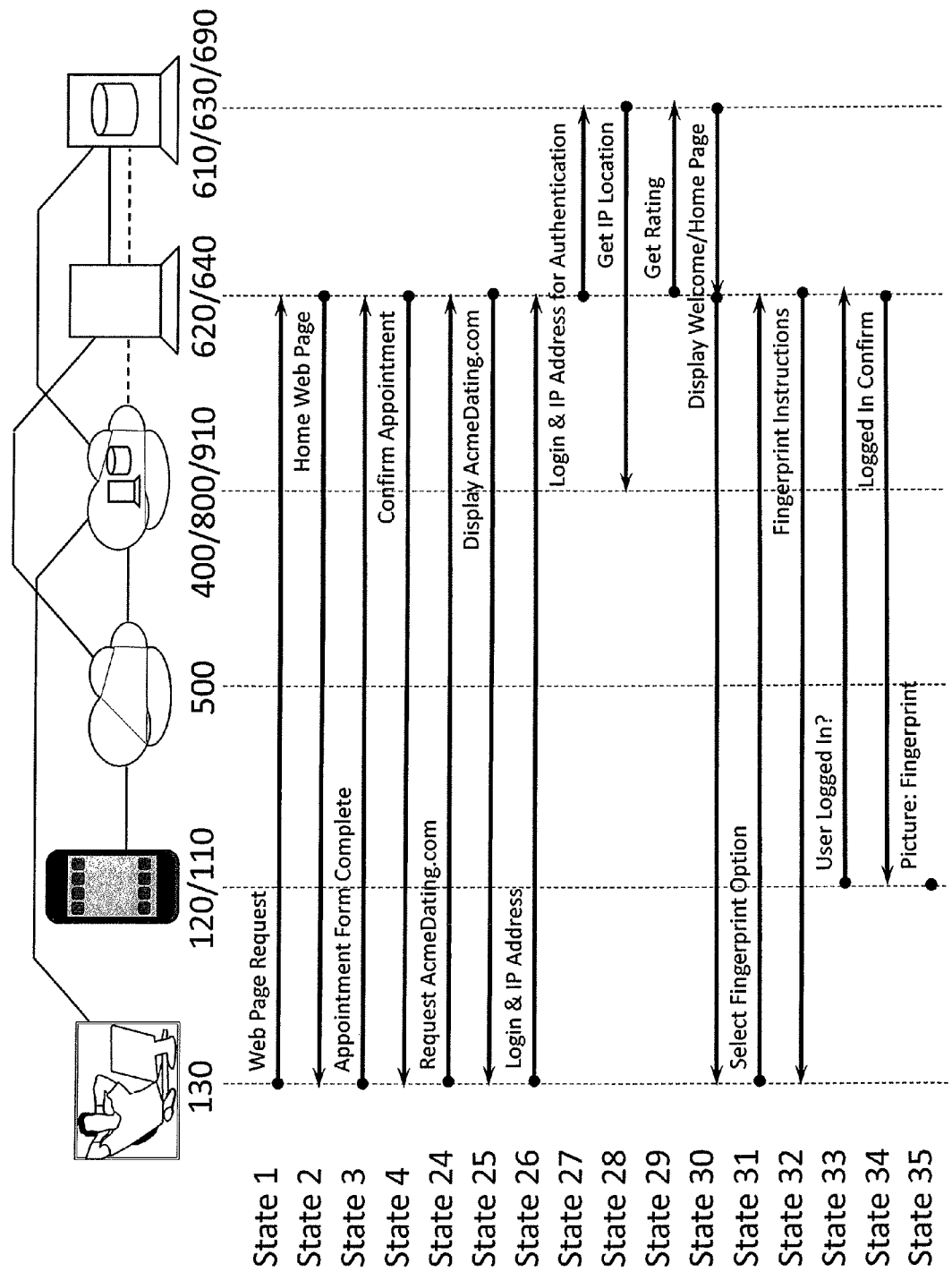
FIGS. 38-40 illustrate the operating environment/process workflow of a second embodiment of an on-line dating scenario.

Referring now to FIG. 38, in State 1 Member W accesses the service provider's web site to get additional information about the online dating service. Member W opens a web browser on her laptop computer 130 that corresponds to the service provider's web site (not shown). In this embodiment, the URL is received by the web server 620. Continuing in State 2, upon receipt of Member W's web page request, the IDM web server 620 responds by displaying the service provider home page (not shown).

As depicted in State 3, Member W reviews the monthly costs of the service and schedules an appointment at the IVS by completing an online form. Next in State 4, the IDM web server 620 receives the appointment request, confirms the available appointment time by displaying a confirming web page.

Subsequently in States 5-23, Member W goes to the IVS at the appointment time. At the IVS, Member W's identity is verified by an IVO. Depending upon the extent of the identity verification, the prospective member is assigned an initial member identity rating. In this embodiment, Member W received a member identity rating of 85. Member W received this high rating because Member W brought her personal credentials including birth certificate, social security number, driver's license, and because Member W agreed to provide a fingerprint as a biometric. In another aspect of this embodiment, Member W also confirmed to the IVO that she had a tablet computer which is capable of downloading an IDM software application (Verify Application) that when launched is capable of configuring her tablet computer to take a reliable fingerprint. In this example, Member W's home address was confirmed using Member W's driver's license. Optionally, the IVO queries one or more internal or external databases to confirm the validity of the user's credentials (e.g., driver's license confirmation with a department of motor vehicles data base). These states which correspond to States 3-21 of the social network scenario described above, are incorporated herein in their entirety but are not repeated here in the text or the workflows.

Member W may modify the peer identity rating when she accesses the IDM system 1000 or the IVO may modify the peer identity threshold rating. Member W informs the IVO that she will use her default peer identity threshold rating level for now. The IVO informs Member W that her rating may be affected by factors such as which device she uses to access the service and her geographic location.

Referring now to State 24, Member W later decides to login to the dating site from her laptop/user data terminal 130 from her home. Member W enters the URL of the company's website or enters a search request for the company's website and selects on the search results URL. Next in State 25, upon receipt of the web page request, the IDM web server 620 responds by displaying the company's website home page 18000 (see FIG. 18). The login/home page with optional company branding is not shown. Continuing in State 26, Member W enters her temporary user name 18310 and password 18320 in the text fields and selects the "Login" control 18330.

As shown in State 27, the IDM web server 620 receives the temporary user name and password along with the user's IP address. The IDM web server 620 passes the login information and IP address to the authentication server 610. Next in State 28, the login information is validated and the IDM authentication server 610 determines by querying one or more internal or external databases 910 that the IP address is highly likely to be within a certain location threshold (e.g., within the State of California).

Subsequently in State 29, the IDM web server 620 queries the rating server 630 for the user's session identity rating, which in this example has dropped to 65, given that Member W is operating with a temporary password and only the broad IP address region information is being used to identify the user. Continuing in State 30, the IDM authentication server 610 notifies the IDM web server 620 of the valid login information. In this embodiment, the IDM system 1000 does not prompt the user Member W to change her temporary user name and password unless additional identity information is provided. The IDM web server 620 displays a welcome page 19000, including the user's identity rating 19400 (note in the example the identity rating for Member W is 65) and prompts Member W 19200 to optionally provide additional identity information to enhance her rating (see FIG. 19).

Referring again to State 31, Member W realizes that she isn't going to be able to interact with her peers at this identity rating level, and selects the Fingerprint Scan option 19330 (see FIG. 19). Next in State 32, the IDM web server 620 receives the user request and displays instructions 28340 to the user on how to take a fingerprint using their smartphone. In this example, the web page includes a "Continue" control 28350 which Member W is prompted to select once an image of her fingerprint has been captured.

As depicted in State 33, Member W grabs her smartphone and selects/touches the IDM Verify application 13401 (see FIG. 13). The application was previously loaded into her smartphone at the IVS location. The IDM Verify application launches and queries the web server 620 to see if Member W is currently logged in. Continuing in State 34, the IDM web server 620 receives the verify query, determines Member W is logged in, and notifies the IDM Verify application that Member W is logged in. The IDM Verify application displays a menu of identity enhancement verification method 21200 which Member W may choose from. In this embodiment, Member W selects the Fingerprint Scan option 21320 (see FIG. 21).

Next in State 35, the IDM Verify application receives Member W's selections and transitions the smartphone into camera mode 22100 (see FIG. 22). Note, in this embodiment the display would be of a finger not an iris. Member W places her right forefinger as directed onto the target on the touch screen. In some configurations, the touchtone screen on the device may be configured to capture a fingerprint within, for example, an inch of the camera lens. In this embodiment, the device automatically captures an image of the finger once the device is able to autofocus sufficiently on the finger.

Figure 39:
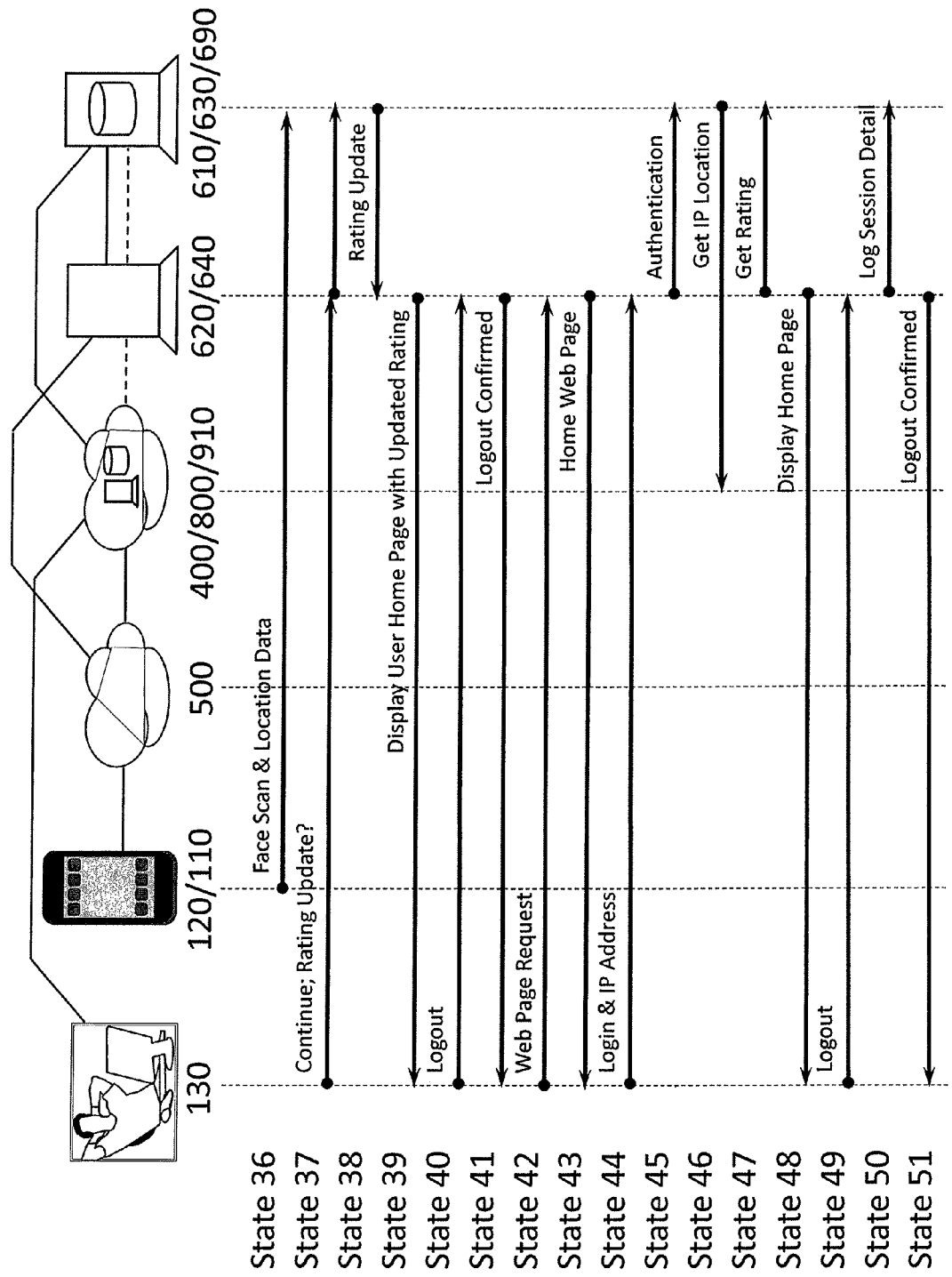

Referring now to FIG. 39, in State 36 the application plays an audio prompt informing Member W that the fingerprint has been captured. The image is stored on the smartphone. In this embodiment, the image is checked for errors/usability for a fingerprint scan. If a fingerprint cannot be detected in the image, the user may be asked to take another picture. Optionally, the image is transferred to the IDM authentication server 610 for usability determination. In this embodiment, the image of Member W's finger appears to be sufficient. Continuing, the IDM Verify application queries the smartphone to determine Member W's location. The IDM Verify application transfers the image (fingerprint) and Member W's location to the authentication server 610 (and may also include smartphone identification information). Additionally, the user interface on the IDM Verify application may be used to transition out of camera mode and exits the application.

Next in State 37, Member W sets her smartphone down and selects the "Continue" control 28350 on the web page displayed by the IDM web server 620. The IDM system web page receives the user requests and queries the IDM authentication server 610 for an identity rating update.

Subsequently in State 38, the IDM authentication server 610 receives the IDM web server 620 query request for an identity update rating for Member W. The IDM authentication server 610 responds to the IDM web server query with the results of the fingerprint scan. In this embodiment, Member W's fingerprint scan matched the fingerprint scan stored in Member Ws account. Further, the location matched Member W's account address. The IDM authentication server 610 responds to the IDM web server query with the positive fingerprint scan identification and new rating of 90. In this configuration, the IP address of Member Ws laptop/user data terminal is stored in the data store 690 since it may be inferred that Member W is logged in from her home when the fingerprint scan was taken.

As shown in State 39, Member W is now successfully logged into the web site. The IDM web server 620 displays the web site user home page 29000 with new identity rating 29400 (see FIG. 29). While online, she completes a user profile 29330 and browses/searches 29320 through a collection of available men in her area. In this embodiment, the system displays only men whose identity rating is at or exceeds 70 (the default since Member W has not yet adjusted the value higher or lower). Member W ends up sending initial contact emails 29310 to three men. In this scenario, the emails are proxied through the IDM system 1000 in order to maintain a level of anonymity. Preferably but not necessarily, Member W may select a control which automatically embeds a link or attaches a photo to the emails. In some configurations, the system applies facial recognition techniques to the photo that Member W attaches to the email. In other configurations, if the photo facial features match within a configurable threshold (e.g., a threshold value 90% confidence set by the service provider), the photo will include an associated trustmark/certification. In another aspect, Member W may elect to have the original photo taken at the IVS site released to the recipients of the email which may include a certification and/or trustmark. Browsing pictures and user profiles and sending, receiving, and reviewing emails is available in some embodiments.

Referring now to State 40, Member W is finished, and so selects the "Logout" control 29700. Next in State 41, the IDM web server 620 receives the logout request and terminates the login session and displays a logout confirmation. Typically, session detail information is logged to the detail record log server 650.

Subsequently in State 42, Member W logs into the web site from work to see if she has received any responses. She starts by entering the URL of the company's website or enters a search request for the company's website and selects on the search results URL.

Next in State 43, upon receipt of the web page request, the IDM web server 620 responds by displaying the company's website home page 18000 (see FIG. 18). Continuing in State 44, Member W enters her user name 18310 and password 18320 in the text fields and selects the 'Login" control 18330. Then in State 45, the IDM web server 620 receives the user name and password along with the user's IP address. The IDM web server 620 passes the login information and IP address to the authentication server 610.

As illustrated in State 46, the login information is validated and the IDM authentication server 610 determines by querying one or more internal or external databases 910 that the IP address is highly likely to be within a certain location threshold (e.g., within the State of California). Next in State 47, the IDM web server 620 queries the rating server 630 for the user's session identity rating, which in this example has dropped to 65 given Member W is accessing the system from an unknown location (her workplace) using an unknown device 130 (workplace user data terminal). Subsequently in State 48, the IDM web server 620 displays the web site 29000 and her session identity rating 29400 (see FIG. 29).

Referring now to State 49, while Member W may log into the IDM system 1000 and review the received emails, she will be unable to send a response given her low identity rating, so she logs off the IDM system 1000 by selecting the "Logout" control (not shown). Next in State 50, session detail information is logged to the detail record log server 650. Continuing in State 51, the IDM web server 620 confirms the logout by displaying a logout message (not shown).

Figure 40:
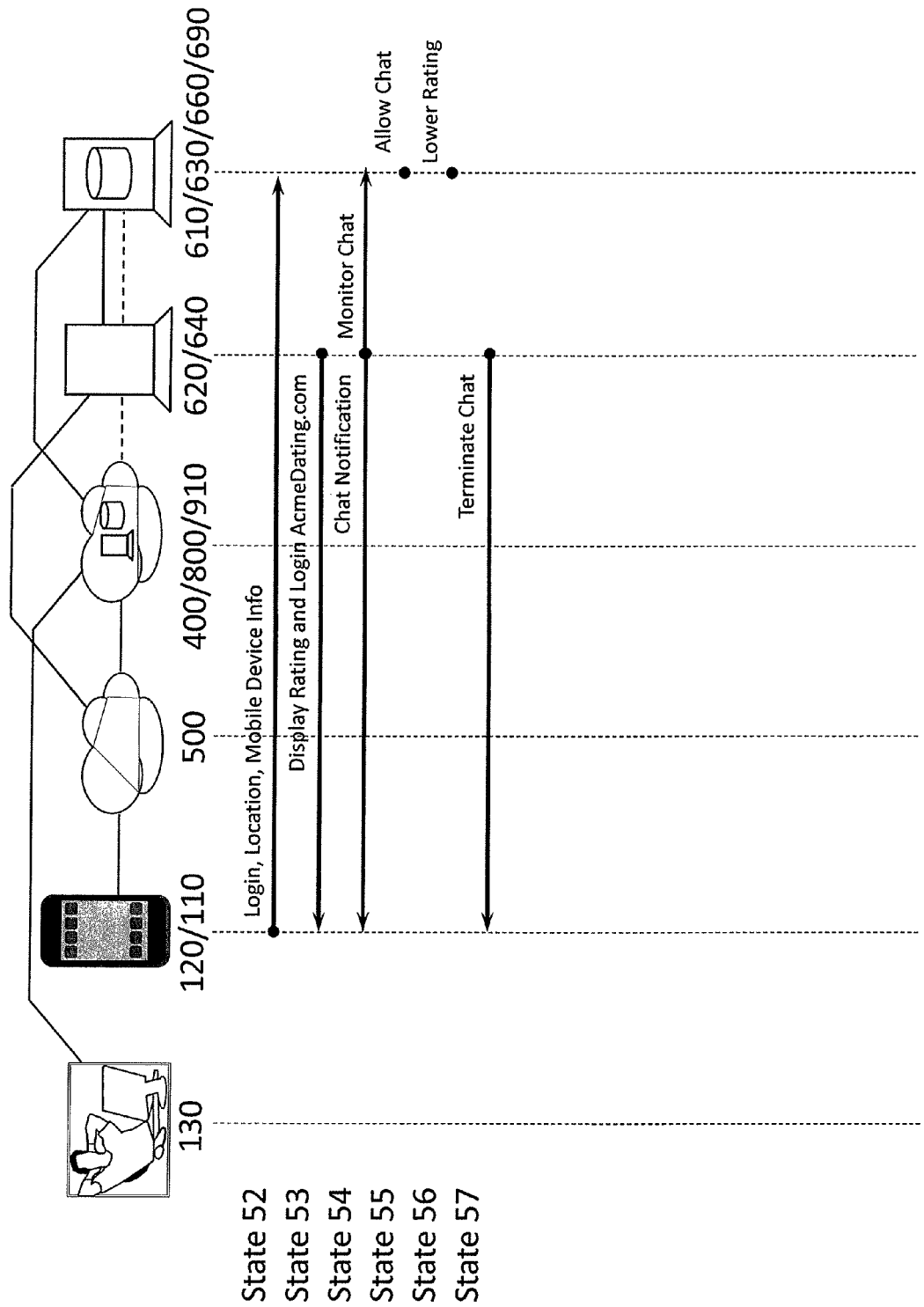

As illustrated in FIG. 40, State 52 shows Member W logging in from her smartphone from a friend's house. The IDM Verify application 13401 launches and prompts Member W to enter her user name and password. Optionally, the verify application may check whether Member W is currently logged in on another device and if so provide a different menu option (e.g., select an identity verification method) (see FIG. 13). Member W enters her user name 14100 and password 14200 and selects the "Login" control 14300 (see FIG. 14).

The Verify application receives the user name and password, encrypts the data, and transfers the user name and password over the wireless data network 500/400 to the IDM system authentication server 610. The IDM Verify application queries Member W's smartphone to determine Member W's location (e.g., using GPS capabilities of the phone). Member W's location information is encrypted and transferred to the authentication server 610. The IDM Verify application queries Member W's smartphone to determine identifying characteristics of the mobile device Member W is using (e.g., phone address, ESN, and the like). Member W's mobile device identifying characteristics are transferred to the authentication server 610.

Continuing in State 53, the IDM system authentication server 610 receives the transferred encrypted data from the IDM Verify application. The authentication server optionally decrypts the received data and validates Member W's username and password. In this embodiment, the entered user name and password are valid. The authentication server compares the user's location against the address registered for the user above. In other embodiments, the location and registered address do not match. Typically, if the location and registered address does not match, the login fails. Optionally, similar comparisons may be made with identifying characteristics of the user's mobile device.

The IDM web server 620 displays the web site home page 29000 Member W's identity rating 29400 which, in this example, is now 75 which exceeds the minimum threshold required for interacting with IDM system 1000 users who responded to Member W's initial email. Member W is now logged into the system and Member W may read the email from a single male ("Member M") and reply responding to some of the questions he raised to Member W.

Referring now to State 54, Member W stays logged in and a few minutes later receives a chat alert (e.g., an audio warning) and a message appears from Member M in the Chat window 29500 (see FIG. 29). The IDM monitoring server 660 detects the initiation of a chat session.

Next in State 55, the IDM monitoring server queries the IDM rating server 630 to determine the session rating values of Member W and Member M and their threshold levels. In this embodiment, both Member W and Member M are above the threshold identity rating values and therefore the chat session is not restricted. Member W and Member M initially have a nice chat but after 10 minutes Member M's tone becomes aggressive when Member W resists Member M's advances for a meeting. Member M even begins to use profanity in some of his chat messages.

As shown in State 56, the monitoring IDM server 660 detects the aggressive change in tone and/or the profanity and reduces Member M's identity rating below 70. In some embodiments, the monitoring IDM server 660 detects the change in tone/profanity and changes the user's identity rating. In another aspect, the monitoring IDM server 660 detects the change in tone/profanity and sends phrases and/or the chat session language to the identity rating server for analysis.

Finally in State 57, Member W receives an audible alert 30520 and a text notification 30510 that the identity rating of Member M has fallen below Member W's peer threshold and the session is automatically terminated (see FIG. 30). In this embodiment, the IDM system 1000 manages a separate behavior rating system for aggressive tone and profanity, whereby the behavior rating is decreased and the identity verification rating is affected less by Member M's behavior. In another aspect of some embodiments, after an interaction, a user may rate another user's behavior which is used as input in determining a user's overall behavior rating and may also impact a user's identity rating.

The example above illustrates how the IDM system 1000 may be used to facilitate identity verification in an example industry, online dating. Screening users and maintaining an identity rating gives user's confidence that they may reach out and interact with others in a safe environment. Further, the above example illustrates how the IDM system 1000 may employ a multitude of verification and monitoring technologies in order effectively provide a dynamic identity rating. Still further, the above example illustrates how the IDM system 1000 may employ varying technologies including smart applications in order to greatly simplify the user's experience.

In addition, certain methods and systems described herein use attributes of a user in combination with a member's identity rating to provide a Customer Relationship Management ("CRM") system and associated services. The IDM may promote certain products, services, and/or media based on the age and/or gender of a user and their identity rating. For example, a major motion picture company ("Big Movie Co.") is releasing a movie that is appropriate for children ages 15 to 17. Big Movie Co. wants to feed a trailer of this movie directly to its target audience via a web-based social network. With the IDM system 1000, Big Movie Co. may target children ages 15 to 17 with a very high probability that it is reaching its intended audience.

Further, if Big Movie Co., given the nature of the movie wants a high degree of accuracy with respect to the age of its audience, it may request to only network with members having a high level identity rating thereby increasing its statistical probability that its target audience will be reached. This, for example, may eliminate children ages 14 and under from receiving the trailer. On the other hand, if Big Movie Co. does not want to be highly age restrictive, it may request to network with members having a medium level identity rating thereby increasing the breadth of its audience. In contrast, under current social networking standards, Big Movie Co. may not be assured of the age of its audience as current social networking standards take no precaution to verify and/or monitor the ages of its members. In addition, the CRM system may provide other helpful hints on how best to use the system and/or notification of administrative updates (e.g., notify a user or guardian that their password has not been changed in 3 months).

Moreover, Big Movie Co. may wish to have their movie (or trailer, advertising, and the like) viewed only (or primarily) by individuals within a certain geographical area. In this regard, the CRM system also may be employed to control the geographical distribution area or regulatory distribution area. In another aspect of this embodiment, the CRM system also may be employed to control the content access or advertisement distribution to only (or mostly) individuals of a certain annual income range or political affiliation (providing of course that this information was recorded by the CRM system as part of its member's known parameters). The CRM system may enable a distributor or advertiser to control which members have access to their material using any combination of the criteria and parameters of their members that are tracked by the CRM system.

In addition to Big Movie Co., other content providers may also benefit from the use of the CRM system and its associated services. As described above, the CRM system may be used to provide a high degree of accuracy with respect to the age of its audience. In this regard, the CRM system may request to only network with members having a high level identity rating thereby increasing its statistical probability that only its "age-targeted audience" will be reached. In some embodiments, Adult content (i.e., XXX rated or other related Adult content) providers may utilize the CRM system to help facilitate allowing only "age-appropriate" access to their content.

Additional or Alternative Encryption Techniques:

In another aspect of some embodiments, additional or alternative encryption techniques are employed to secure the IDM system 1000 from an outside attack using a user profile license key. In such an embodiment, during the verification process the IVO/system administrator at the registration location embeds a license key in each user profile. Preferably, the key is not generated on the network, but rather is generated locally on the IVO/system administrator's computer. The IDM system 1000 is configured verify each user profile on a daily basis (or other suitable time period) and ensure that each user profile is valid by checking the validity of the license key. If an unauthorized user profile is somehow surreptitiously added to the network through unauthorized means (e.g., without a license key), the system is configured to either flag or deactivate the unauthorized user profile.

More specifically, during the user registration process the IDM system 1000 is configured to generate a unique key each time a user record is created. This unique key is associated with the user record and stored along with the user record in the database. On a regular basis (that is determinable by the IVO/system administrator), the IDM system 1000 scans the user records in the database and verifies that each user record contains a valid unique key. In this embodiment, if a user record is identified that does not have a valid unique key, then that user record is deactivated and the IVO/system administrator is notified for further investigation.

In one embodiment, the process for generating the unique key employs (1) a hash of the user ID, (2) the time when the record was created, and (3) an existing randomly generated token that is only saved in the website's programming code. When these three components are concatenated together and hashed with a SHA hashing algorithm (or other appropriate encryption technique, such as the techniques listed below) a new value is produced that, according to existing knowledge, cannot be reversed to discover the random token (even with knowledge of the user ID and time of user record creation) by a malicious user attempting to clandestinely gain access to the database server.

In another embodiment, the randomly generated token is stored on a different server (instead of storing the token in the programming code), thus requiring an attacker to hack into multiple systems in order to identify the secret key. While this embodiment adds an additional layer of security, it also introduces further complexity, since an additional server is required, as well as an API for facilitating communication between the two servers.

In still other embodiments, different encryption techniques may be implemented instead of SHA (more specifically, the SHA algorithm currently being utilized is SHA-2 or SHA-256). Other encryption paradigms that may be implemented include: RSA (Rivest-Shamir-Adleman), DSA (Digital Signature Algorithm), DES (Data Encryption Standard), Diffie-Hellman, ElGamal, EEC (Elliptical Curve Cryptography), PVSSR (Pintsov-Vanstone Signature Scheme with partial message Recovery), and AES (Advanced Encryption Standard). It should be noted that encryption security is an ever evolving field, and encryption paradigms that are used today will eventually be replaced by new encryption paradigms that will be even more difficult to penetrate. For example, NIST (National Institute of Standards and Technology) is currently working on a replacement for SHA-2, named SHA-3, which will become a new recommended encryption paradigms in the future.

Biometric Comparison to Prevent Multiple Profiles:

As described above, in another aspect of one embodiment, the IDM system 1000 contains a registration server(s) 640 which may be used to access the data store 690 to create, modify, and delete member accounts. In some embodiments, upon registration of a user, the system performs a biometric comparison against all other users in the database to prevent multiple profiles from being registered. The type of biometric information used for the comparison include, by way of example only, and not by way of limitation: hand/palm scan, fingerprint scan, iris scan, facial recognition image, voice recognition, vein scan, and combinations thereof.

In one embodiment in which a facial recognition image is the biometric information, the system stores the facial recognition images in a biometric library of information. When the IDM system 1000 is used for minor children, their facial recognition images tend to change over time as they grow to a much greater degree than a full grown adult would change over time. Thus, by storing the facial recognition images in a biometric library of information over time, the IDM system 1000 is able to continually update the image of minor children as they grow and mature, thereby enabling the system to continue being able identify the minor children (due to tracking their incremental changes in the facial recognition images). Otherwise, if the system continued to only use the original facial recognition image for a child, after a period of time the facial recognition system might have difficulty recognizing the child, depending the growth rate of each particular child.

In another aspect of one embodiment, the IDM system 1000 uses three distinct categories of facial recognition image for a child, which include a front view, a left profile, and a right profile. By using three distinct categories of facial recognition image for a child, the IDM system 1000 helps ensure that an accurate identification of the child is being made. Additionally, the IDM system 1000 helps ensure that the child continues to be identifiable as it grows and matures, using the continually updating images in the biometric library of information over time. In some embodiments, the IDM system 1000 captures and receives the facial recognition images in stream video, which results in the system actually having hundreds or thousands of images to compare against the stored image in the biometric library.

Third Party Identity Verification Sites:

As described above, in one aspect of some embodiments, user accounts may be created at an authorized Identity Verification Site (e.g., a school, government office, retail store, and the like) ("IVS") with user data terminals 130 connected to the registration server 640 (optionally, following authentication) over an internal LAN. In some embodiments, the authorized IVS is an authenticated third party IVS, such as a U.S. Passport Office or the Department of Motor Vehicles.

Referring now to another aspect, in some embodiments, user accounts are created only by authorized IDM system 1000 personnel at an IVS location. However, in other embodiments, the identity verification portion of the account creation process may be administered by authenticated third party personnel, such as authorized personnel at a U.S. Passport Office or the Department of Motor Vehicles. Since such personnel (e.g., authorizes personnel at a U.S. Passport Office or the Department of Motor Vehicles) are already approved to facilitate the creation of the identification documentation that an authorized IVS would use in verification and user account creation, these personnel are uniquely qualified to be authenticated third party personnel. Additionally, third-party Identity Verification companies could be certified to perform this portion of the Identity Verification process, thereby enabling the IDM system 1000 to be focused more specifically on the management and administration portions of the social network system.

Identity Verification Agent Set-Up and Authentication:

In still another aspect of one embodiment, the IDM system 1000 employs additional techniques to prevent an Identity Verification Agent (IVA) from setting up false or otherwise unauthorized user accounts using unauthorized computers (e.g., IVA machines) or using authorized computers at unauthorized times. In one such embodiment, the IDM system 1000 sets up an IVA by means of client-side Secure Socket Layer (SSL) certificates. Client-side SSL certificates are generated by administrators of the IDM system 1000. Continuing, a unique certificate is installed in each IVA machine's web browser using the serial number of the certificate. In some embodiments, when a campaign (e.g., either part or all of a social network system) is setup by administrators of the IDM system 1000, only specific IVA machines are designated as authorized for use with an authorized IVS. In this manner, authorized use for these specific IVA machines may be restricted to a subset of schools. Additionally or alternatively, the authorized use by these specific IVA machines may also be for a limited period of time.

In accordance with the above-described embodiment, whenever a web browser connects to the IVA server, the client-side SSL certificate is required. In such an embodiment, the client-side SSL certificate is sent and verified before any further communication is allowed. The serial number of the certificate identifies which IVA machine is connecting to the system. In this manner, IDM system 1000 then may identify from which campaign the IVA machine is associated. If the requesting machine is not authorized for that campaign, either by being outside of the valid time period, or by having an invalid/missing SSL certificate, then the attempted access is logged and denied. This authorization procedure presents yet an additional technique for preventing unauthorized access to the system. Specifically, the IDM system 1000 employs techniques that prevent an IVA from setting up false or otherwise authorized user accounts using unauthorized computers and/or using authorized computers at unauthorized times.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed is:

1. A method of providing identity verification and management for a social network system, the method comprising:
    creating member account profiles for members of the social network system using identification components for identifying members, wherein the creating of the member account profiles includes generating a unique key each time a user record is created and associating the unique key with the user record;
    generating an identity rating for each member using initial rating factors including:
    number of identification components, quality of identification components, and presence of an in-person authentication;
    determining member identity rating thresholds for identity rating-restricted services;
    authenticating a member attempting to access one or more identity rating-restricted services over the social network system, wherein the authentication includes confirmation of a member-registered device, confirmation of a member-registered location, confirmation of a member-registered biometric, and combinations thereof;
    managing the member's identity rating in real-time, wherein the member's identity rating is altered in real-time by monitoring member identity rating-altering factors including keystroke patterns and language analysis;
    providing member-to-member restrictions using the managed identity ratings, wherein access to network-based content and member-to-member interactions is restricted based on member identity rating thresholds; and
    blocking access to the social network system by unauthenticated members.

2. The method of claim 1, wherein generating a unique key includes concatenating a hash of the user ID, the time when the record was created, and an existing randomly generated token that is saved in the programming code, and then hashing the concatenation using a SHA hashing algorithm to produce a new value.

3. The method of claim 1, wherein the creating of member account profiles includes in-person authentication by an authorized agent, a network sponsoring agent, a minor-aged member, and a parental sponsor.

4. The method of claim 1, wherein the identification components include a government issued ID, driver's license, passport, birth certificate, social security number, school or educational institution issued ID, and combinations thereof.

5. The method of claim 1, wherein the identity ratings are generated or modified using factors including IP address, recognized device, recognized location, dynamic access code, personal security questions, digital signature, and combinations thereof.

6. The method of claim 1, wherein the identity ratings are generated or modified using factors that are biometric including hand/palm scan, fingerprint scan, iris scan, facial recognition image, voice recognition, vein scan, and combinations thereof.

7. The method of claim 1, wherein the identity ratings are generated or modified using factors that are behavior characteristics including keystroke patterns, suspicious language, language style, communication methods, and combinations thereof.

8. The method of claim 1, wherein attributes of a member are used to provide or control the types of identity rating-restricted services available to a member.

9. The method of claim 1, wherein a member's identity rating is used to provide or control the types of identity rating-restricted services available to a member.

10. The method of claim 1, wherein the types of identity rating-restricted services available to a member include: modifying the personal account parameters, setting a home location, setting a home device, sending a message, sending a picture, tagging a picture, sending a video, tagging a video, engaging in a video conference, viewing only mode of other members information, and viewing only mode of member's own information.

11. The method of claim 1, wherein the types of identity rating-restricted services available to a member are linked to a member's identity rating to enable a type of service to be available to a member only if a pre-determined identity rating is maintained by the member.

12. The method of claim 1, wherein the types of identity rating-restricted services available to a member are linked to a member's identity rating to enable a type of service to be available to a member only if a pre-determined identity rating is maintained by the member and a pre-determined identity rating is also maintained be another member to whom communication is attempted.

13. The method of claim 1, wherein the types of identity rating-altering factors that potentially alter a member's identity rating include: answering one or more challenge questions to which answers were previously provided, receiving a parental authorization code, receiving member identification information, confirming log-in from a member-registered device, confirming log-in from a member-registered location, confirming log-in with member-registered biometrics, logging in from an unregistered location, logging in from an unregistered device, and logging in with unregistered biometrics.

14. The method of claim 1, further comprising prompting a member of types of identity rating-altering factors that may be performed to attempt to raise the member's identity rating, in response to the member being denied access to an identity-rating restricted activity.

15. The method of claim 1, further comprising enabling a parental sponsor to view a minor member's activities if the minor member's identity rating drops below a pre-determined value.

16. The method of claim 1, further comprising alerting a parental sponsor if the minor member contacts another member whose member's identity rating is below a pre-determined value.

17. The method of claim 1, further comprising alerting a parental sponsor if the minor member is contacted by another member whose member's identity rating is below a pre-determined value.

18. A method of providing identity verification and management for a network, the method comprising:
creating member account profiles for members using identification components for identifying members, wherein the creating of the member account profiles includes generating a unique key each time a user record is created and associating the unique key with the user record, and wherein generating a unique key includes concatenating a hash of the user ID, the time when the record was created, and an existing randomly generated token that is saved in the programming code, and then hashing the concatenation using a SHA hashing algorithm to produce a new value;
generating an identity rating for each member using initial rating factors including: number of identification components, quality of identification components, and presence of an in-person authentication;
determining member identity rating thresholds for identity rating-restricted services;
authenticating a member attempting to access one or more identity rating-restricted services;
managing the member's identity rating in real-time, wherein the member's identity rating is alterable in real-time by monitoring member identity rating-altering factors including keystroke patterns and language analysis;
providing member-to-member restrictions using the managed identity ratings, wherein access to network-based content and member-to-member interactions is restricted based on member identity rating thresholds; and
blocking access by unauthenticated individuals.

19. An identity verification and management system, the system comprising:
a user interface accessible via a computing terminal or smartphone, wherein the user interface enables access to network-based content and user-to-user interactions upon fulfilling member authentication of the identity verification and management system; and
one or more identity verification and management servers each including one or more memory storage devices and one or more processors, wherein the one or more identity verification and management servers are configured to:
identify members using identification information and enable the user interface for entering the identification information and generating an identity rating for each member using identification components, wherein the identity rating is generated using initial rating factors including: number of identification components, quality of identification components, and presence of an in-person authentication;
determine member identity rating thresholds for identity rating-restricted services and member identity rating changes associated with identity rating-altering factors;
authenticate users attempting to access one or more identity rating-restricted services over a network, wherein the authentication module accesses a unique key in a user record to authenticate the user, wherein the unique key being generated when the user record was created, and wherein generation of a unique key includes concatenating a hash of the user ID, the time when the record was created, and an existing randomly generated token that is saved in the programming code, and then hashing the concatenation using a SHA hashing algorithm to produce a new value;
alter the member's identity rating in real-time by monitoring member identity rating-altering factors including keystroke patterns and language analysis; and provide member-to-member restrictions using the managed identity ratings to restrict access to network-based content and member-to-member interactions, based on member identity rating thresholds, and wherein the member activity security module blocks access by unauthenticated individuals.

20. A method of providing customer relationship management for a network, the method comprising:

creating member account profiles for members using identification components for identifying members, wherein the creating of the member account profiles includes generating a unique key each time a user record is created and associating the unique key with the user record, and wherein generating a unique key includes concatenating a hash of the user ID, the time when the record was created, and an existing randomly generated token that is saved in the programming code, and then hashing the concatenation using a SHA hashing algorithm to produce a new value;

generating an identity rating for each member using initial rating factors including: a number of identification components and a quality of identification components;

determining member identity rating thresholds for identity rating-restricted content access;

authenticating a member attempting to access the network;

managing the member's identity rating in real-time, wherein the member's identity rating is alterable in real-time by monitoring member identity rating-altering factors including keystroke patterns and language analysis; and providing content access to a member based on the managed identity ratings.

* * * * *